(12) United States Patent
Krivoy et al.

(10) Patent No.: US 11,896,979 B2
(45) Date of Patent: Feb. 13, 2024

(54) ASSAY APPARATUSES, METHODS, AND REAGENTS

(71) Applicant: Meso Scale Technologies, LLC., Rockville, MD (US)

(72) Inventors: Gary I. Krivoy, Rockville, MD (US); Cecilia Zimmerman, Clarksburg, MD (US); Jules Vandersarl, Gaithersburg, MD (US); Sandor Kovacs, Middletown, DE (US); Aaron H. Leimkuehler, Upper St. Clair, PA (US); Leo Tabakin, Germantown, MD (US); Jon Willoughby, Gaithersburg, MD (US); Manish Kochar, Rockville, MD (US); Charles M. Clinton, Clarksburg, MD (US)

(73) Assignee: MESO SCALE TECHNOLOGIES, LLC., Rockville, MD (US)

( * ) Notice: Subject to any disclaimer, the term of this patent is extended or adjusted under 35 U.S.C. 154(b) by 517 days.

(21) Appl. No.: 16/929,757

(22) Filed: Jul. 15, 2020

(65) Prior Publication Data
US 2021/0016288 A1    Jan. 21, 2021

Related U.S. Application Data

(60) Provisional application No. 62/874,828, filed on Jul. 16, 2019, provisional application No. 62/954,961, filed on Dec. 30, 2019.

(51) Int. Cl.
*B01L 9/00*    (2006.01)

(52) U.S. Cl.
CPC ....... *B01L 9/523* (2013.01); *B01L 2300/0654* (2013.01); *B01L 2300/0663* (2013.01); *B01L 2300/0829* (2013.01); *B01L 2300/168* (2013.01); *B01L 2300/1844* (2013.01); *B01L 2300/1894* (2013.01)

(58) Field of Classification Search
CPC .......................... B01L 2300/168; B01L 9/523
USPC .................................. 422/553, 82.12, 82.01
See application file for complete search history.

(56) References Cited

U.S. PATENT DOCUMENTS

| | | |
|---|---|---|
| 5,702,059 A | 12/1997 | Chu et al. |
| 8,792,023 B2 | 7/2014 | Makara |
| 9,664,613 B2 | 5/2017 | Wohlstadter et al. |
| 10,281,678 B2 | 5/2019 | Chamberlin et al. |
| 2012/0050608 A1 | 3/2012 | Makara |
| 2014/0191109 A1* | 7/2014 | Chamberlin ....... G01N 21/6452 250/206 |
| 2016/0104806 A1 | 4/2016 | Thrush et al. |

FOREIGN PATENT DOCUMENTS

| | | |
|---|---|---|
| CN | 1183472 C | 1/2005 |
| CN | 102375296 A | 3/2012 |
| CN | 105209886 A | 12/2015 |
| CN | 107078144 A | 8/2017 |

(Continued)

*Primary Examiner* — Natalia Levkovich
(74) *Attorney, Agent, or Firm* — MEDLER FERRO WOODHOUSE & MILLS PLLC

(57) ABSTRACT

Apparatuses, systems, method, reagents, and kits for conducting assays as well as process for their preparation are described. The apparatuses, systems, method, reagents, and kits may be employed in conducting automated analysis in a multi-well plate assay format.

20 Claims, 57 Drawing Sheets

(56) References Cited

FOREIGN PATENT DOCUMENTS

| EP | 3422288 A1 | 1/2019 |
|----|------------|--------|
| JP | 2019-035758 A | 3/2019 |
| WO | 1999/008233 A1 | 2/1999 |

\* cited by examiner

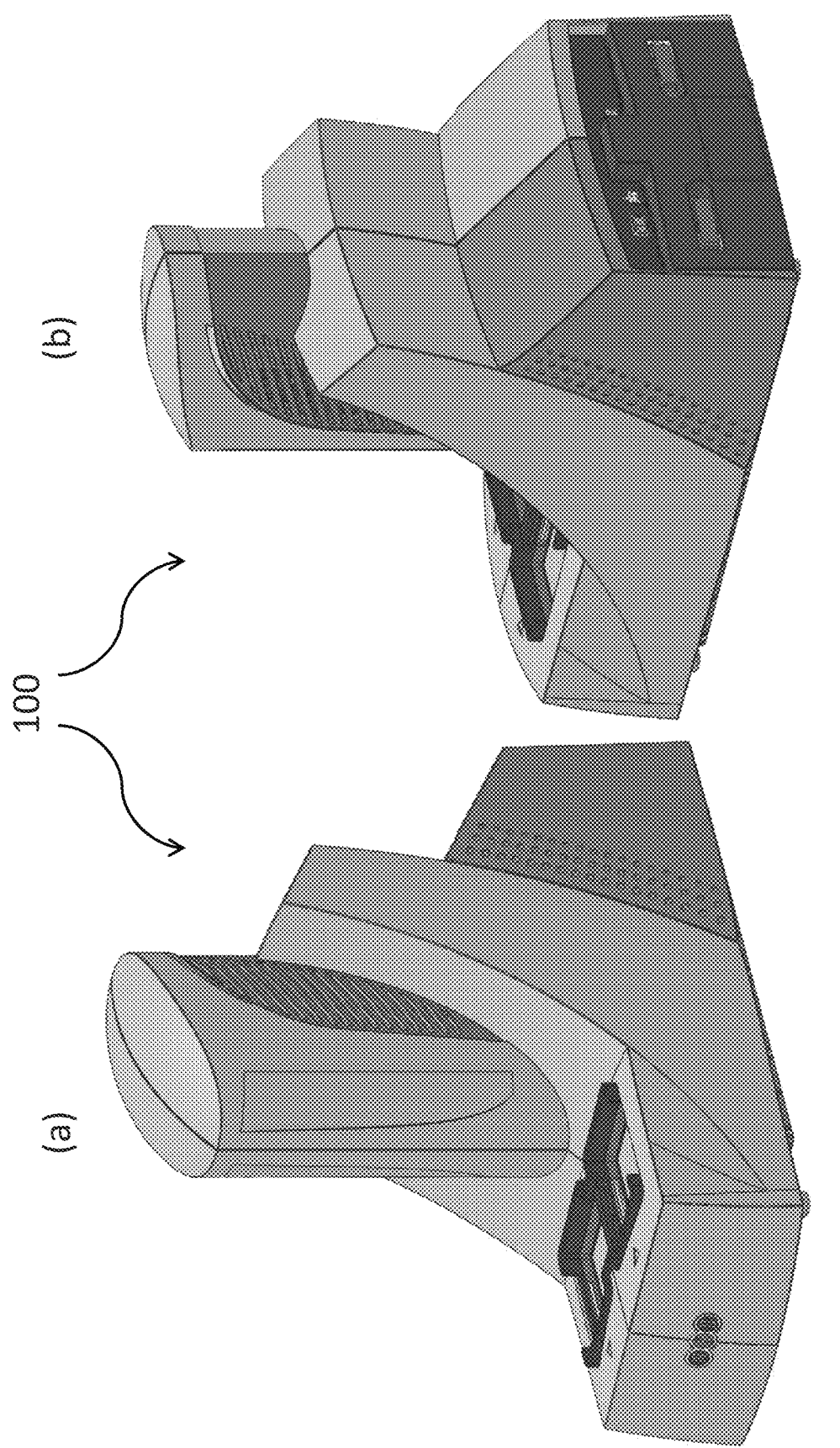
Fig. 1(a)-(b)

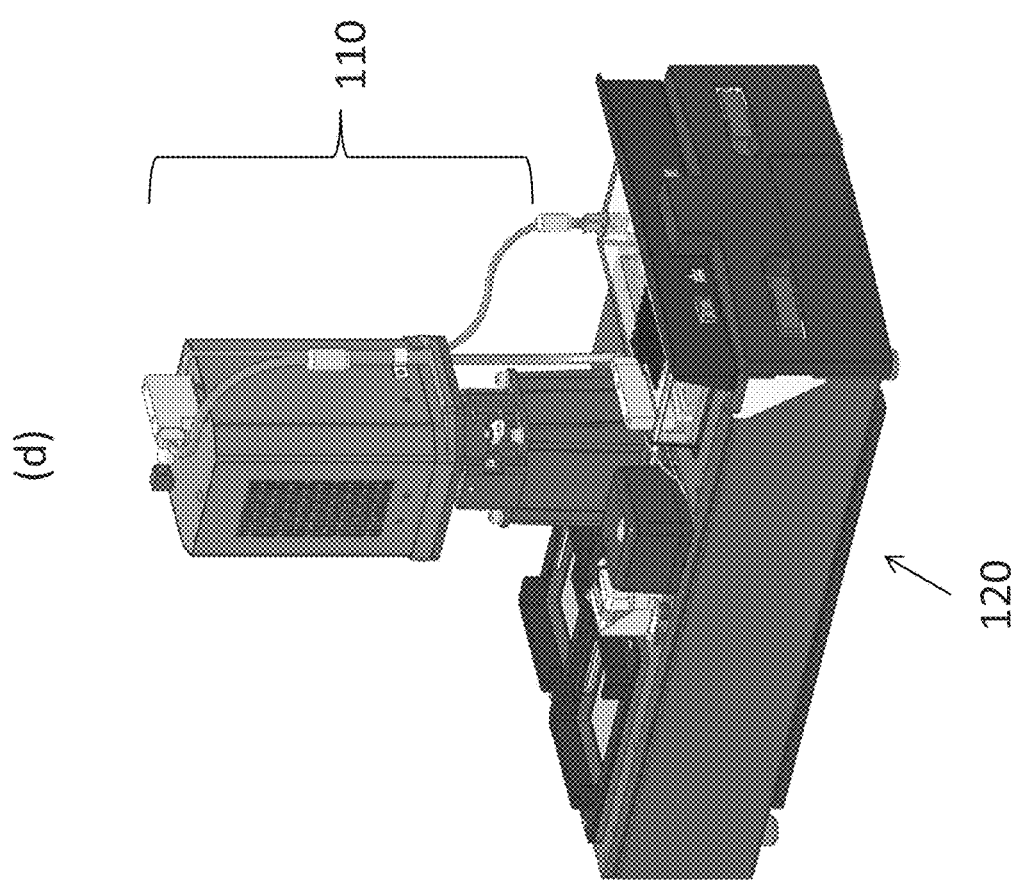
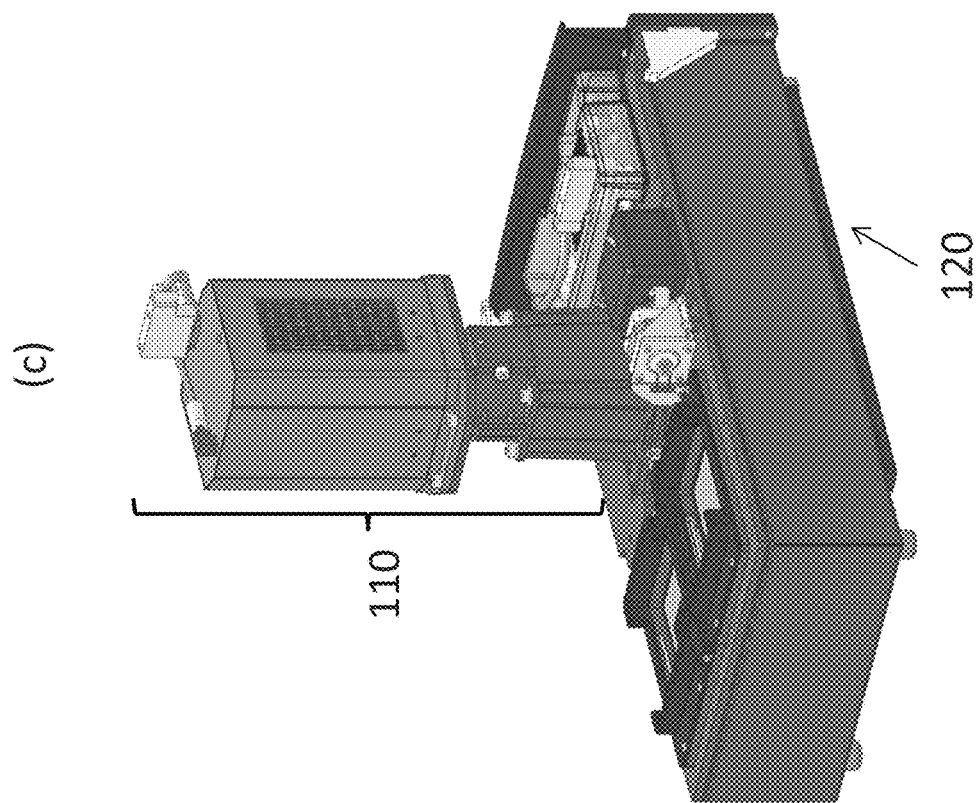
Fig. 1(c)-(d)

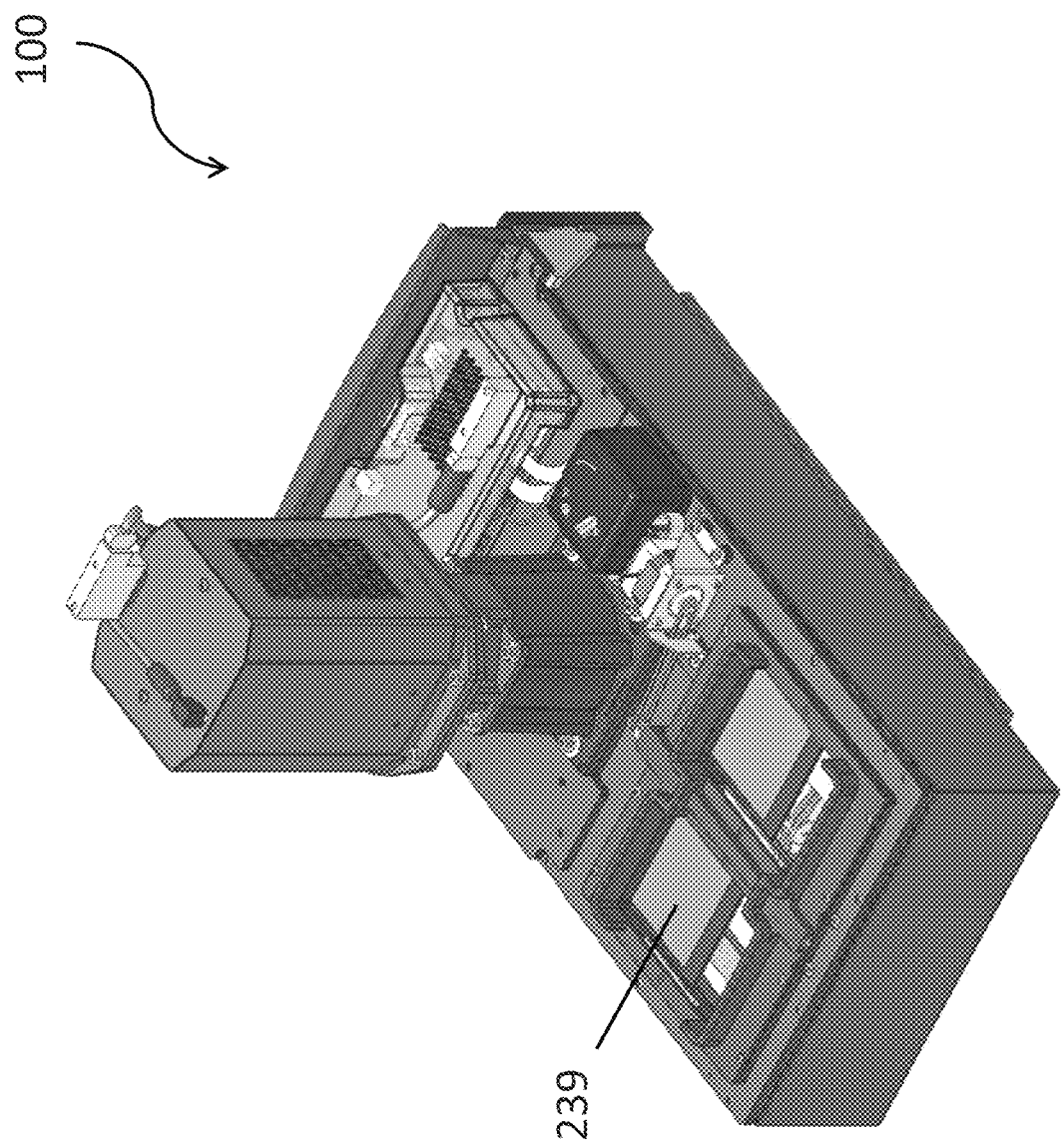

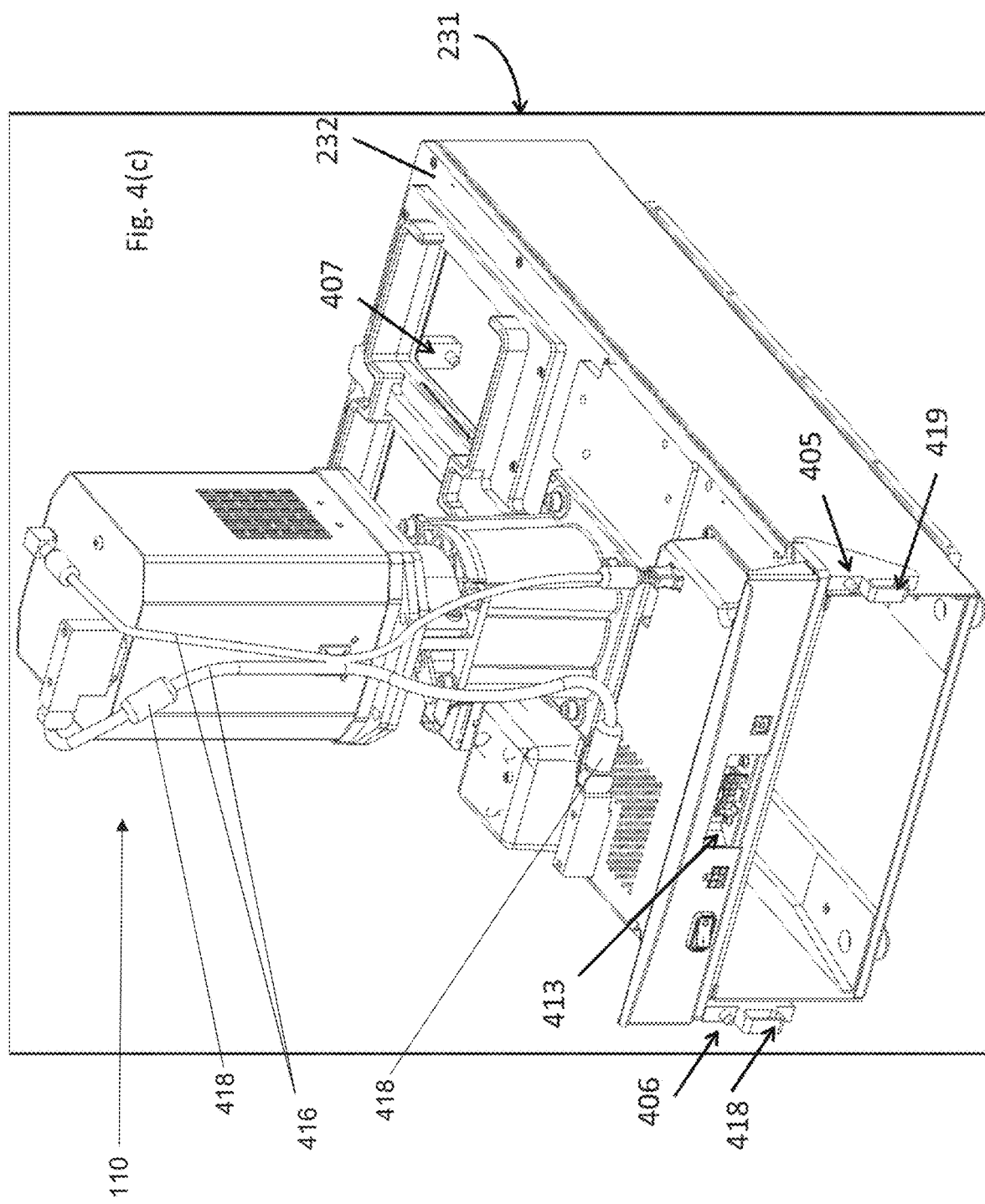

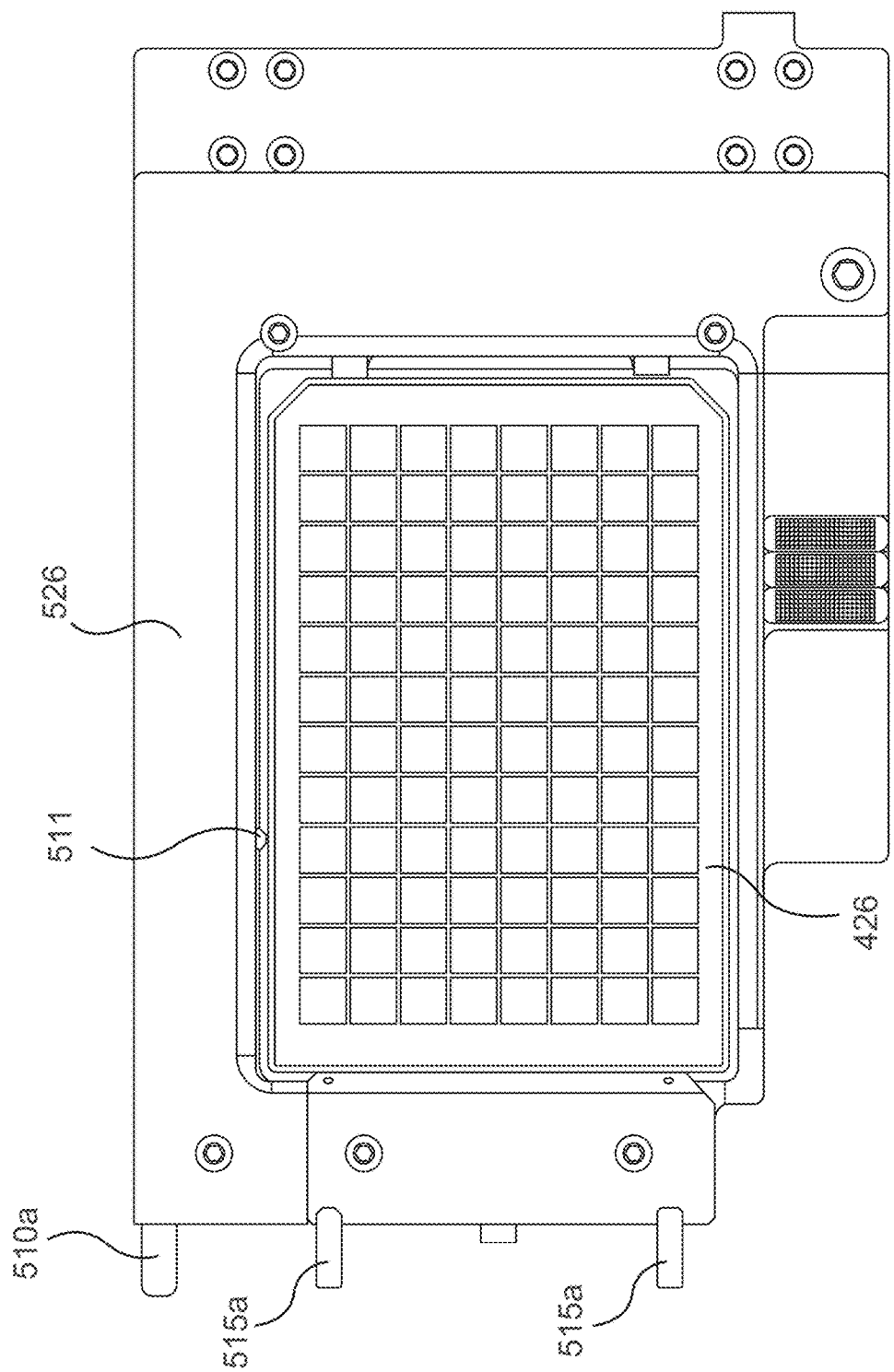

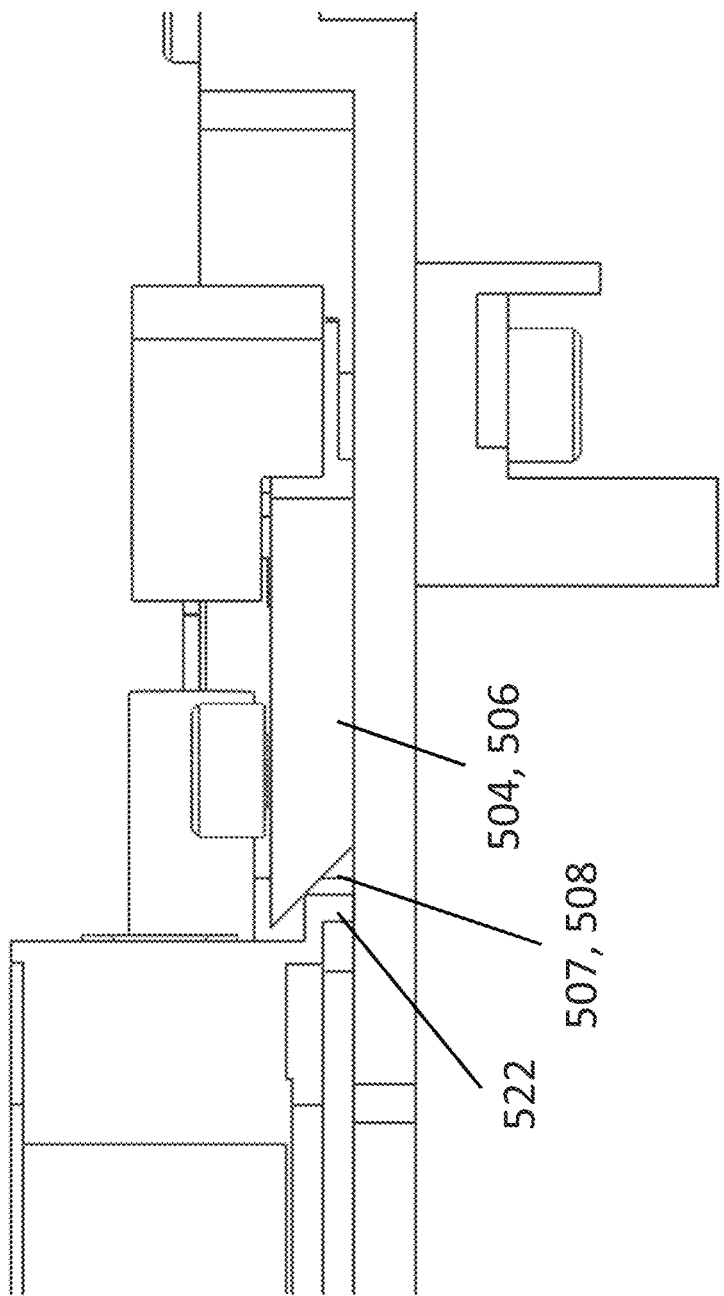

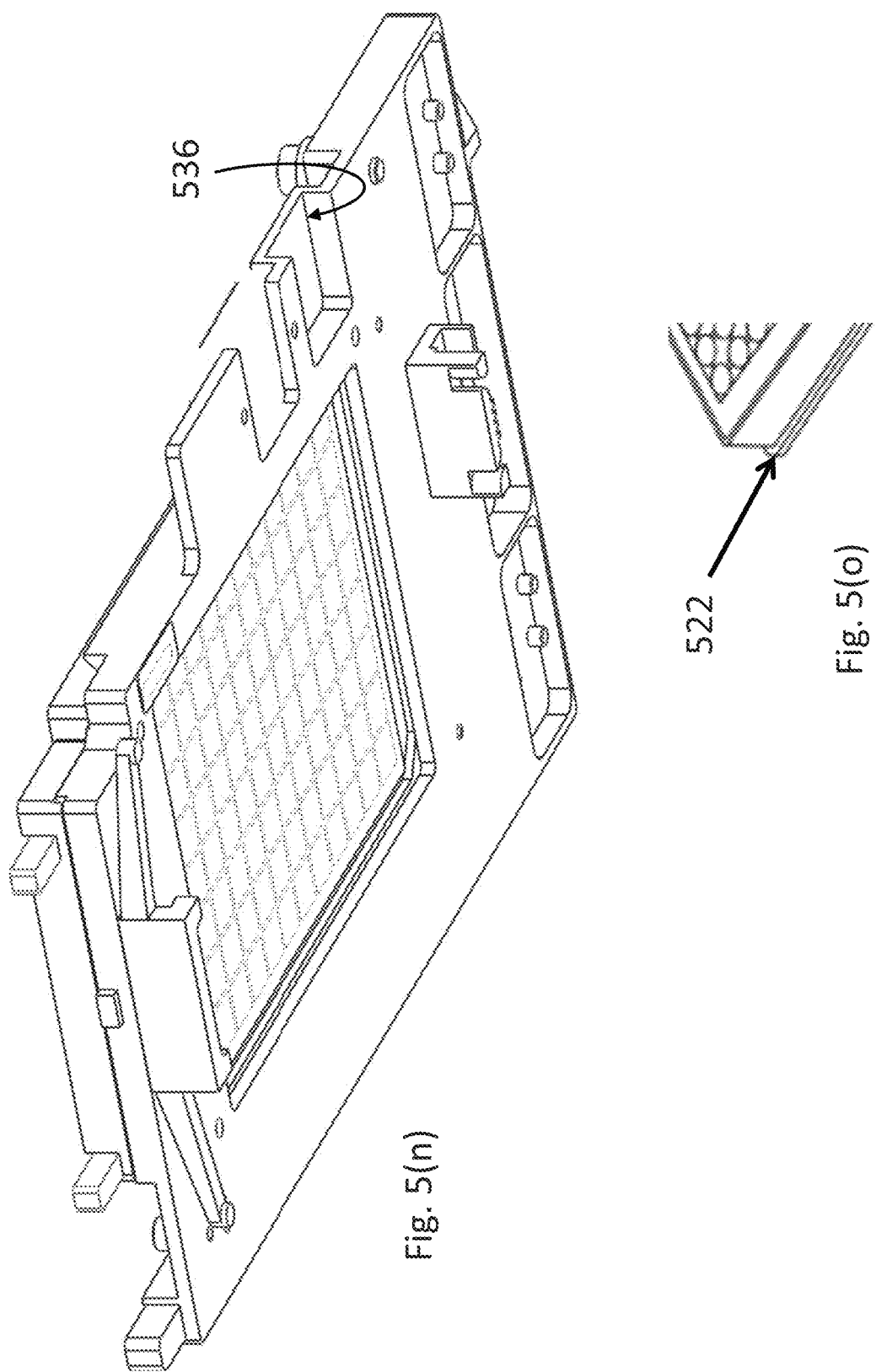

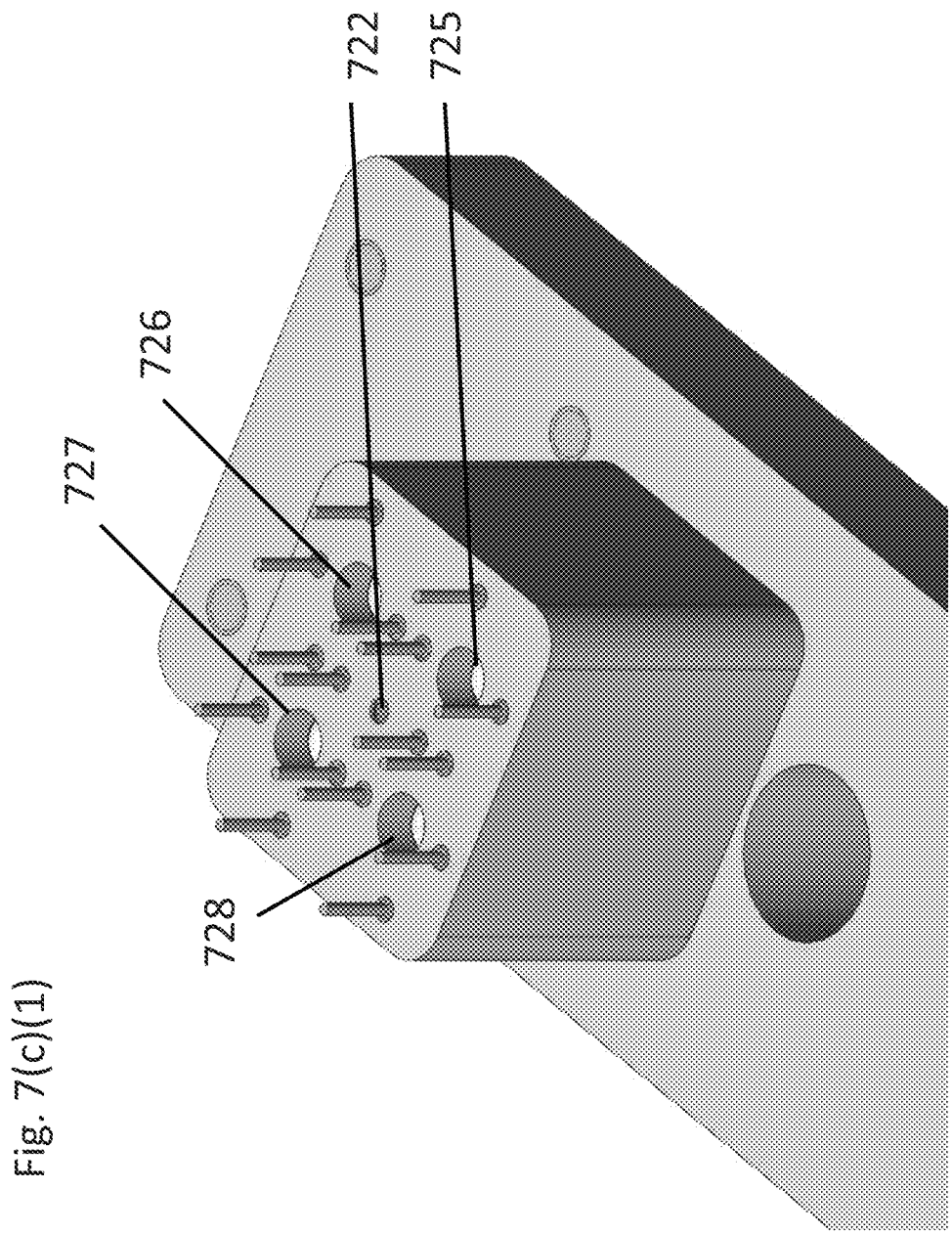
Fig. 7(c)(1)

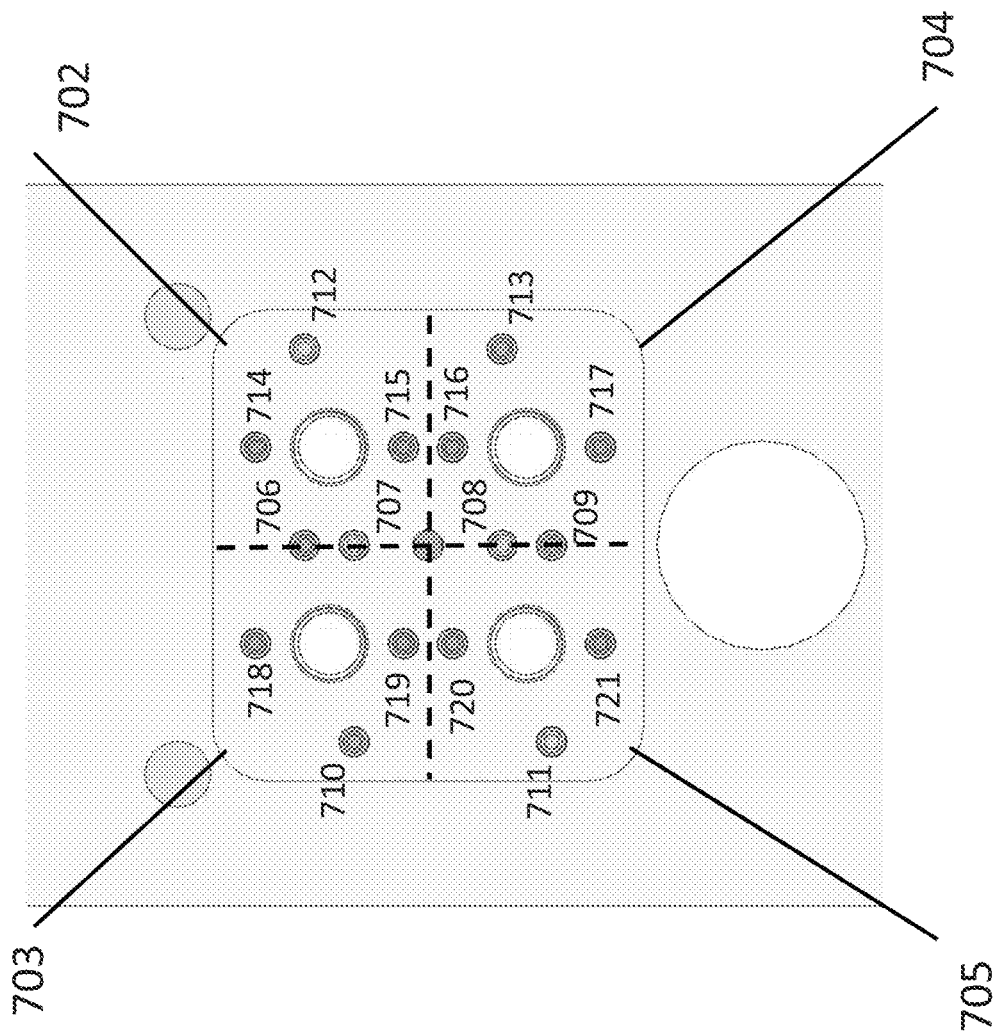
Fig. 7(c)(2)

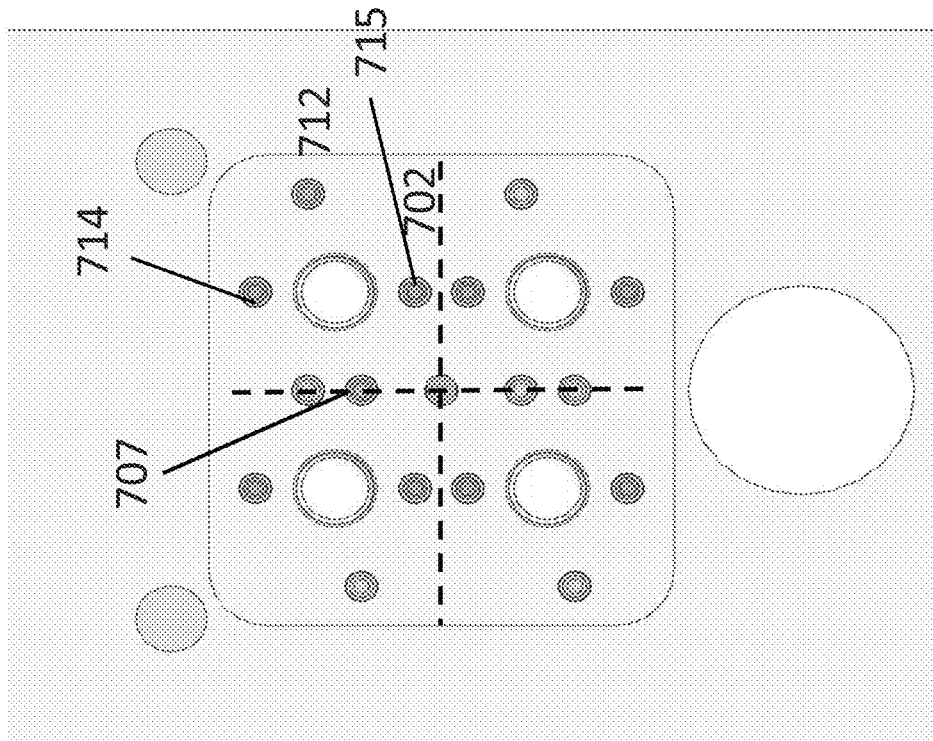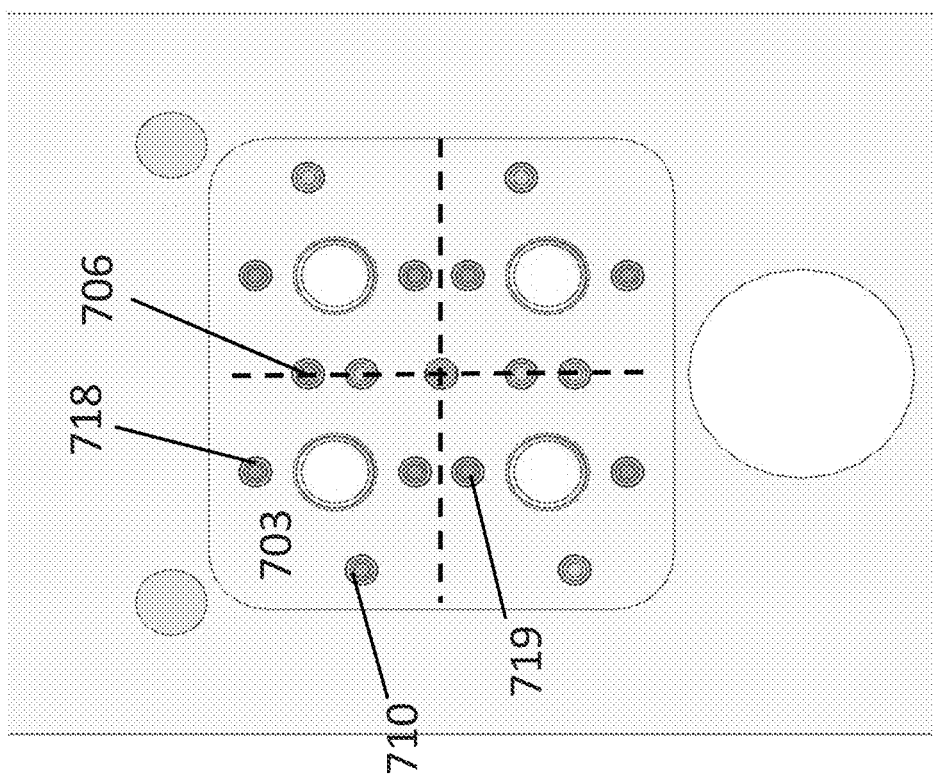
Fig. 7(d)-(e)

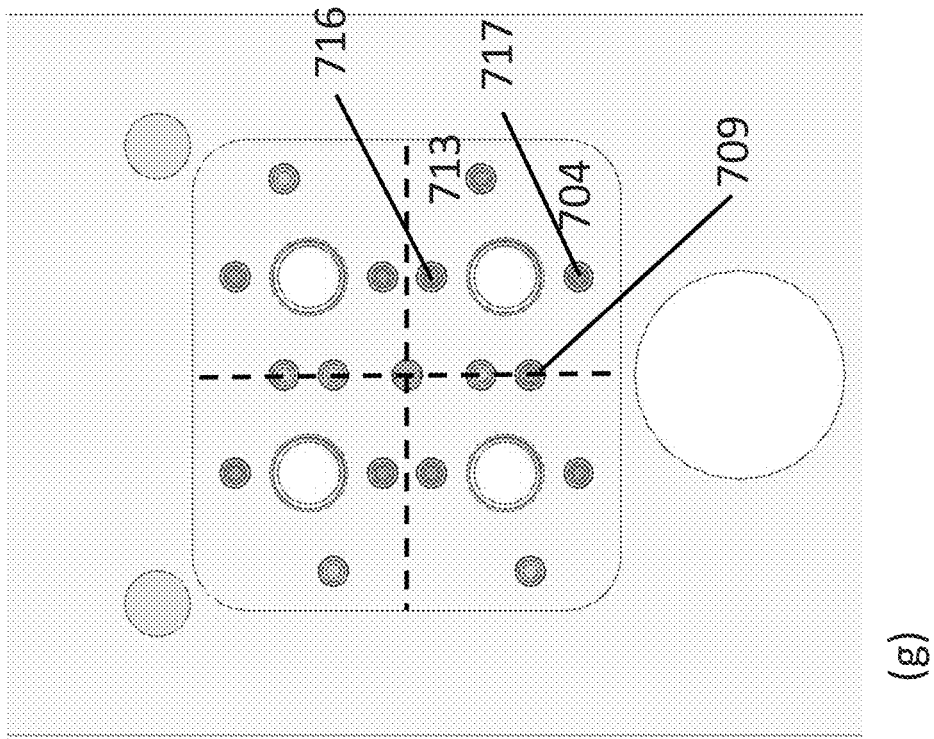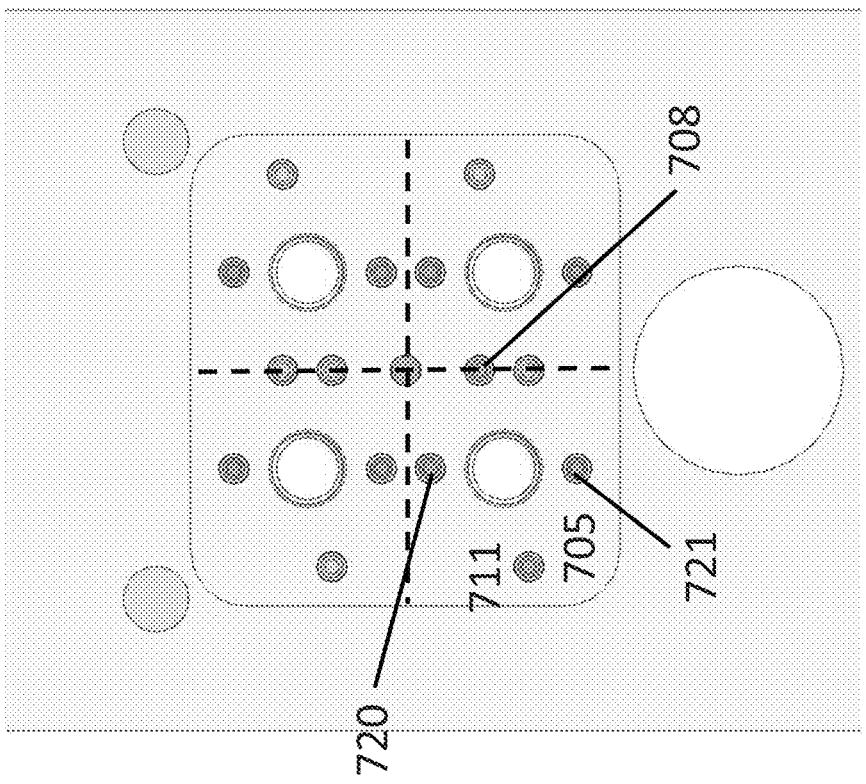
Fig. 7(f)-(g)

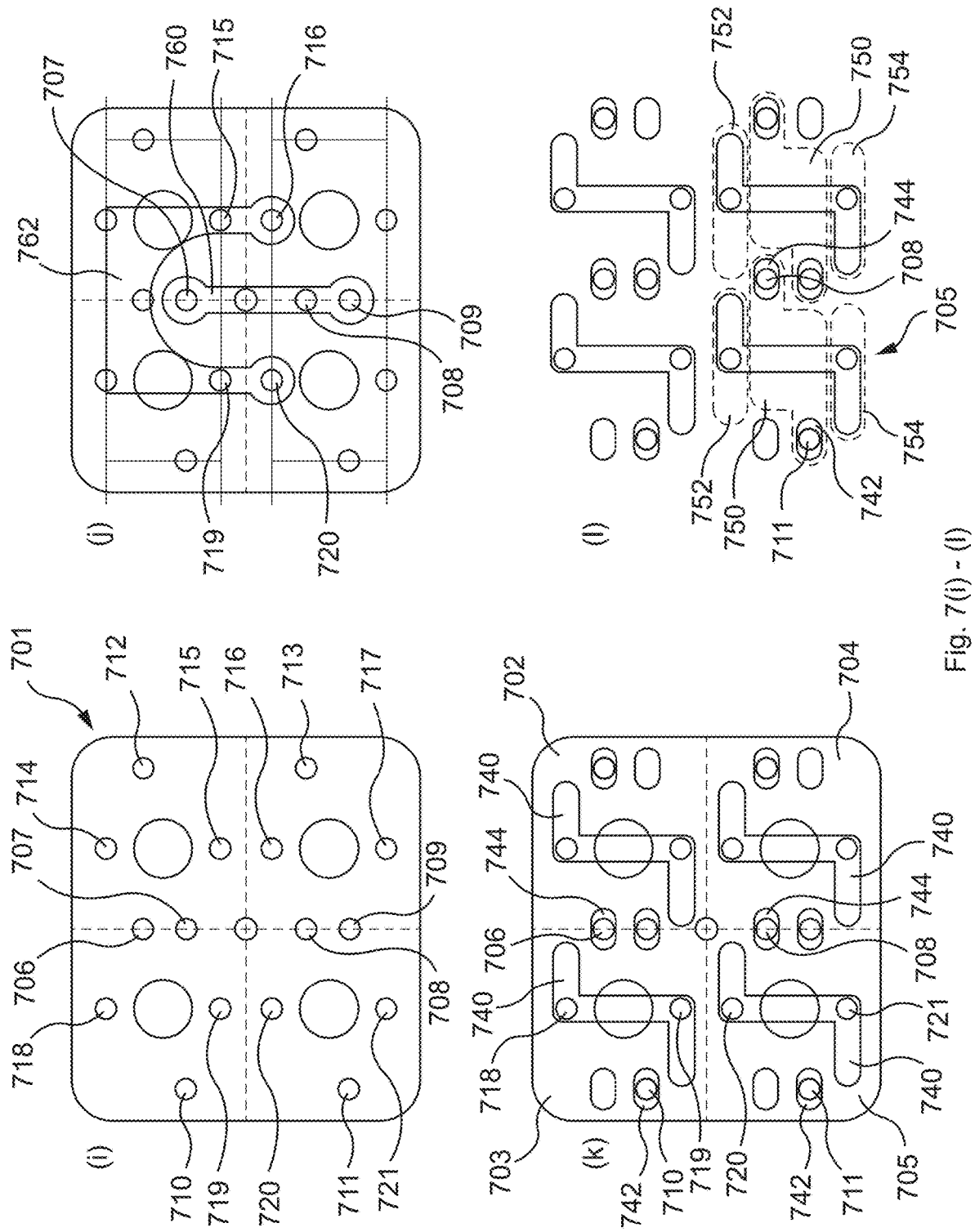
Fig. 7(i) - (l)

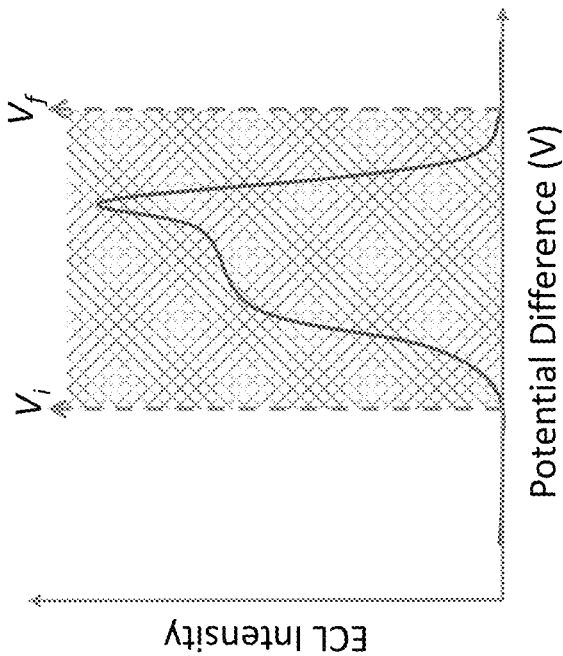

ASSAY APPARATUSES, METHODS, AND REAGENTS

CROSS REFERENCE TO RELATED APPLICATIONS

This patent application claims priority under 35 U.S.C. § 119(e) to U.S. provisional patent application No. 62/954,961, filed on Dec. 30, 2019 and application No. 62/874,828, filed on Jul. 16, 2019, the disclosures of which are hereby incorporated by reference in their entireties.

This patent application refers to U.S. patent application Ser. No. 14/147,216, entitled "Assay Apparatuses, Methods and Reagents" filed on Jan. 3, 2014, which claims priority under 35 U.S.C. § 119(e) to U.S. provisional application No. 61/749,097 entitled "Assay Apparatus, Methods and Reagents" filed on 4 Jan. 2013. The disclosures of these patent applications are incorporated by reference in their entireties.

Reference is also made to commonly owned international patent application publication No. WO 2014/107576 entitled "Assay Apparatuses, Methods and Reagents," published on Jul. 10, 2014, which share the same specification and drawings with U.S. patent application Ser. No. 14/147,216. This international patent publication is incorporated herein by reference in its entirety.

Reference is also made to commonly owned U.S. patent application publication No. US 2012/0195800 and international application publication No. WO 2009/126303, which describe a prior ECL reader. The disclosures of these applications are incorporated herein by reference in their entireties.

Reference is also made to U.S. Application Publication Nos. 2011/0143947, 2012/0195800, 2007/0231217, 2009/0263904, and 2011/025663. The disclosures of each of these applications are incorporated herein by reference in their entireties.

FIELD OF THE INVENTION

The invention relates to apparatuses, systems, methods, reagents, and kits for conducting assays. Certain embodiments of the apparatuses, systems, methods, reagents, and kits of the invention may be used for conducting sampling, sample preparation, and/or sample analysis in a multi-well plate assay format.

BACKGROUND OF THE INVENTION

Numerous methods and systems have been developed for conducting chemical, biochemical, and/or biological assays. These methods and systems are essential in a variety of applications including medical diagnostics, food and beverage testing, environmental monitoring, manufacturing quality control, drug discovery, and basic scientific research.

Multi-well assay plates (also known as microtiter plates or microplates) have become a standard format for processing and analysis of multiple samples. Multi-well assay plates can take a variety of forms, sizes, and shapes. For convenience, some standards have appeared for instrumentation used to process samples for high-throughput assays. Multi-well assay plates typically are made in standard sizes and shapes and have standard arrangements of wells. Arrangements of wells include those found in 96-well plates (12×8 array of wells), 384-well plates (24×16 array of wells), and 1536-well plates (48×32 array of wells). ANSI/SLAS has published recommended microplate specifications. (See www.slas.org/SLAS/assets/File/ANSI_SLAS_1-2004_FootprintDimensions.pdf.) See ANSI SLAS 1-2004 (R2012): Footprint Dimensions (last updated Jan. 9, 2004); ANSI SLAS 2-2004 (R2012): Height Dimensions (last updated Jan. 9, 2004): ANSI SLAS 3-2004 (R2012): Bottom Outside Flange Dimensions (last updated Jan. 9, 2004): ANSI SLAS 4-2004 (R2012): Well Positions (last updated Jan. 9, 2004); and ANSI SLAS 6-2012: Well Bottom Elevation (last updated Apr. 9, 2009.)

A variety of plate readers are available for conducting assay measurements in multi-well plates including readers that measure changes in optical absorbance, emission of luminescence (e.g., fluorescence, phosphorescence, chemiluminescence, and electrochemiluminescence), emission of radiation, changes in light scattering, and changes in a magnetic field. U.S. Patent Application Publication 2004/0022677 and U.S. Pat. No. 7,842,246, respectively, of Wohlstadter et al. describe solutions that are useful for carrying out singleplex and multiplex ECL assays in a multi-well plate format. They include plates that comprise a plate top with through-holes that form the walls of the wells and a plate bottom that is sealed against the plate top to form the bottom of the wells. The plate bottom has patterned conductive layers that provide the wells with electrode surfaces that act as both solid phase supports for binding reactions as well as electrodes for inducing electrochemiluminescence (ECL). The conductive layers may also include electrical contacts for applying electrical energy to the electrode surfaces.

Despite such known methods and systems for conducting assays, improved apparatuses, systems, methods, reagents, and kits for conducting automated sampling, sample preparation, and/or sample analysis in a multi-well plate assay format are needed.

SUMMARY OF THE INVENTION

The present invention includes, but is not limited to, any and all combinations and sub-combinations of technical features disclosed herein with respect to the electrochemiluminescent (ECL) readers described here.

The present invention is also related to an instrument that comprises a light detection system having a CCD sensor and an optical lens system. The light detection system is positioned above a single well at a time in a multi-well plate to conduct an electrochemiluminescence analysis of said single well. The area of the CCD sensor is substantially the same as the area of said single well. The light detection system further comprises a cooling device sized and dimensioned to cool the CCD sensor. A heat removal system comprising at least one fan oriented at an angle is provided to pull a heated air exhausted from said cooling device into a flow plenum and out of the instrument.

The optical lens system may comprise a plurality of lenses and the plurality of lenses have both spherical and aspherical surfaces. The area of the plurality of lenses is larger than the area of said single well, and larger than the area of the CCD sensor. The lenses can be made from a hard polymeric material and a non-crystalline, amorphous transparent material such as glass.

The light detection system may be mounted in a substantially vertical direction onto a housing top, and the heat removal system is also mounted onto the housing top.

The at least one fan may be housed within the flow plenum, and the flow plenum further houses at least one printed circuit board (PCB) and comprises at least one opening to allow electrical connections between the at least one PCB and electrical components outside of the plenum. A flow baffle may be positioned within the plenum to minimize recirculation of air within the instrument. The heated air may flow away from the camera and plate across the at least one PCB before exiting the instrument.

Also provided is an instrument comprising a contact platform, wherein the contact platform comprises at least a pair of electrical contact probes, which may be upstanding, spring-loaded pins, a controller operatively connected to a voltage source to conduct a voltage to the at least a pair of electrical contact probes, a plate carriage frame adapted to transport a single-well addressable multi-well plate and to position the multi-well plate relative to the contact platform, such that the voltage can be applied to one or more wells on the plate, and a vertical lift system. The vertical lift system may move the contact platform to contact corresponding electrode contacts located on a bottom of said multi-well plate. The vertical lift system may include a worm gear mating with a geared portion of a leadscrew, such that a rotation of the worm gear rotates the leadscrew. The leadscrew is threadedly attached to a support base that supports the contact platform, such that a rotation of the leadscrew lifts or lowers the support base and the contact platform.

A motor may be adapted to rotate the worm gear, and the motor is controlled by the controller. The vertical lift system may comprise a guide shaft sized and dimensioned to slide within a corresponding hole in the support base to allow the support base to slide along the guide shaft. The worm gear may be oriented in a substantially horizontal direction and the leadscrew is oriented in a substantially vertical direction.

BRIEF DESCRIPTION OF DRAWINGS

FIGS. 1(a)-(b) show a front and rear view, respectively, of apparatus 100 with a stylized cover and FIGS. 1(c)-(d) show the corresponding front and rear views, respectively, of the apparatus without the cover.

FIGS. 2(a)-(c) show detailed views of the plate handling subsystem and light detection system.

FIGS. 4(a)-(g) show various detailed views of the removable drawer 240 and the subcomponents positioned within the drawer.

FIGS. 7(a)-(l) show detailed views of a plate contact mechanism.

FIGS. 18(a)-(b) illustrate exemplary ECL responses and voltage ramp windows.

DESCRIPTION OF SPECIFIC EMBODIMENTS OF THE INVENTION

Figure 2A:
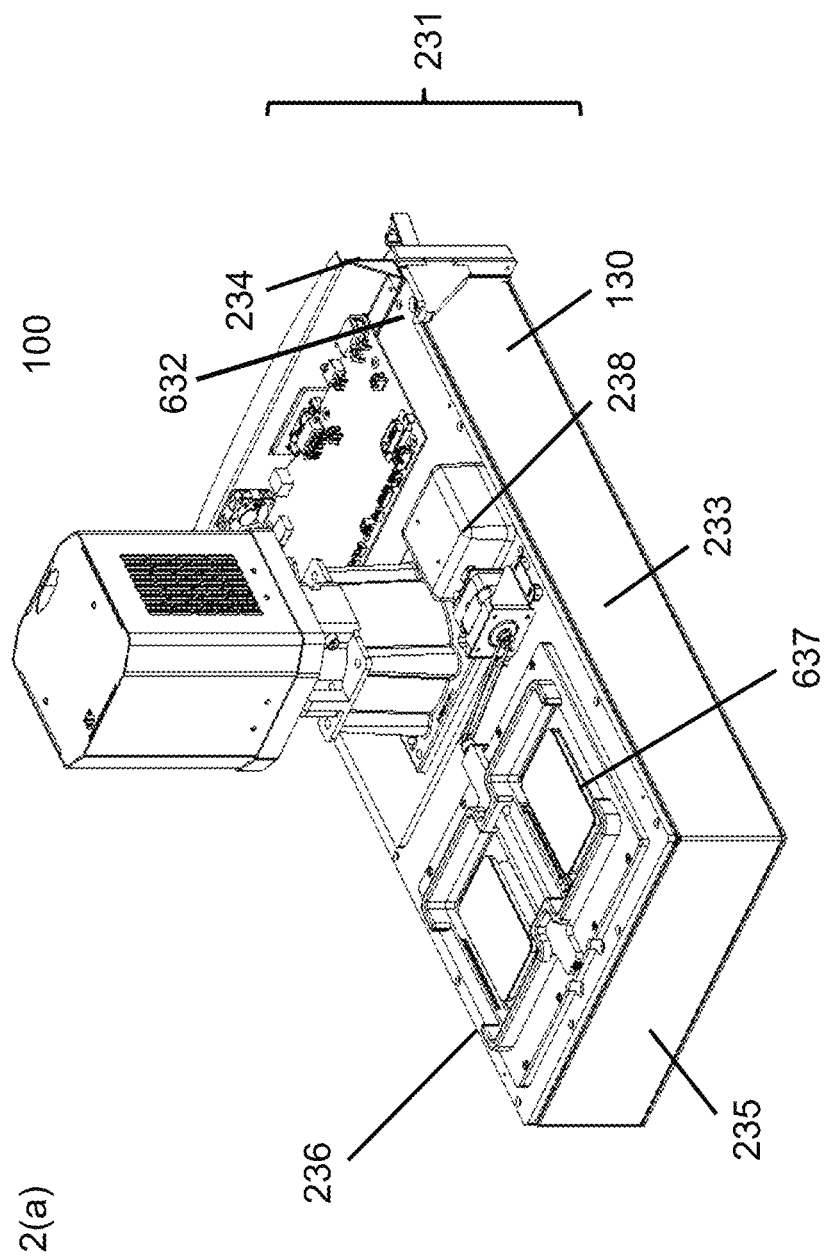

The Detailed Description section provides descriptions of certain embodiments of the invention that should not be considered limiting but are intended to illustrate certain inventive aspects. Unless otherwise defined herein, scientific, and technical terms used in connection with the present invention shall have the meanings that are commonly understood by those of ordinary skill in the art. Further, unless otherwise required by context, singular terms shall include pluralities and plural terms shall include the singular. The articles "a" and "an" are used herein to refer to one or to more than one (i.e., to at least one) of the grammatical object of the article. By way of example, "an element" means one element or more than one element. Furthermore, a claim which recites "comprising" allows the inclusion of other elements to be within the scope of the claim; the invention is also described by such claims reciting the transitional phrases "consisting essentially of" (i.e., allowing the inclusion of other elements to be within the scope of the claim if they do not materially affect operation of the invention) or "consisting of" (i.e., allowing only the elements listed in the claim other than ancillary elements or inconsequential activities which are ordinarily associated with the invention) instead of the "comprising" term. Any of these three transitions can be used to claim the invention.

Described herein is an apparatus for conducting assays in a multi-well plate format that have one or more of the following desirable attributes: (i) high sensitivity, (ii) large dynamic range, (iii) small size and weight, (iv) array-based multiplexing capability, (v) automated operation; and (vi) ability to handle multiple plates. Also described are components and subsystems used in such an apparatus and methods of using the apparatus and subsystems. The apparatus and methods may be used with a variety of assay detection techniques including, but not limited to, techniques measuring one or more detectable signals. Apparatuses and methods described herein are suitable for electrochemiluminescence measurements and, in particular, are suitable for use with multi-well plates with integrated electrodes (and assay methods using these plates) such as those described in U.S. Publication 2004/0022677 and U.S. Pat. No. 7,842,246, respectively, of Wohlstadter et al., and U.S. Pat. No. 7,807,448 of Glezer et al., each of which is incorporated herein in its entirety.

In an embodiment, an apparatus is provided for conducting luminescence assays in multi-well plates. One embodiment comprises a light detection system and a plate handling subsystem, wherein the plate handling subsystem includes a light-tight enclosure that provides a light-free environment in which luminescence measurements can be carried out. The enclosure includes a housing and a removable drawer that is placed within the housing. The housing also includes a housing top having one or more plate introduction apertures through which plates can be lowered onto or removed from a plate translation stage (manually or mechanically) within the drawer. A sliding light-tight door in the housing is used to seal the plate introduction apertures from environmental light prior to carrying out luminescence measurements. The housing further includes a detection aperture that is coupled to a light detector mounted on the housing top and one or more plate stackers mounted on the housing top above the plate introduction apertures, wherein the plate stackers are configured to receive or deliver plates to plate elevators within the removable drawer. The removable drawer includes a plate translation stage for translating a plate horizontally in the drawer to zones within the apparatus where specific assay processing and/or detection steps are carried out. The removable drawer also includes one or more plate elevators with a plate lifting platform that can be raised and lowered within the drawer, wherein the plate elevators are positioned below the one or more plate introduction apertures. The plate translation stage is configured to position plates below the detection aperture and to position plates above the plate elevators on the plate lifting platforms.

The apparatus also includes a light detector which is mounted to the detection aperture on the housing top (e.g., via a light-tight connector or baffle). In certain embodiments, the light detector is an imaging light detector such as a CCD camera and may also include a lens. The light detector may be a conventional light detector such as a photodiode, avalanche photodiode, photomultiplier tube, or the like. Suitable light detectors also include arrays of such light detectors. Light detectors that may be used also include imaging systems such as CCD and CMOS cameras. The light detectors may also include lens, light guides, etc. for directing, focusing, and/or imaging light on the detectors. In certain specific embodiments, an imaging system is used to image luminescence from arrays of binding domains in one or more wells of an assay plate and the assay apparatus reports luminescence values for luminescence emitted from individual elements of the arrays. The light detector is mounted on the housing top with a light-tight seal. Additional components of the apparatus include plate contacts for making electrical contact to the plates and providing electrical energy to electrodes in wells positioned under the light detector (e.g., for inducing ECL).

Figure 3A:
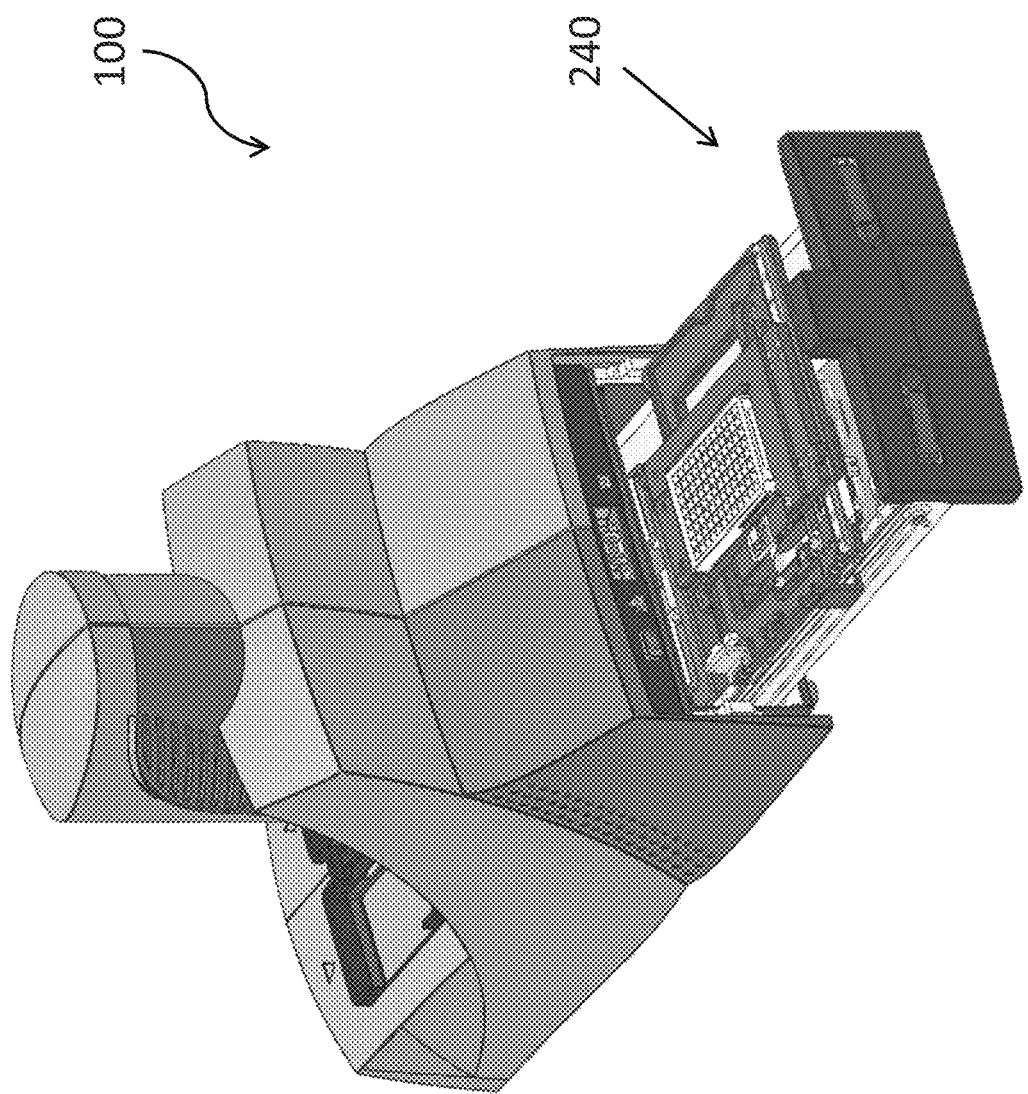
FIG. 3(a) shows a view of the removable drawer of the plate handling subsystem within apparatus 100.
Figure 3B:
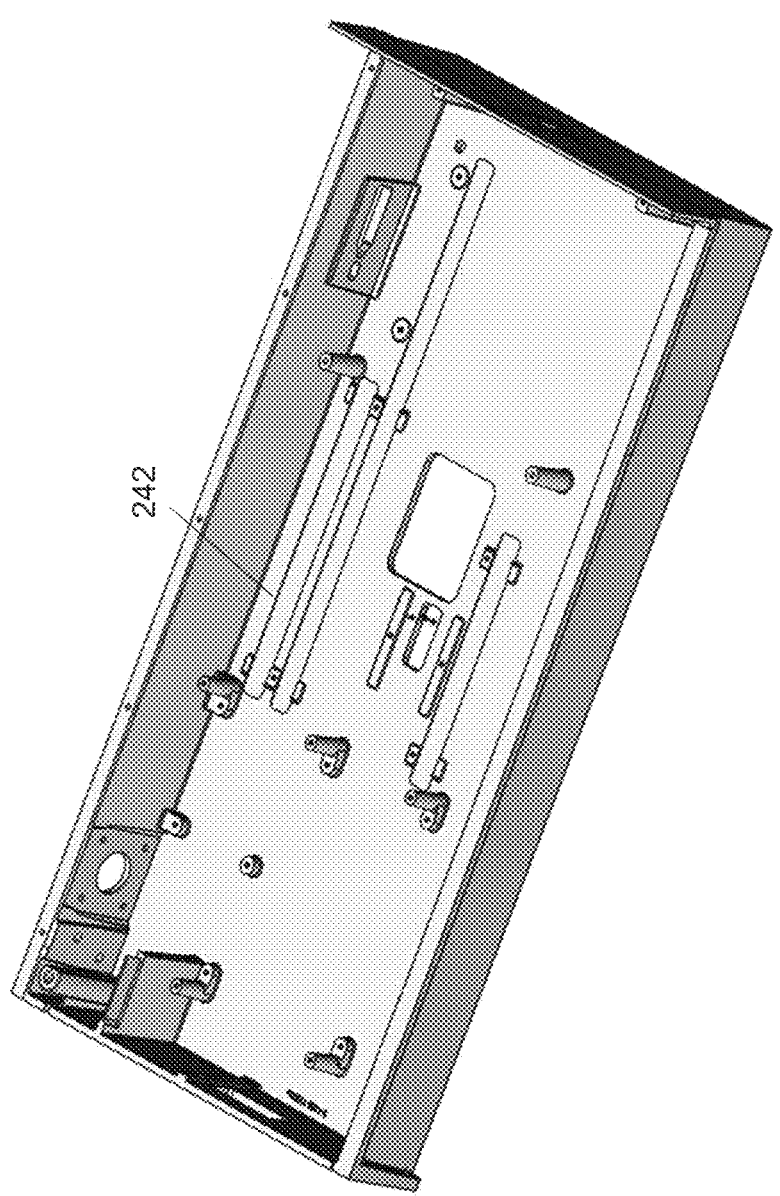
FIG. 3(b) shows a perspective view of a unitary tray supporting the removable drawer.
Figure 4A:
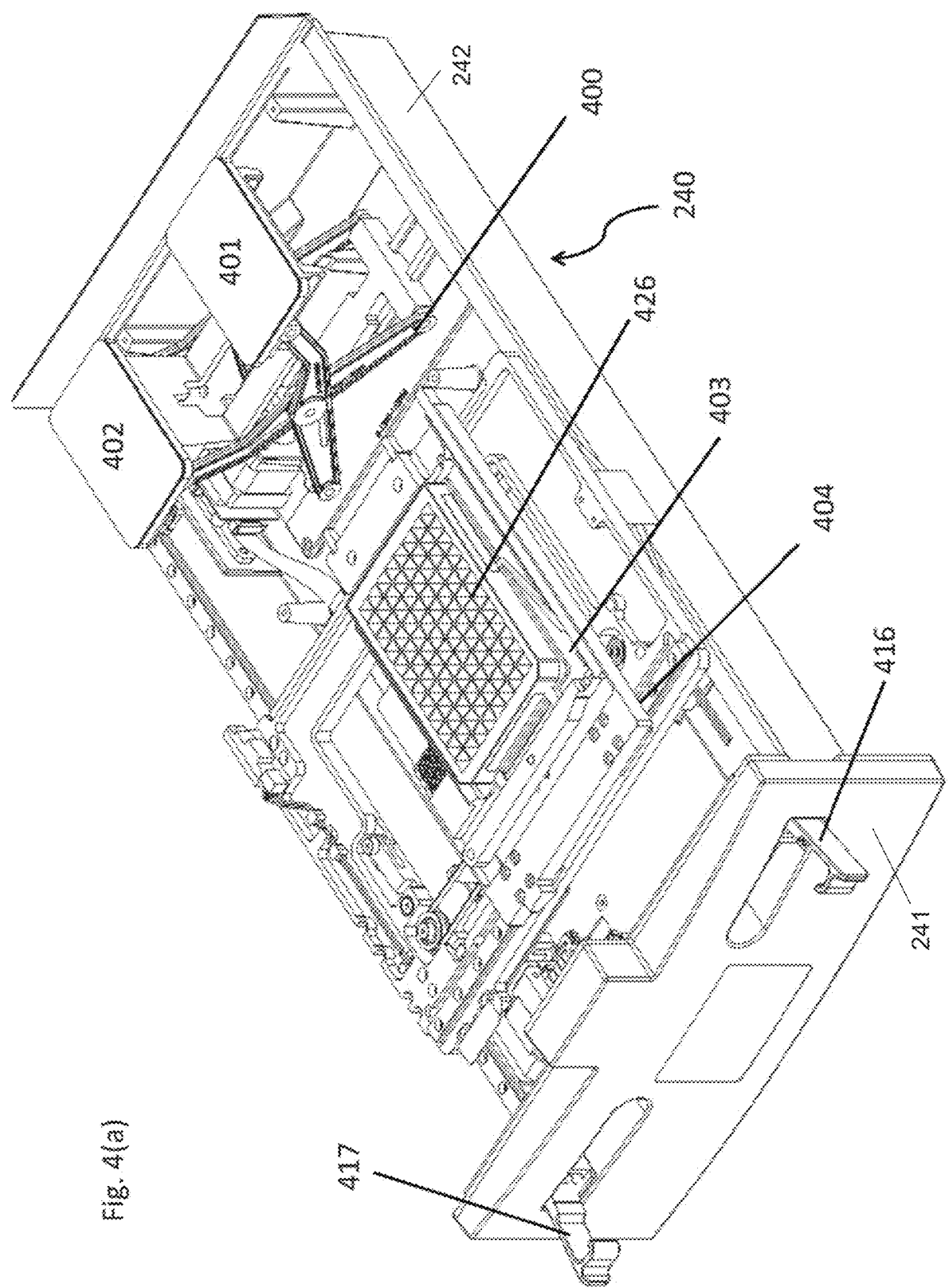
Figure 4B:
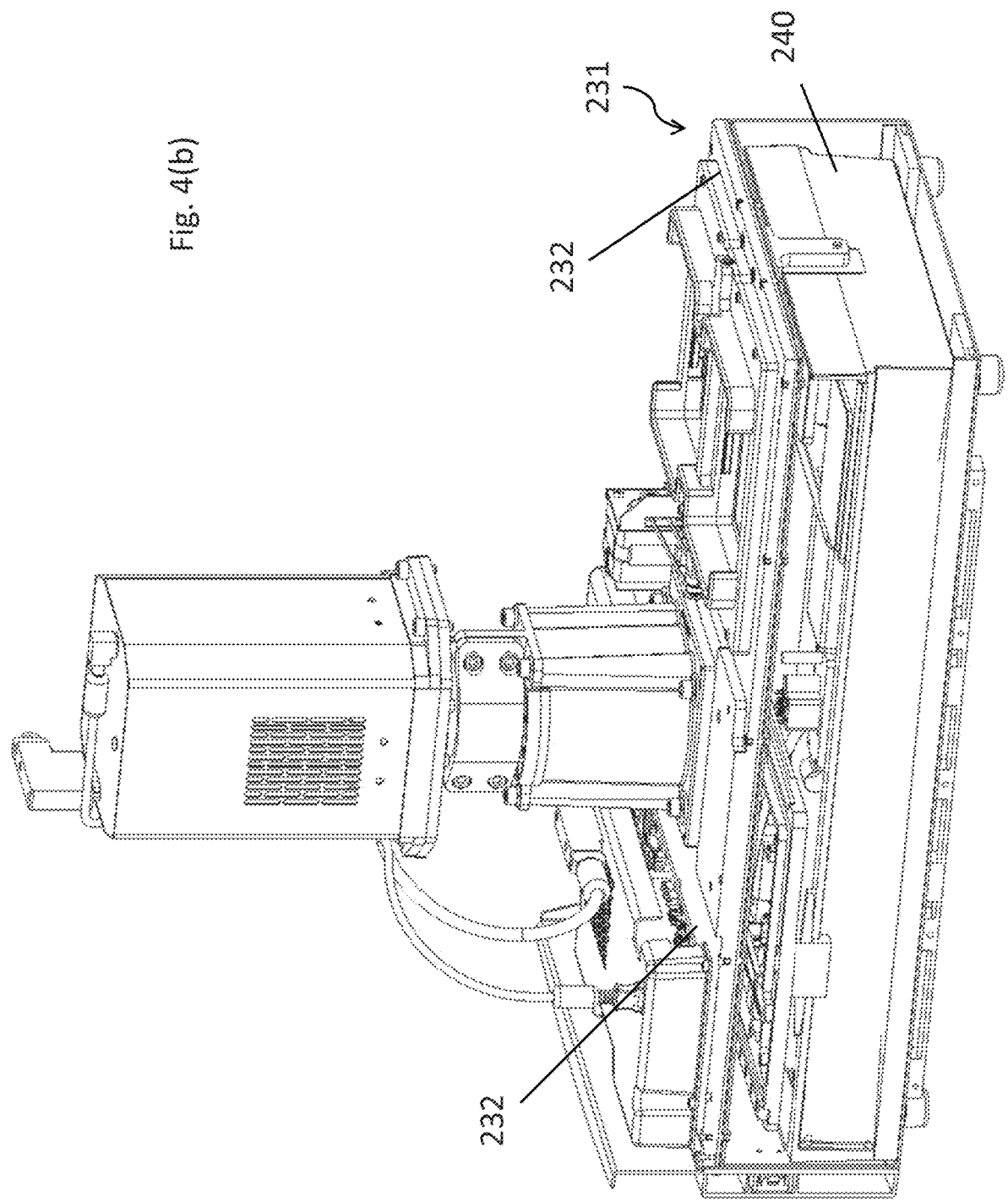

Specific embodiments of the apparatus of the invention are illustrated in the Figures. FIGS. 1(a)-(b) show a front and rear view, respectively, of apparatus 100 with a stylized cover, and FIGS. 1(c)-(d) show the corresponding front and rear views, respectively, of the apparatus without the cover. As shown, e.g., in FIG. 1(c), the apparatus includes a light detection system 110 and a plate handling subsystem 120. A more detailed view is provided in FIGS. 2(a)-(b). The plate handling subsystem 120 includes a light tight enclosure 130 comprising a housing 231 having a housing top 232, housing bottom 233, housing front 234, and housing rear 235. The housing also includes a plurality of alignment features and the housing is adapted to receive a removable drawer 240, as best shown in FIGS. 3(a) and 4(a), comprising a removable drawer 241 front and consisting of a unitary casting element 242, as best shown in FIG. 3(b). Thus, a cost savings can be realized by reducing multiple elements to this single, monolithic structure. The walls of the removable drawer define a rigid x-y subframe, 415 in FIG. 4(d), including a plurality of companion alignment features. When the drawer is properly placed within the housing, the alignment and companion alignment features mate and engage, thereby aligning the drawer and its components with the components of the light detection system. When the alignment/companion alignment features are engaged, the weight of the removable drawer is supported by the housing top. The removable drawer 240 in the apparatus 100 depicted in FIGS. 1(a)-(b) is best shown in FIG. 3(a), being in the partially opened or closed position. Removable drawer 240 is also illustrated in FIG. 4(a) carrying various internal subsystems described in detail below and in FIG. 4(b) being installed within housing 231, where housing rear 235 and a housing side are omitted for clarity. FIG. 4(c) shows housing 231 with an opening and alignment pins 405, 406, and 407 positioned and dimensioned to receive removable drawer 240.

In one embodiment, the plate handling subsystem further comprises a plate sensor configured to detect a plate in the subsystem. The plate sensor may also be capable of detecting the orientation of the assay plate, such as multi-well plate 426. Such plates typically have at least one truncated corner, as illustrated in FIG. 4(a). A plate sensor senses this corner and reports the orientation to the central processor unit or CPU. Instrument 100 can process plates 426 as pre-programmed and the data can be matched to the orientation of the plate. Suitable plate sensors include, but are not limited to a capacitive sensor, contact switch, ultrasonic sensor, weight sensor, or an optical sensor, or a combination thereof. An example, non-limiting plate sensor is the GP2A200LCSOF series manufactured by the Sharp Corporation of Japan. The example sensor is a reflective photo interrupter with the emitter and the detector facing the same direction to provide non-contact sensing.

Figure 2B:
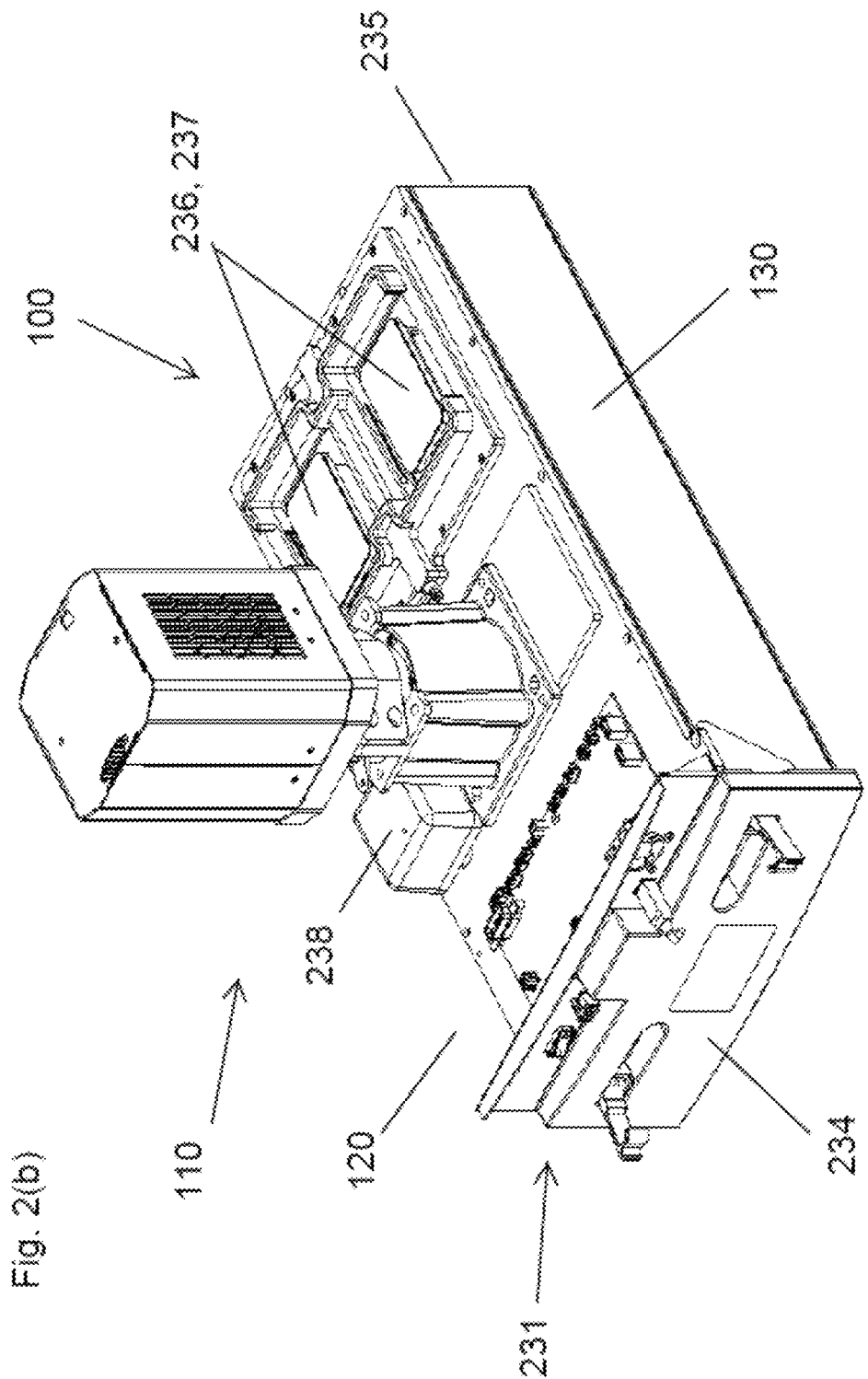

Referring to FIG. 2(a), the housing top 232 also includes one or more plate introduction (and ejection) apertures, 236 and 237, respectively, through which plates are lowered onto or removed from the plate translation stage (manually or mechanically). A sliding light-tight door (shown in FIG. 2(c) as 239) is used to seal the plate introduction apertures 236, 237 from environmental light prior to carrying out luminescence measurements. Moreover, the housing top also includes an identifier controller to read and process data stored to an identifier on the plates. In one embodiment, the identifier controller is a bar code reader (238) mounted via a light-tight seal over an aperture in the housing top, where the bar code reader is configured to read bar codes on plates placed on the plate translation stage within the housing. In an embodiment, the bar code on a plate is read once the plate has been lowered into the drawer. In an alternative or additional embodiment, the plates comprise an EEPROM or an RFID and the housing top and/or drawer includes an identifier controller suitable for communicating with each of these identifiers. In a further additional embodiment, an identifier controller can be provided separately from the apparatus. In this embodiment, information stored to an identifier attached to a plate or associated with a plate or a set of plates is transferred to the apparatus via a computer and/or network attached thereto and/or manually input via a user interface of the computer and/or network. In this regard, reference is made to U.S. Application Publication No. US 2011/0022331 and U.S. Pat. No. 8,770,471, the disclosures of which are incorporated herein by reference.

The plate handling subsystem further includes one or more plate stackers mounted on the housing top 232 above the plate introduction apertures 236, 237, wherein the plate stackers are configured to receive or deliver plates to the plate elevators. Because the plate handling subsystem has the ability to sense the orientation of the plates as described in greater detail above, the plate stackers can accept plates in either the forward or reverse orientation, and subsequently, the plates can be properly read regardless of the orientation. The plate handling subsystem optionally includes a heating and/or cooling mechanism (e.g., a resistance heater, a fan, heat sinks, or a thermoelectric heater/cooler) to maintain temperature of the subsystem under desired conditions. It may also include a humidity control mechanism (e.g., a humidifier and/or dehumidifier, or a desiccant chamber to maintain the humidity of the subsystem under desired conditions.

A detailed view of the removable drawer of the plate handling subsystem is shown in FIG. 4(*a*). The drawer includes (i) a plate elevator 400 with plate lifting platforms, 401 and 402, that can be raised and lowered; and (ii) a plate translation stage 403 for translating a plate in one or more horizontal directions, wherein the stage includes a plate carriage 404 for supporting the plate. The plate carriage 404 may have an opening 420 to allow the plate elevators 400 positioned below the plate carriage 404 to access and lift a plate, and the plate translation stage 403 is configured to position plates below the detection aperture on housing top 232 and below the light detectors within the light detection system 110, and to position the plates above the plate elevators 400. The plate lifting platforms 401, 402 of the plate elevator 400 may include a non-skid surface to prevent shifting of the plate on the plate lifting platform during movement in the apparatus. The plate translation stage 403 has horizontal motions, e.g., motions on a substantially horizontal plane or in an X-direction and Y-direction for translating a plate horizontally in the drawer to one or more regions within the apparatus where specific assay processing and/or detection steps are carried out. In one non-limiting example, as illustrated in FIG. 4(*e*), plate translation stage 403 is movable in one horizontal direction along rail 422, and plate carriage 404 is movable on rail 424 on plate translation stage 403 in an orthogonal horizontal direction. In an embodiment, the plate translation stage has two axes of motion, x and y, and motors coupled to the axes of motion allow for automated movement of plates on the stage.

Stepper motors may be used to move plate translation stage 403 in the X and Y directions. Generally, stepper motors are brushless DC electric motors that divide a full rotation (1 revolution) into a number of equal steps. The motors' positions can be moved and held at one or more equal steps. Although position sensors to sense the angular positions of the stepper motors are optional, rotary encoders may be used to sense the positions of the stepper motors. Generally, a rotary encoder comprises an internal coded disc and a sensing head to sense angular positions. Suitable encoders include quadrature encoders with two inputs and two outputs. The rotary encoders may be non-optical, Hall effect or magnetic encoders to minimize light pollution in the instrument or the light-tight enclosure 130.

To stabilize plate translation stage 403 and plate carriage 404 during their movements horizontally on X-Y frame 415, plate translation stage 403 may have a clip 423 positioned opposite from rail 422, as best shown in FIG. 4(*e*). Clip 423 has two wings 423*a* and an undercut 423*b*. Undercut 423*b* forms an interference with a lip 244 on drawer 240 as shown. Undercut 423*b* and lip 244 prevent plate translation stage 403 from being lifted upward when the contact probes contact multi-well plate 426 from below, as discussed further below. Wings 423*a* rest on top of lip 244 to maintain clip 423 on lip 244. A second clip 425 with similar structures and functions as clip 423 may be provided on plate translation stage 403 opposite to rail 424, as shown in FIGS. 4(*e*)-4(*g*). Clip 425 may be connected to plate carriage 404 and its undercut interferes with a lip on plate translation stage 403 to prevent plate carriage 404 from being lifted. Advantages of using a single rail, e.g., rail 422, and an opposite clip over using two spaced-apart parallel rails include but are not limited to removing the challenging task of aligning two parallel rails and preventing the lifting of the carriage.

The inclusion of a removable drawer 240 in the light-tight enclosure 130 enhances the serviceability and manufacturability of the apparatus. To ensure proper alignment of the drawer 240 within the housing 231 and therefore, proper alignment of the subsystems within the drawer 240 with the light detection system 110, the housing includes a plurality of alignment features and the x-y subframe of the drawer includes a plurality of companion alignment features configured to mate and engage with the alignment features of the housing. A cut-away view of the drawer 240 placed within the housing 231 with housing rear 235 and a housing side omitted for clarity and properly aligned with the light detection system 110 is shown in FIG. 4(*b*).

In an embodiment, the alignment features of drawer 240 comprise a plurality of holes and the corresponding alignment features on housing 231 comprise a plurality of pins sized to fit within the holes. As shown in FIG. 4(*c*), the housing 231 may include at least three alignment pins, pins 405 and 406 being positioned on the housing front 234, and pin 407, which is positioned on the opposite end of the housing. Additional alignment features can be included in the housing and drawer, as necessary. The alignment features may be positioned or calibrated relative to the housing top, such that the weight of the drawer 240 is supported by the housing top 232. The companion alignment features on the drawer that are configured to mate and engage with alignment pins 405, 406, and 407, are shown in FIG. 4(*d*) as holes 408, 409, 410 (in the embodiment shown in FIG. 4(*d*), alignment pin 405 mates and engages with hole 408, pin 406 mates and engages with hole 409, and pin 407 mates and engages with hole 410). In addition, the drawer also includes alignment latches, 416 and 417 (shown in FIG. 4(*a*)) that mate and engage with companion alignment catches, 418 and 419 (FIG. 4(*c*)), to lock/unlock the drawer within the housing.

Due to the alignment pins 405-407 and 408-410 being positioned or calibrated to housing top 232, while removable drawer 240 is inserted into housing 231 guided by X-Y frame 415, after removable drawer 240 is fully inserted into housing 231, the weight of drawer 240 and components thereon are supported by housing top 232. An advantage of this feature is that since light detection system 110 is also mounted on housing top 232 any calibration or alignment of the subsystems on drawer 240 to light detection system 110 can be carried out directly relative to the light detection system 110, without having to taking into account any gap or spacing between drawer 240 and housing top 232.

Figure 4D:
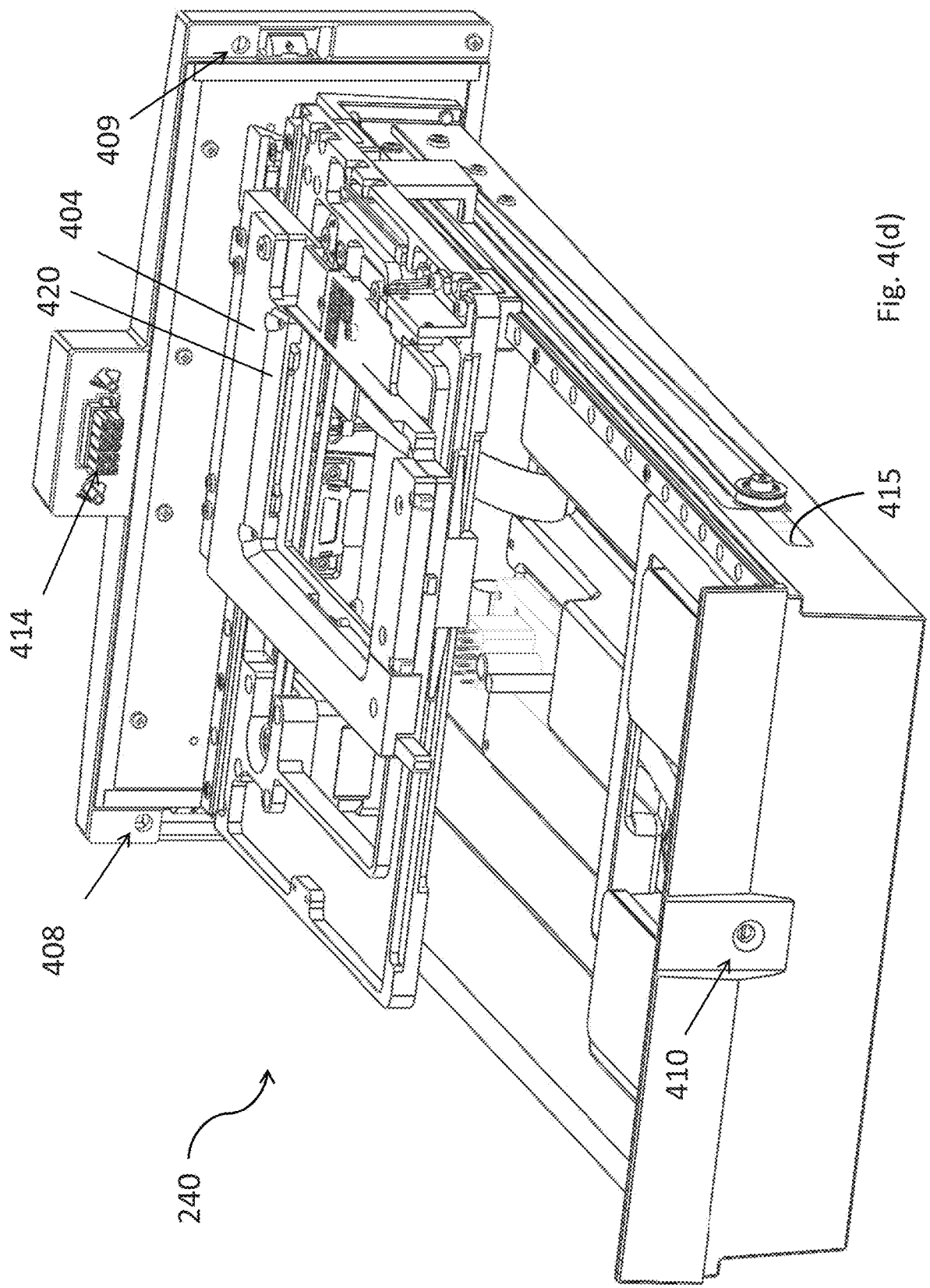
Figure 4E:
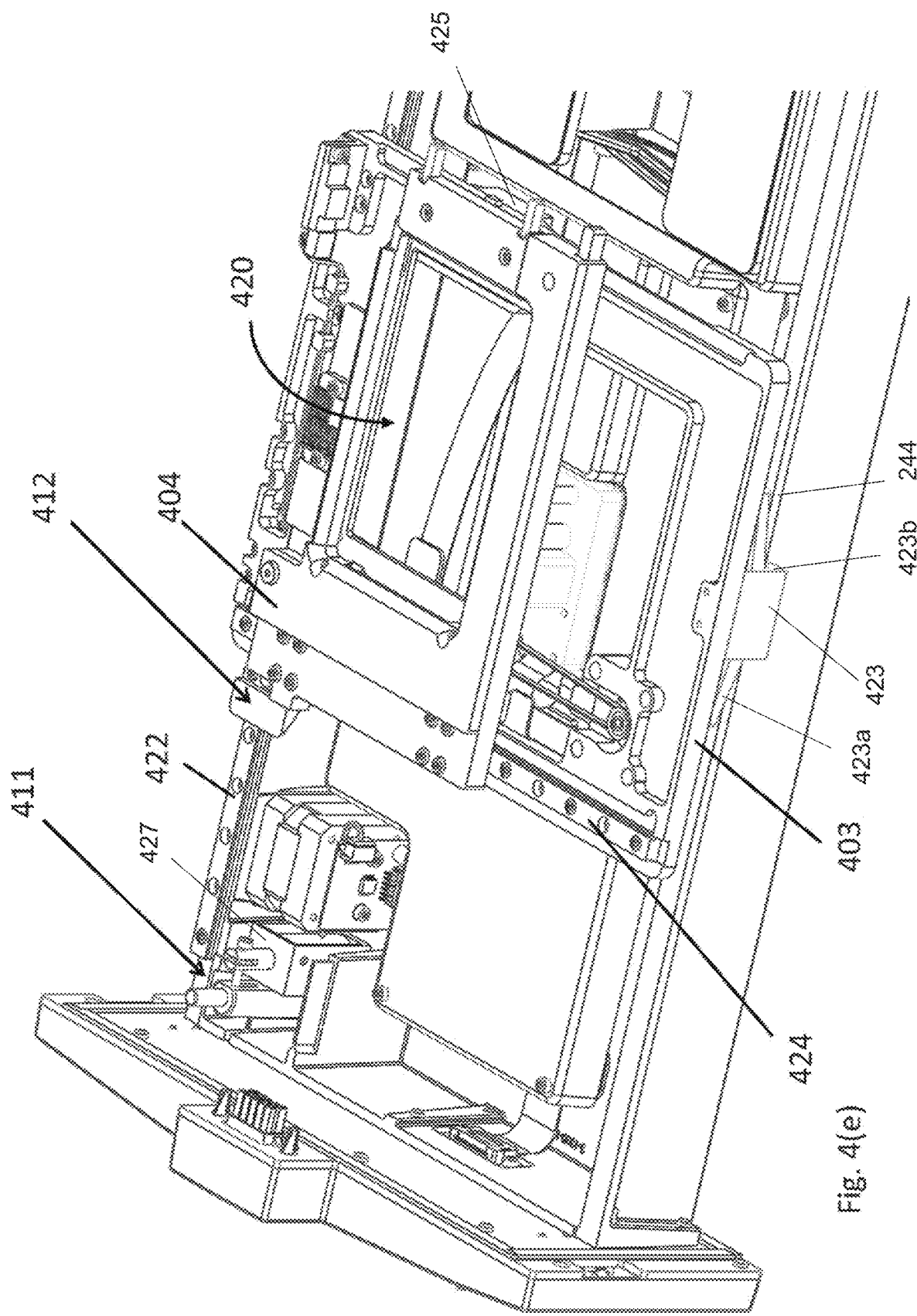
Figure 4F:
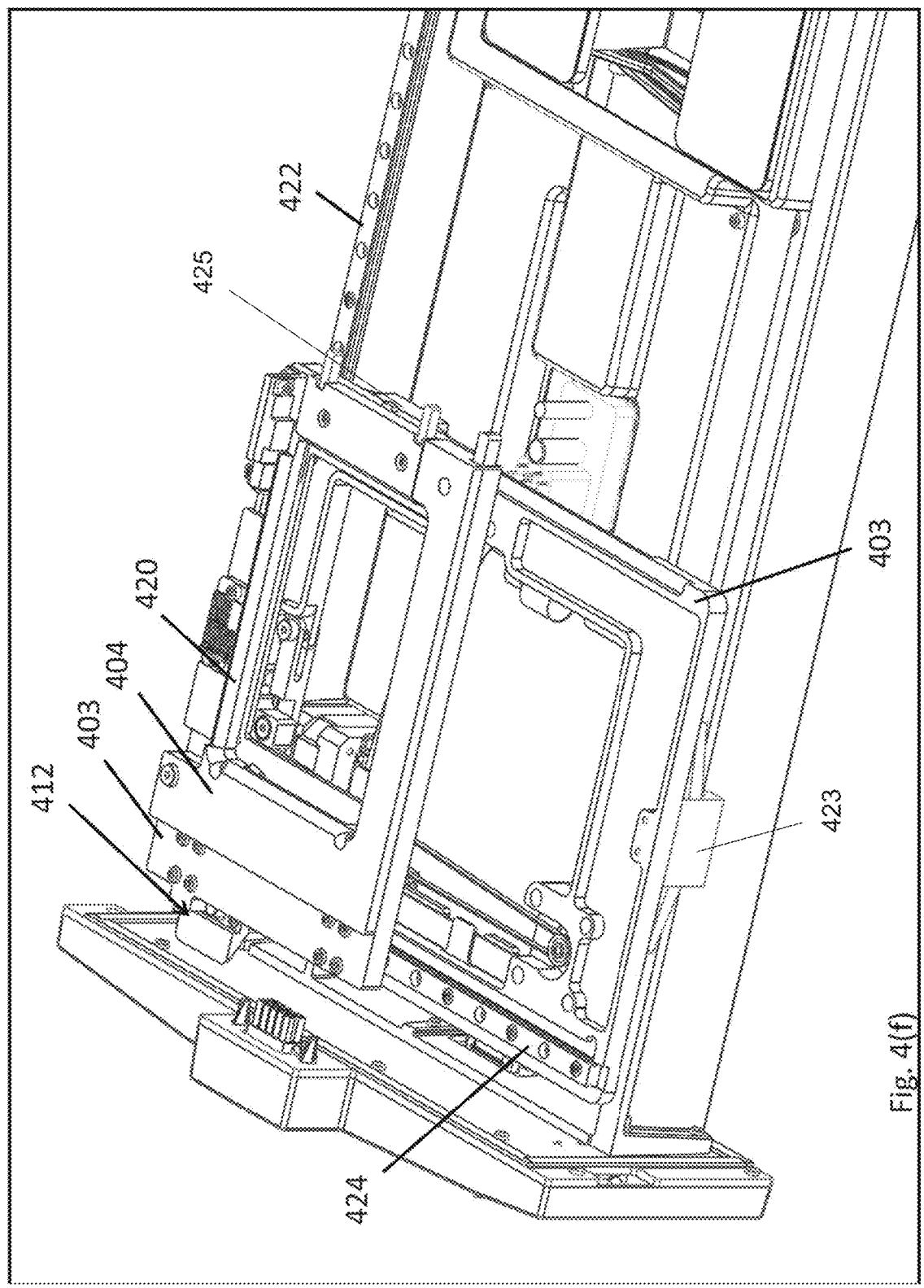
Figure 4G:
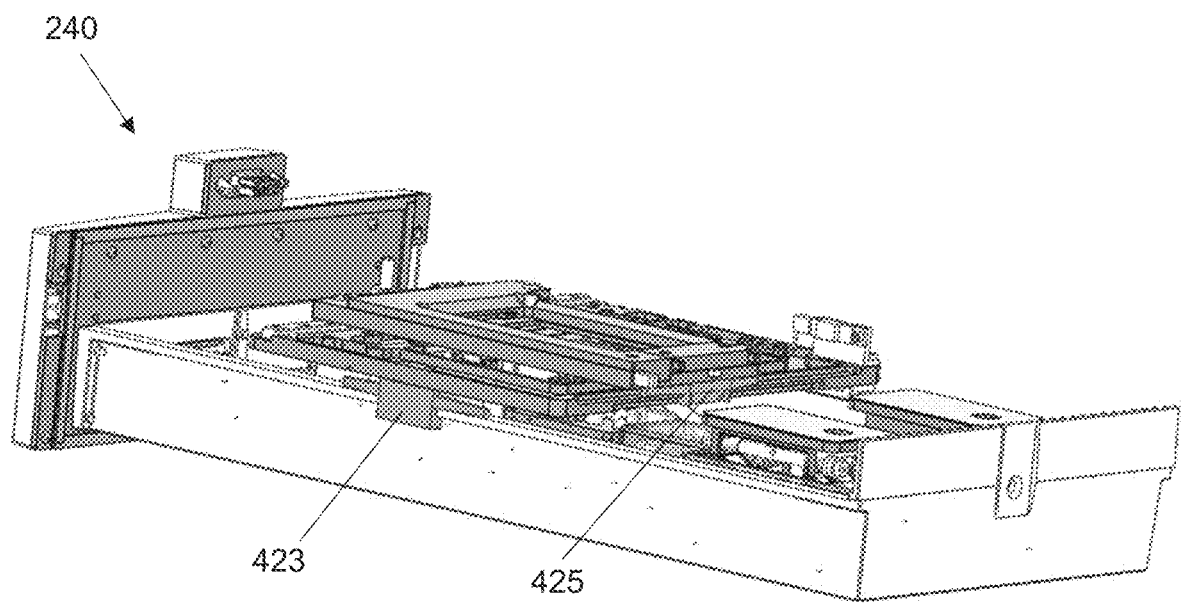

One or more additional engagement/locking features may be included in the housing and/or drawer, for example, as shown in FIG. 4(e), in which spring loaded pin 411 is mounted to the drawer 240 and configured to mate and engage with a hole 412 positioned in the plate translation stage 403. In one embodiment, a solenoid 427 is used to actuate a spring loaded pin, such as pin 411. In the embodiment shown in FIG. 4(f), when the plate carriage and plate translation stage are aligned, the alignment feature in the plate translation stage, e.g., pin 411, mates and engages with a corresponding locking feature in the plate carriage, e.g., hole or element 412, as shown in FIG. 4(f). These alignment and/or engagement features lock the plate carriage in place to protect the subassembly from damage, e.g., during shipping and/or installation.

In a further embodiment, as shown in FIGS. 4(c)-(d), the housing top includes an electrical connection contact mechanism 413, and the drawer front comprises a companion electrical connection, element 414, wherein the electrical connection and its companion are configured to mate and engage with one another upon proper insertion and alignment of the drawer within the housing. Also shown in FIG. 4(c) are electrical wires which connect the optical sensor, such as CCD sensors, or digital camera within light detection system 110. As discussed below, optical sensor 902 is capable of capturing light or ECL emission from a plurality of wells or a sector of wells on multi-well plate 426 and therefore requiring higher current or power. Cables may have a plurality of ferrite beads including a ferrite core and one or more ferrite chokes 418 (as shown in FIG. 4(c)). Ferrite cores are ceramic and have high magnetic permeability. Ferrite chokes are similar to ferrite cores and are also passive electric elements made from ferrite that suppress high-frequency noise from transmitting through cables. Typically, ferrite chokes have cylindrical or truncated conical shape and a pair of chokes are present in the electrical wires, as shown in FIG. 4(c).

Figure 5B:
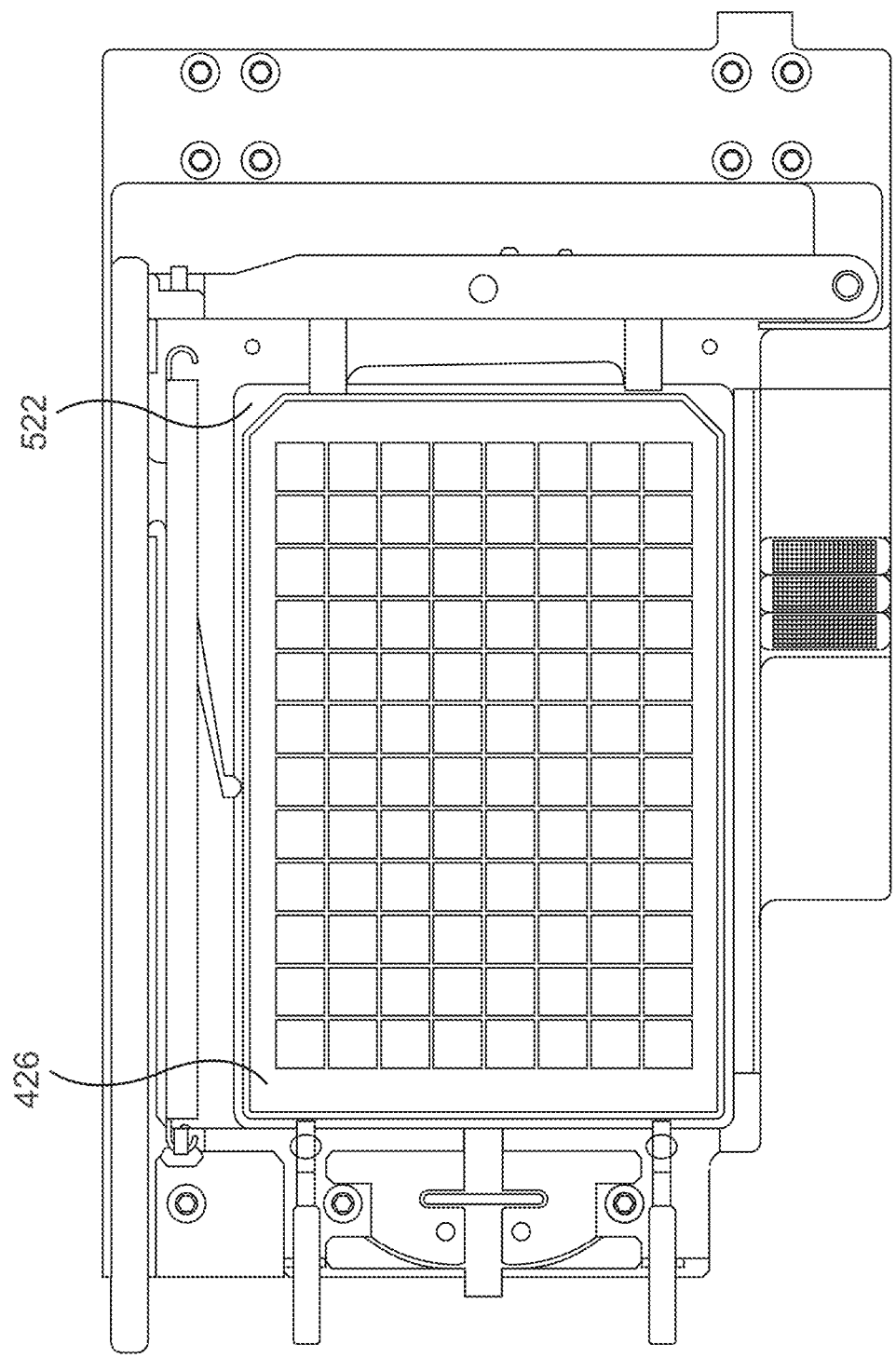
FIGS. 5(a)-(o) show detailed views of the plate carriage and plate latching mechanism.

Referring to FIG. 4(a), in an embodiment, the plate carriage may include a plate carriage 404 and a plate latching mechanism configured to receive and engage an exemplary plate hereinafter labeled as 426 placed on the plate carriage 404, as shown in FIG. 5(a)-(b) (FIG. 5(a) shows a view of the plate carriage with a multi-well plate 426 locked in place and FIG. 5(b) shows the same view with the components of the plate latching mechanism visible and engaged with the plate in a locked position). As shown in FIG. 5(b), the outside edges of the plate follow a standard design convention for multi-well plates and include a skirt 522 that surrounds and is at a height lower than the walls of the plate (an enlarged view is shown in FIG. 5(o)). In other words, skirt 522 is positioned proximate the bottom of multi-well plate 426. The plate latching mechanism is designed to push the outside edge of the skirt on two orthogonal sides of the plate against two corresponding physical stops in the plate carriage, to provide a defined and reproducible positioning of the plate in the carriage. The plate latching mechanism is also designed to apply a downward physical force in defined locations on the top of the plate skirt to hold the plate reproducibly and fixedly in the vertical dimension.

A view of the plate carriage 404 and plate latching mechanism with a multi-well plate 426 is shown in FIG. 5(a)-(b). A sequence illustrating the operations of the plate latching mechanism is shown in FIGS. 5(c)-5(f) and discussed below. In a specific embodiment, the plate carriage 404 supports a multi-well plate 426 (or a consumable having the same footprint and external physical geometry as a multi-well/microtitre plate configured for use in an apparatus as described herein) having at least a first, second, third and fourth side and wherein the first and third sides are substantially parallel to each other and the second and fourth sides are substantially parallel to each other. The plate carriage 404 defines an opening 420 having a shape substantially the same as the multi-well plate 426 and having dimensions smaller than the multi-well plate to support a skirt or ledge 522 positioned around a perimeter of the multi-well plate 426. The plate carriage further includes a first (501) and second (513) stop surface that when the multi-well plate 426 is fully latched, define the horizontal positions of the skirt 522 on first and second sides of the multi-well plate, respectively. The plate latching mechanism is movable from an open configuration, as best shown in FIGS. 5(i) and 5(j) to accept a multi-well plate 426 to a clamping configuration to latch the plate to the plate carriage, as best shown in FIGS. 5(a) and 5(b).

The plate latching mechanism includes (i) a first latch member (509) biased to the clamping position and consisting of a pedal 511, an actuating rod 510, and a spring 512, which provides the biasing force and may have a high spring force. The pedal (511) is adapted to push the first side of the multi-well plate 426 toward the first stop 501 and a plate clamp arm (502) also biased to the clamping position by spring 512, wherein the first latch member (509) is connected to the plate clamp arm (502). The plate latching mechanism further includes (ii) a bracket (503) pivotally connected to the plate clamp arm (502) and adapted to push the second side of multi-well plate 426 toward the second stop (513). The plate latching mechanism also comprises (iii) at least one biased clamp (515) positioned proximate to second stop (513) to clamp to the skirt 522 of the multi-well plate 426 to the plate carriage 404, thereby preventing vertical motion. Biased clamp 515 engages with the plate skirt and applies a downward force on the skirt of the plate. The bracket (503) may include at least two legs (504, 506) and both are in contact with the fourth side of the multi-well plate. At least one leg (504, 506) comprises a ramp (507, 508) to apply both sideways force towards the second stop and downward force on the skirt of the multi-well plate (as shown in FIGS. 5(e)-(i)).

Figure 5C:
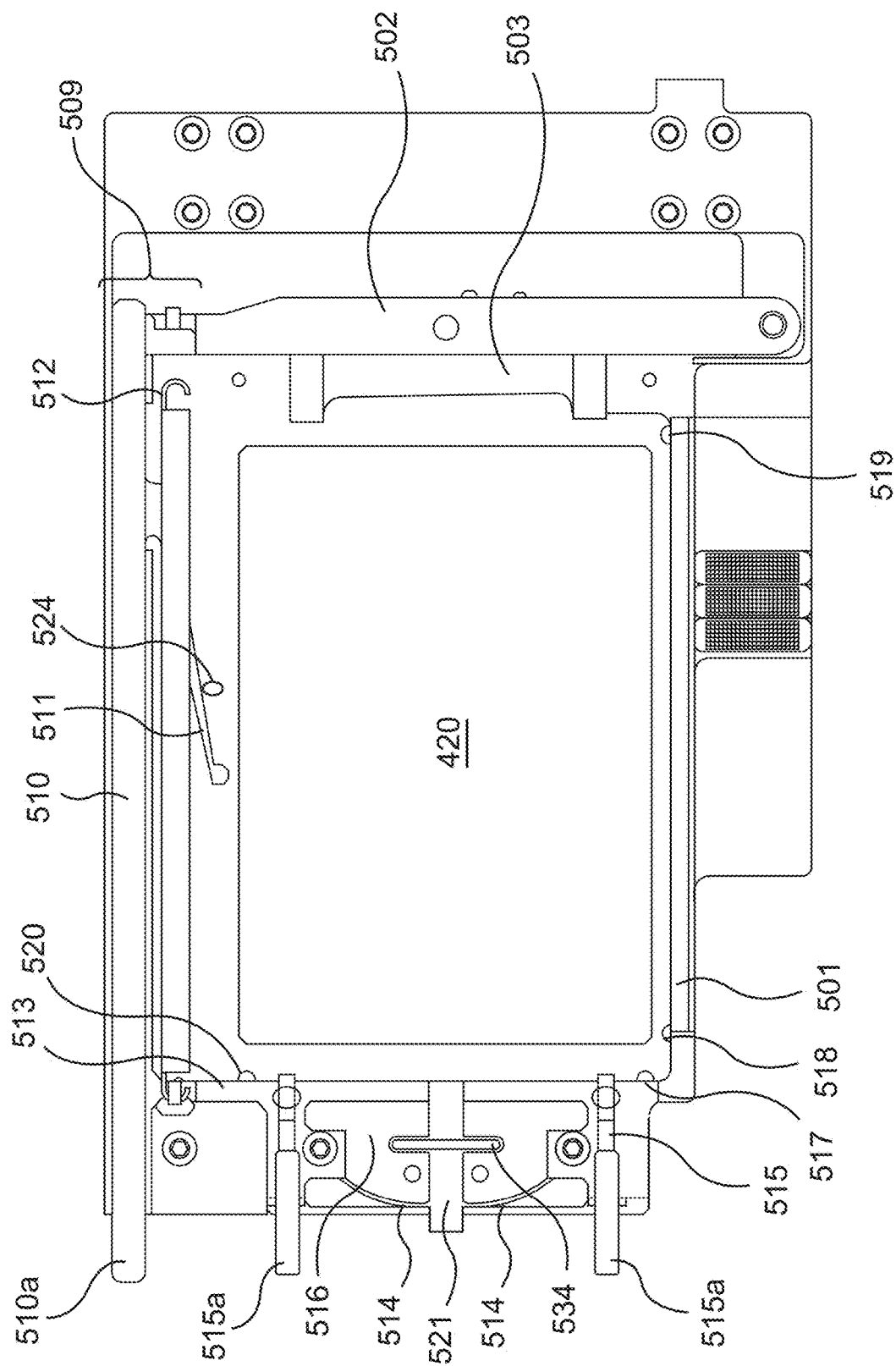
Figure 5D:
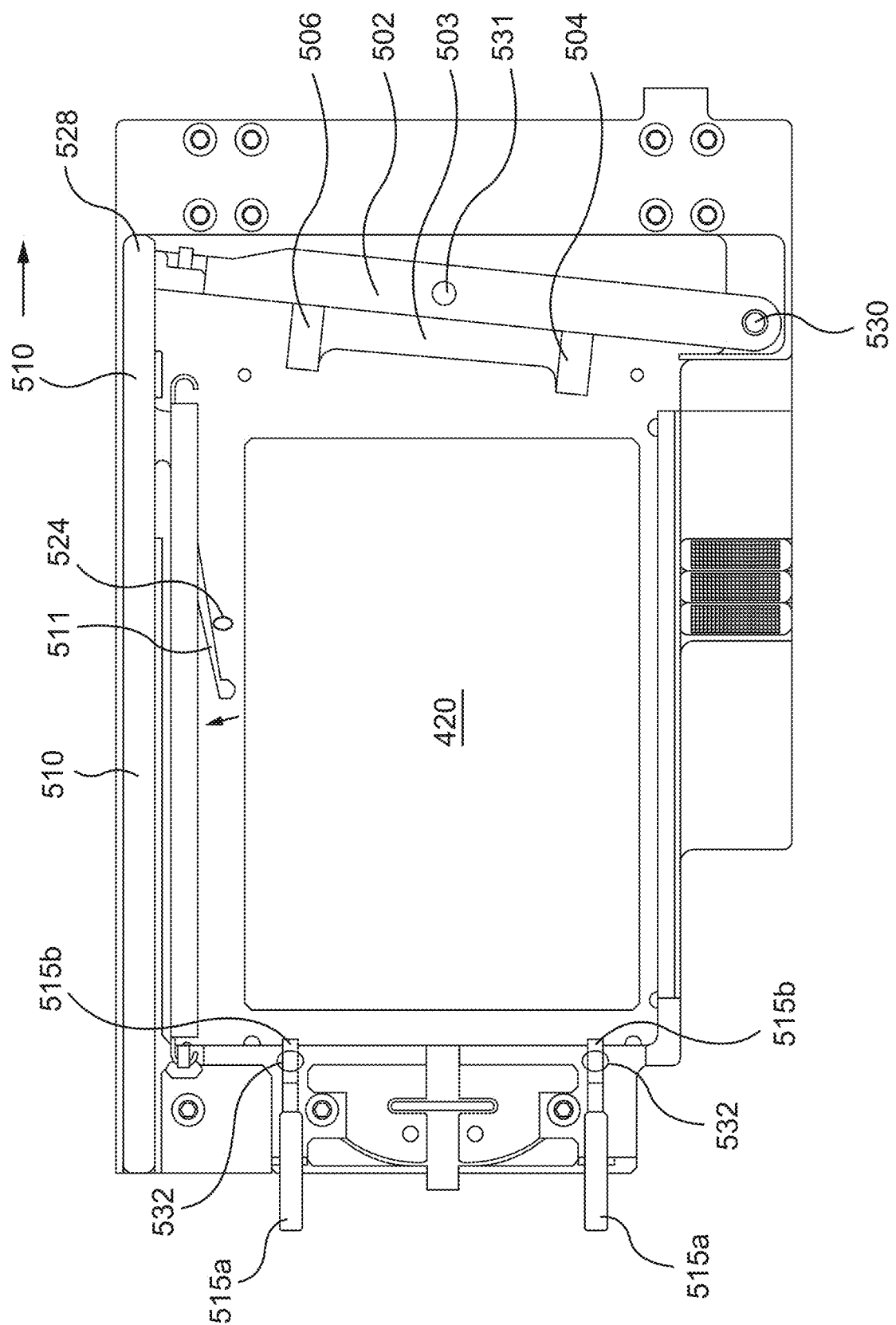
Figure 5G:
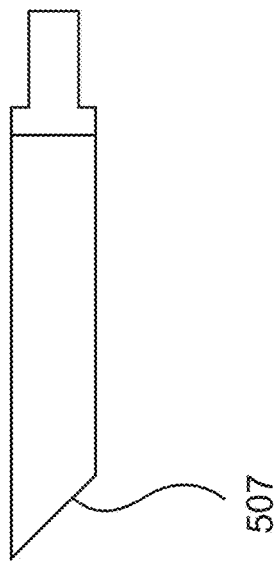
Figure 5H:
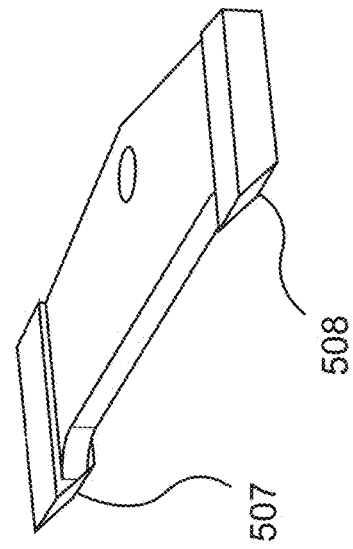
Figure 5E:
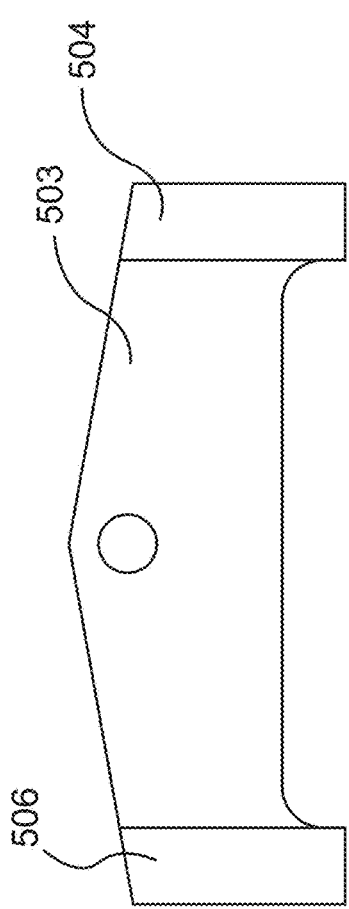
Figure 5F:
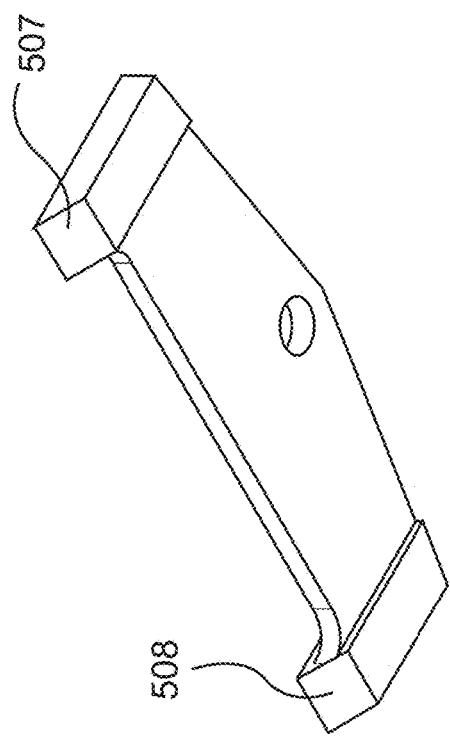
Figure 5I:
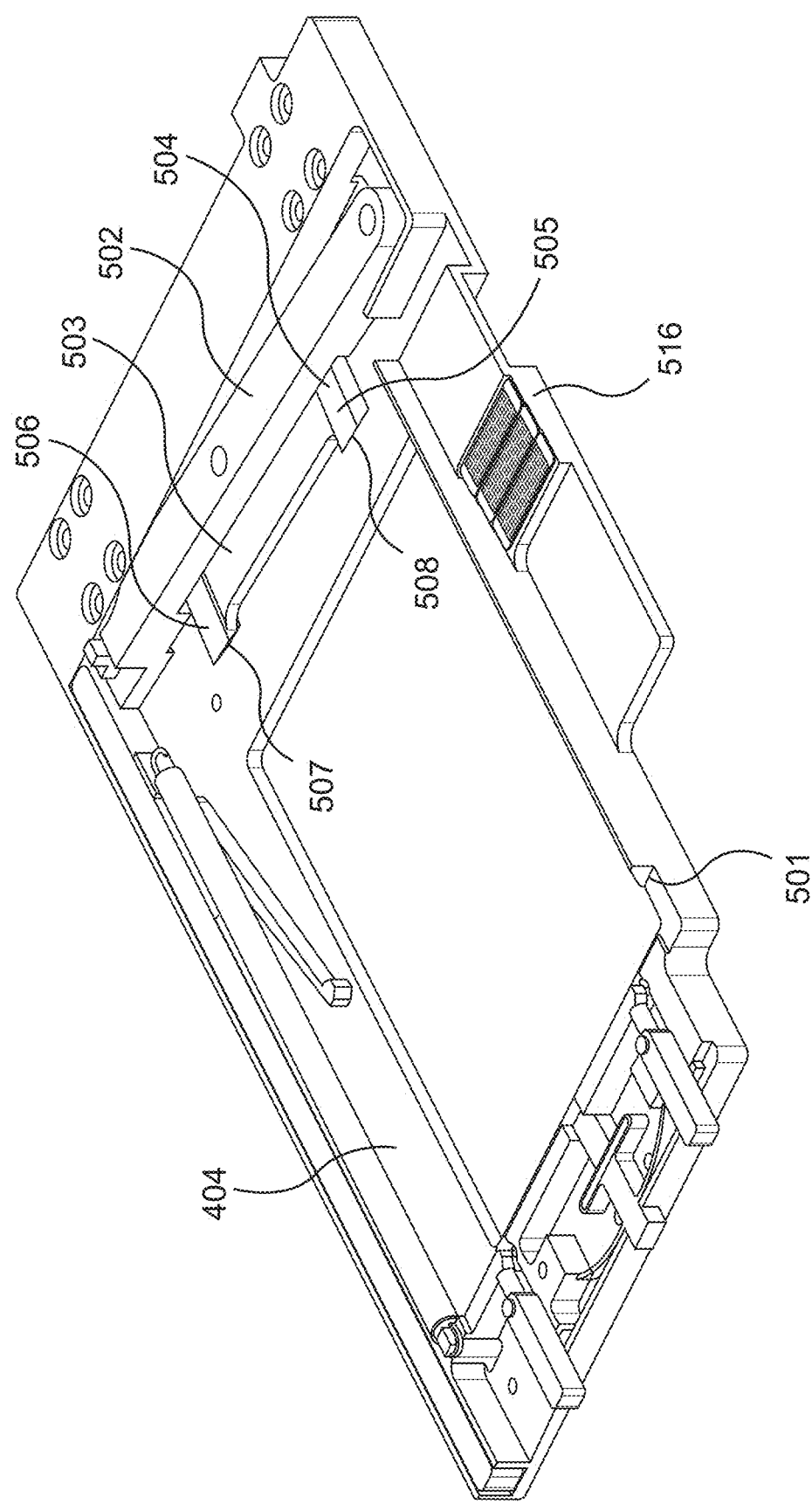
Figure 5I:
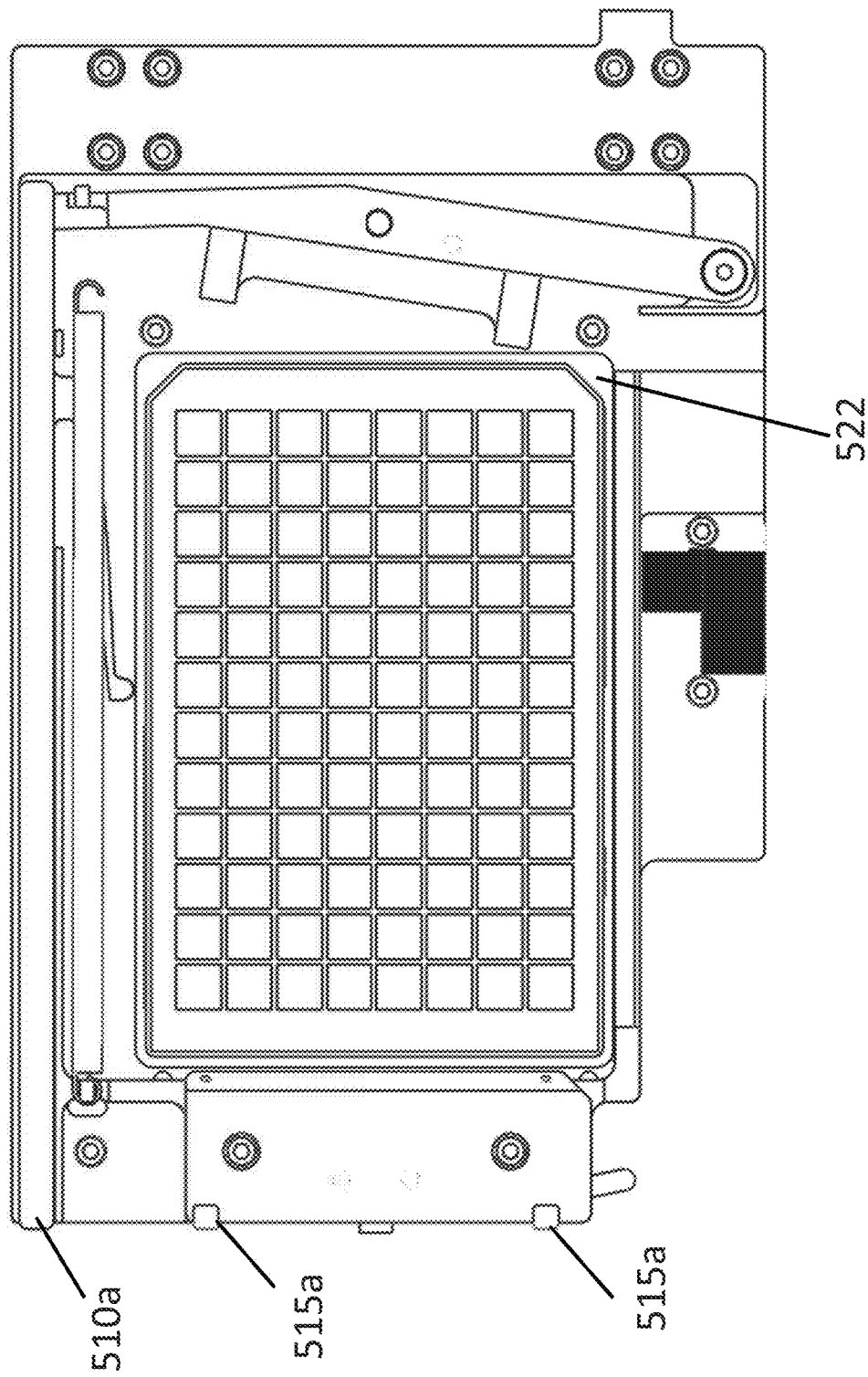

The first latching member 509 includes an actuating rod (510), which is biased to the clamping position by a spring (512) and in the clamping position extends past one edge of the plate carriage (as shown in FIG. 5(c). During loading and unloading of plates, as the plate carriage 404 is moved into alignment with a plate elevator, the extended portion 510a of actuating rod (510) is pushed against a physical stop in the housing, e.g., the rear wall of drawer 240 or housing rear 235, which pushes extended portion 510a of rod (510) into the carriage, as best shown in FIG. 5(d) where rod 510 is not yet engaged and FIG. 5(e) where rod 510 is pushed. It is noted that when plate carriage 404 is moved against the physical stop, rod 510 and both biased clamps 515 are pushed, FIGS. 5(d) and 5(i) only show the retraction of rod 510 for clarity. The movement of rod (510) forces the pedal 511 to retract toward rod 510 to make room for multi-well plate 426. As shown in FIG. 5(c), pedal 511 is a cantilever type arm that is attached to rod 510 and has the ability to flex like a spring. A fulcrum 524 fixedly attached to plate carriage 404 forces pedal 511 to retract or move in the direction of the arrow shown in FIG. 5(d) as rod 510 is pushed inward. Fulcrum 524 can also be located on the sheath 526 that covers first latch member 509, as best shown in FIG. 5(a). Plate clamp arm 502 may be connected pivotally at one end 528 to rod 510 and may be connected pivotally at the opposite end 530 to plate carriage 404. Bracket 503 is pivotally connected to plate clamp arm 502 at pivot point 531. As best shown in FIG. 5(d), as rod 510 is pushed inward pedal 511 and plate clamp arm 502 with bracket 503 are retracted or moved away from opening 420.

An advantage of connecting bracket 503 pivotally to plate clamp arm 502 is that bracket 503 can rotate, preferably slightly relative to plate clamp arm 502, so that both legs 504 and 506 of bracket 503 can make contact with multi-well plate 426 during the latching process.

As discussed above, when plate carriage 404 is moved against the physical stop, rod 510 and both biased clamps 515 are pushed. As extended portions 515a of biased clamp 515 are pushed inward, this action lifts the biased end 515b upward against the force of spring 532. As biased end 515b is lifted into an open position, it is sized and dimensioned to accept skirt 522 of multi-well plate 426, and as biased clamp 515 is released spring 532 forces biased end 515b downward and clamp onto skirt 522 to hold multi-well plate 426 against upward motions.

The apparatus further comprises an ejector (516) to release multi-well plate 426 from the latching mechanism. Ejector 516 has an extended actuating element (521) and like actuating rod (510) also is pushed against a stop in the instrument as the plate carriage is placed in alignment with the plate elevators, such that the ejector moves the multi-well plate 426 away from the second stop 513. The ejector 516 may be spring-loaded by springs 514 and it optionally includes an over-travel preventer 534. Ejector 516 when activated pushes multi-well plate 426 away from stop 513, and when ejector 516 is activated rod 510 and biased clamps 515 are also moved to the open position, so that multi-well plate 426 can be pushed away from stop 513 and biased claim ends 515b. Over-travel preventer 534 can elastically deform to absorb some of the motion of ejector Movement of the carriage plate 404 away from the plate loading/unloading position (i.e., in alignment with the plate elevators), reverses them movement of rod (510) and ejector (516) and resets the latching mechanism into the latched configuration.

Engagement of a multi-well plate 426 with the plate latching mechanism to lock the multi-well plate 426 in the plate carriage 404 is illustrated in FIGS. 5(i)-(m). FIG. 5(i) is similar to FIG. 5(d) showing the first latch member 509 with pedal 511 retracted and plate clamp arm 502/bracket 503 in the open position. The latching mechanism remains unengaged and in the open position in FIG. 5(j), allowing a multi-well plate 426 to be placed over opening 420 within the plate carriage 404. In the open configuration depicted in FIG. 5(j), pedal 511, plate clamp arm 502, bracket 503 and biased clamp 515 are biased away from opening 420 to allow a multi-well plate 426 to be loaded into the plate carriage 404. As shown in FIG. 5(j), extended portions 510a and 515a are all pushed inward by motion of plate carriage 404 against a back stop such as the back side of drawer 240 or housing rear 235.

Figure 5K:
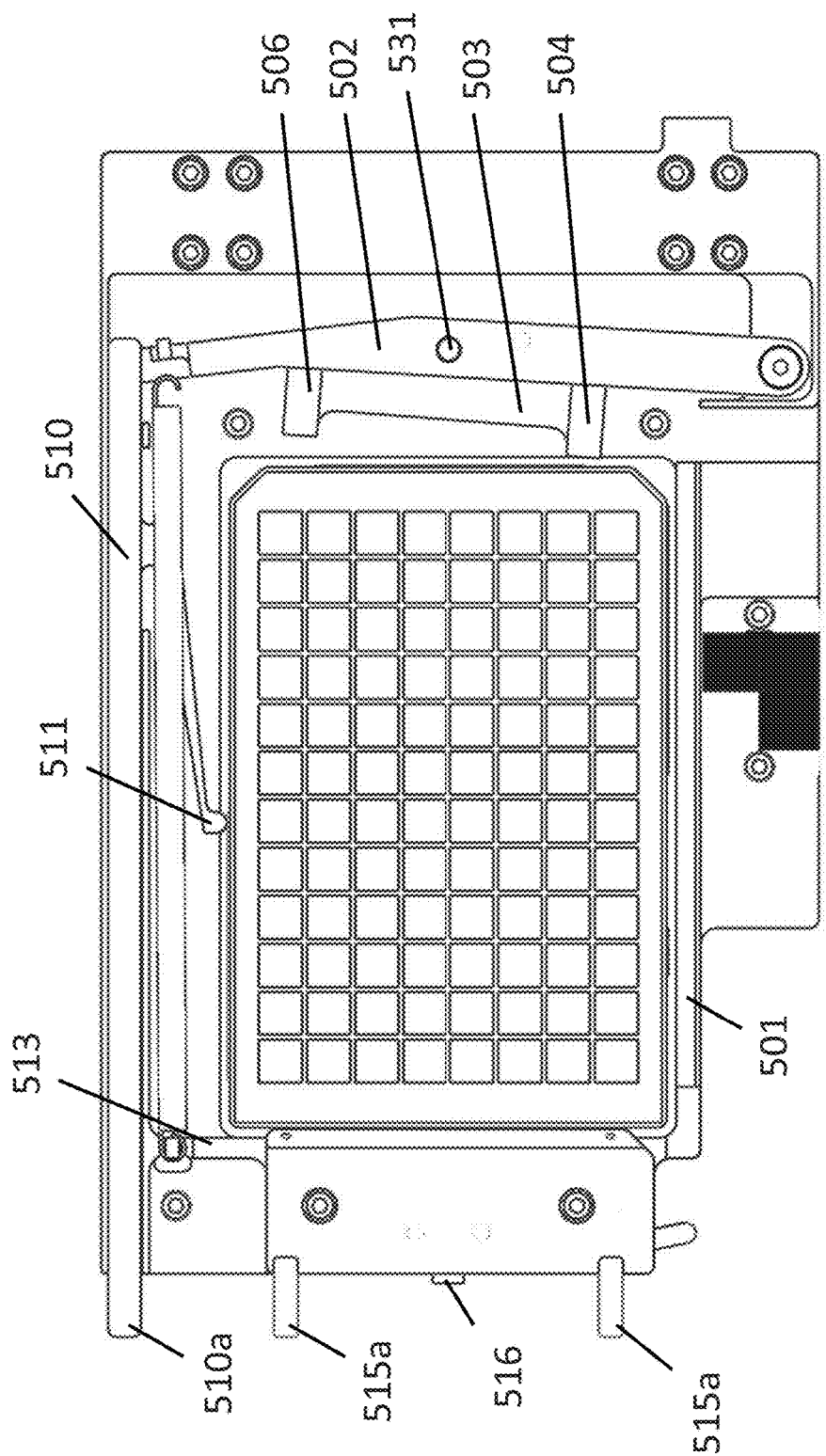
Figure 5M:
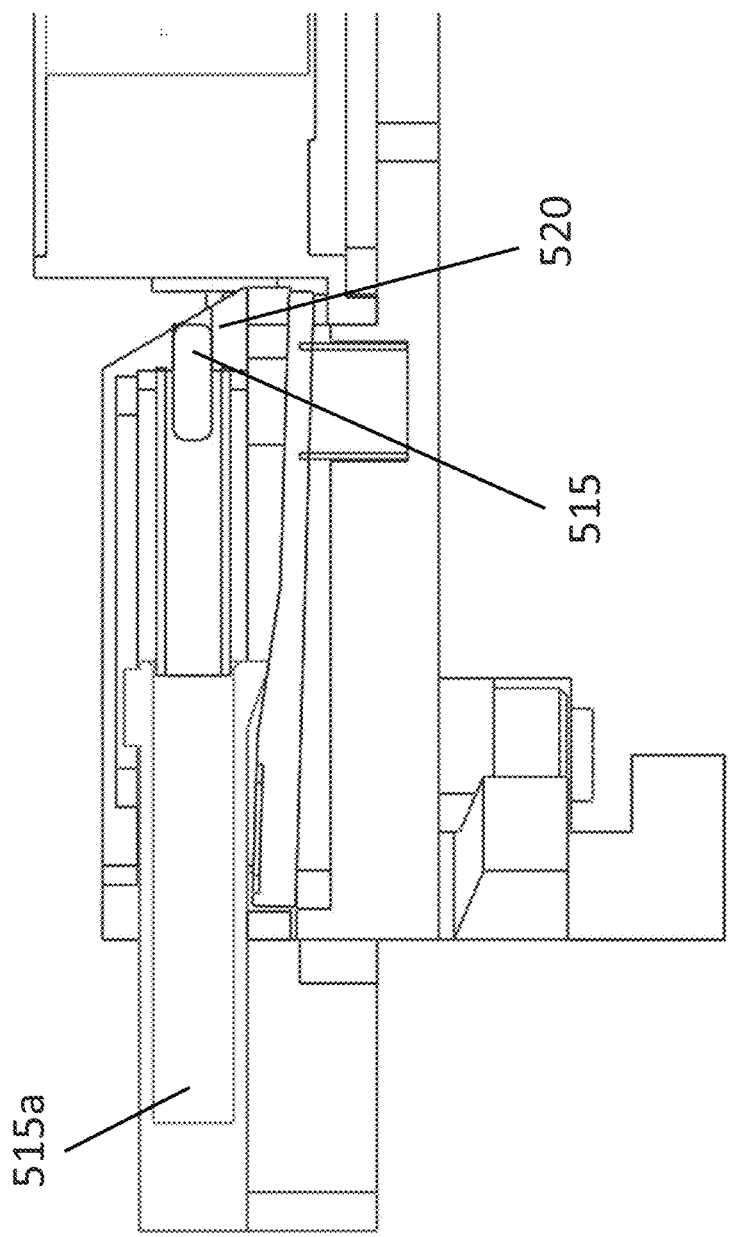

When a multi-well plate 426 is placed into the plate carriage 404 as shown in FIG. 5(k) and plate carriage 404 moves away from the back stop, pedal 511 moving away from fulcrum 524 and outward to push and bias multi-well plate 426 against first stop 501. Plate clamp arm 502 also moves with rod 510, allowing bracket 503 to push multi-well plate 426 against second stop 513. As shown in FIG. 5(k), only leg 504 is contacting multi-well plate 426; however, due to the pivoting connection at pivot point 531, second leg 506 would automatically and quickly contact multi-well plate 426 as bracket 503 rotates about pivot point 531. Biased clamp 515, which may be spring loaded by springs 532, engages the plate skirt 522 of the multi-well plate 426 on the second side of the plate as shown in FIG. 5(l), bracket 503 also engages with and pushes down on the plate skirt 522. As discussed above, legs 504 and 506 of bracket 503 has ramp 507, 508 and angled as shown. As legs 504 and 506 pushes multi-well plate 426, ramp 507, 508 contact skirt 522 and pushes multi-well plate 426 in two directions: toward second stop 513 and downward. As shown in FIG. 5(m), biased clamp 515, engages with plate skirt 522.

In an embodiment the plate carriage 404 also includes an optical focusing mechanism used by an optical sensor in the apparatus, such as the light detectors within light detection system 110 described above to measure contrast and focus. The optical focusing mechanism includes at least two, or at least three, patterned surfaces at different heights relative to the plate carriage and, consequently, to a target surface for focusing (i.e., the bottom of the wells of a 96-well plate 426 held in the plate carriage 404). The invention includes a method for imaging the plurality of surfaces and based on the image, calculating the magnitude and direction of the image adjustment needed to bring the target surface into focus. In one embodiment, contrast values are calculated for the image of each surface and the focus height is determined as the height at which the change in contrast with change in height is minimized or, alternatively, falls below a predetermined threshold value.

Figure 6B:
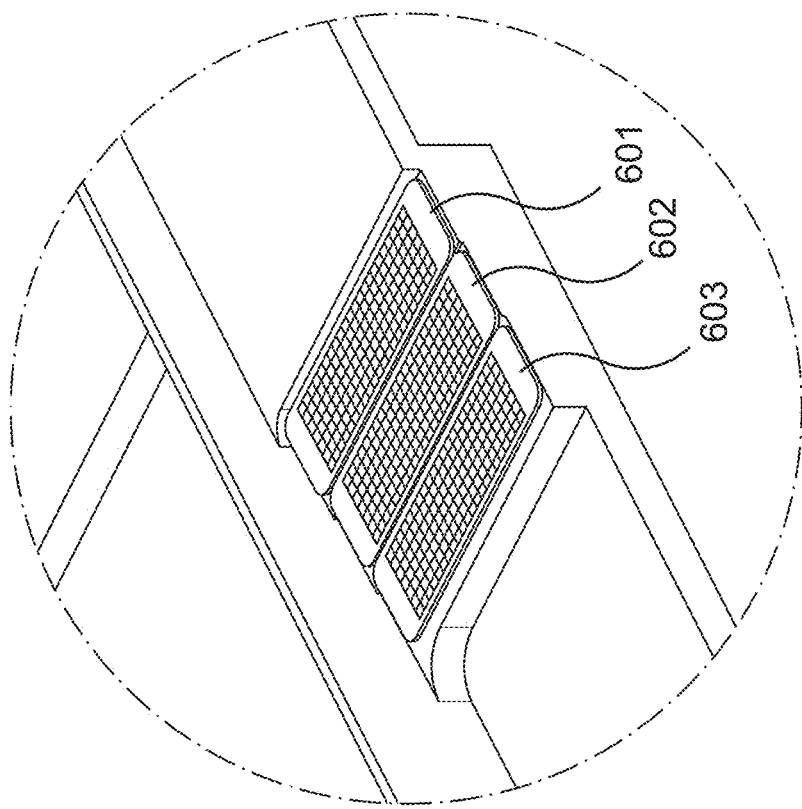
FIGS. 6(a)-(b) show two alternative embodiments of an optical focusing mechanism that can be incorporated into the apparatus.
Figure 6A:
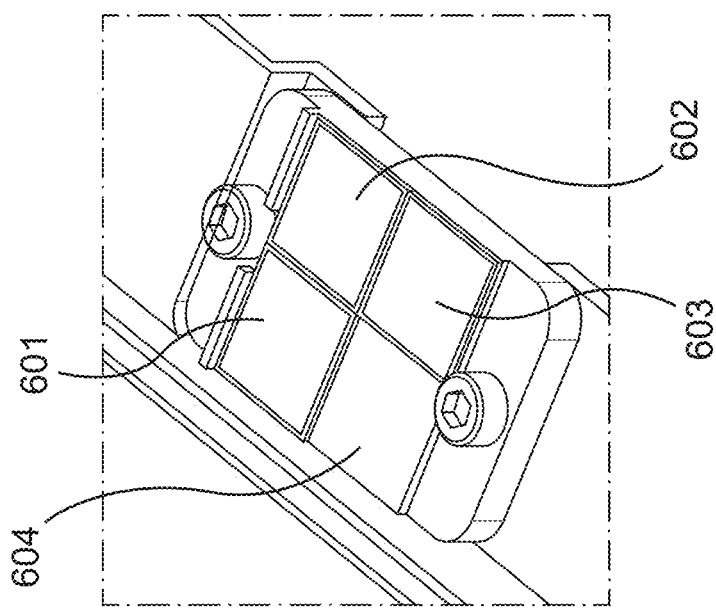

In an embodiment, the plate carriage includes at least three patterned surfaces each at differing heights relative to the plate carriage. Two additional embodiments of an optical focusing mechanism are shown in FIG. 6(a)-(b). In certain embodiments the surfaces have patterns of differential transparency (e.g., patterns etched or cut into a non-transparent substrate or a patterned non-transparent ink or film printed on a transparent surface) so that the pattern can be imaged using light transmitted through the substrate. In further embodiments, the surfaces/patterns are not transparent and the patterns are imaged using a light source that reflects light off the surface.

The focusing mechanism includes at least a higher, middle and lower patterned surface spaced apart from the optical sensor, wherein the middle patterned surface and the target surface are aligned to substantially the same planar level, wherein a first distance between the higher and middle patterned surfaces and a second distance between the middle surface and lower patterned surface are substantially equal, and wherein the optical sensor and the patterned surfaces are moved relative to each other until a difference between a first pair of contrast values between the higher and middle pattern and a second pair of contrast values between the middle pattern and the lower pattern is less than a predetermined value of about ±2.0 dimensionless units, as explained below. This difference may be ±3.0 or ±4.0, or as low as ±1.0. Higher value of contrast differences allow easier but less accurate focusing, and lower value of contrast differences yields more difficult but more accurate focusing.

As shown in FIGS. 6(a)-(b), the mechanism may include a plurality of patterned surfaces, e.g., at least two and optionally three patterned surfaces (601-603), and the patterned surfaces comprise substantially the same pattern, e.g., a grid pattern. The patterned surfaces may be adjacent to one another in a grouping. In the embodiment shown in FIG. 6(a), the mechanism also includes an unpatterned surface 604. Each of the patterned surfaces may be located on parallel planar planes. In an embodiment, the middle-patterned surface is at a height effectively equivalent to a focus position of a well in multi-well plate 426 filled with a predetermined amount of fluid. The lower patterned surface is at a height that is about 0.25 mm below the middle-patterned surface and the upper patterned surface is at a height that is about 0.25 mm above the middle-patterned surface. In an embodiment, the lower patterned surface is at a height of about 4-4.75 mm above the plate carriage (i.e., above the plate carriage that the plate rests on). The lower patterned surface may be at a height of about 4.5-4.7 mm above the plate carriage, and the lower patterned surface may be at a height of about 4.6-4.7 mm above the plate carriage. The middle-patterned surface may be at a height of about 4.5-5.0 mm above the plate carriage, about 4.7-4.9 mm above the plate carriage, or about 4.7-4.8 mm above the plate carriage. And the higher patterned surface is at a height of about 4.75-5.10 mm above the plate carriage, about 4.8-5.0 mm above the plate carriage, or about 4.85-4.95 mm above the plate carriage. It is noted that any one of the surfaces 601, 602 and 603 can be the middle-patterned surface, the higher pattern surface, or the lower pattern surface. In an embodiment, the optical focusing mechanism is adjacent to the plate carriage.

Therefore, embodiments herein provides a method for focusing an optical sensor to a target surface comprising the steps of (a) providing at least a higher, middle and lower patterned surface 601-603, wherein the middle patterned surface and the target surface are at the same focal height and wherein a first distance between the higher and middle patterned surfaces and a second distance between the middle surface and lower patterned surface are substantially equal; (b) obtaining a first contrast value difference between the higher and middle patterned surfaces with the optical sensor; (c) obtaining a second contrast value difference between the middle and lower patterned surfaces with the optical sensor; and (d) comparing the first and second contrast value differences and determining if the target surface is in focus and/or determining the magnitude and direction of focus adjustment needed to place the target surface in focus.

Figure 7A:
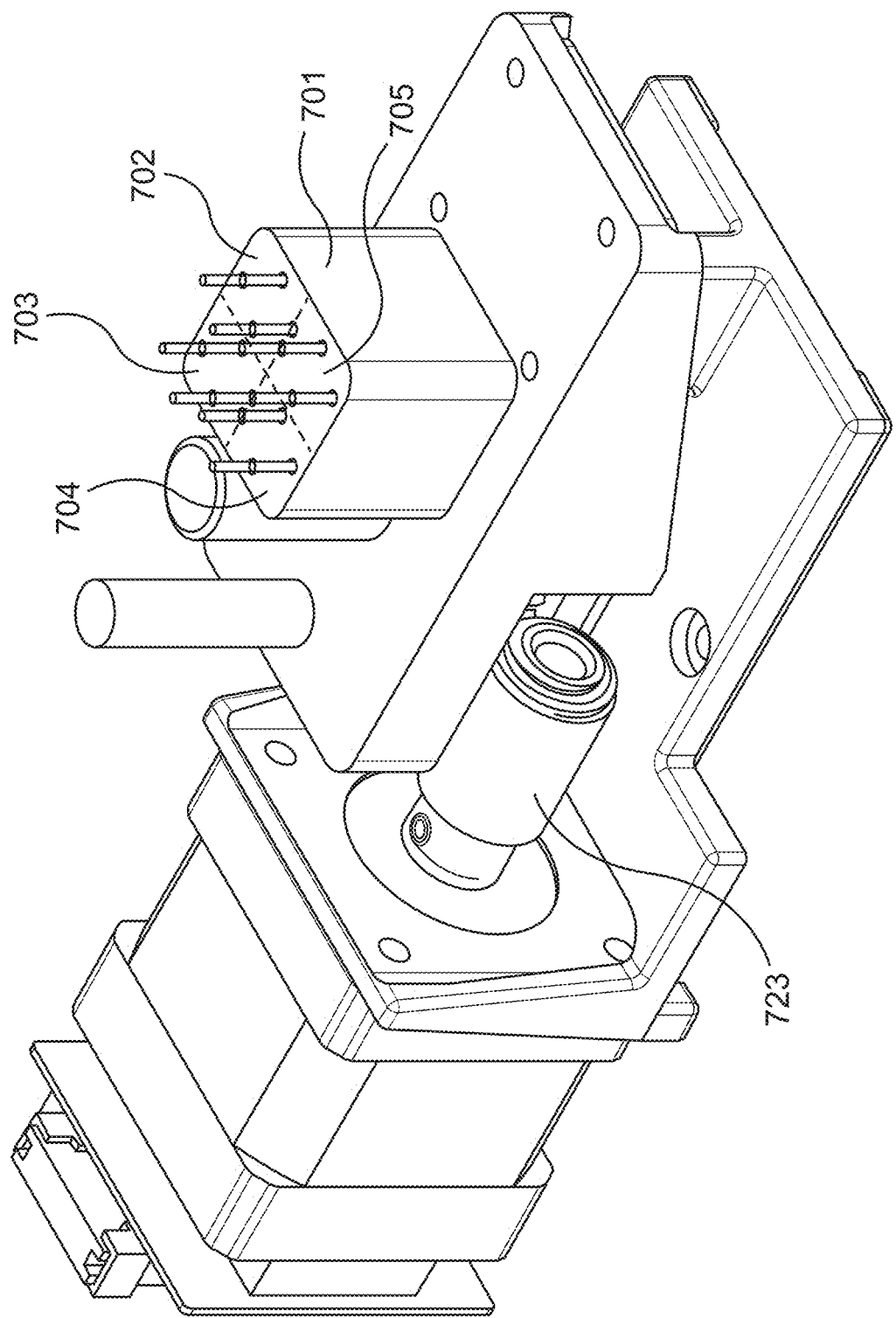
Figure 7B:
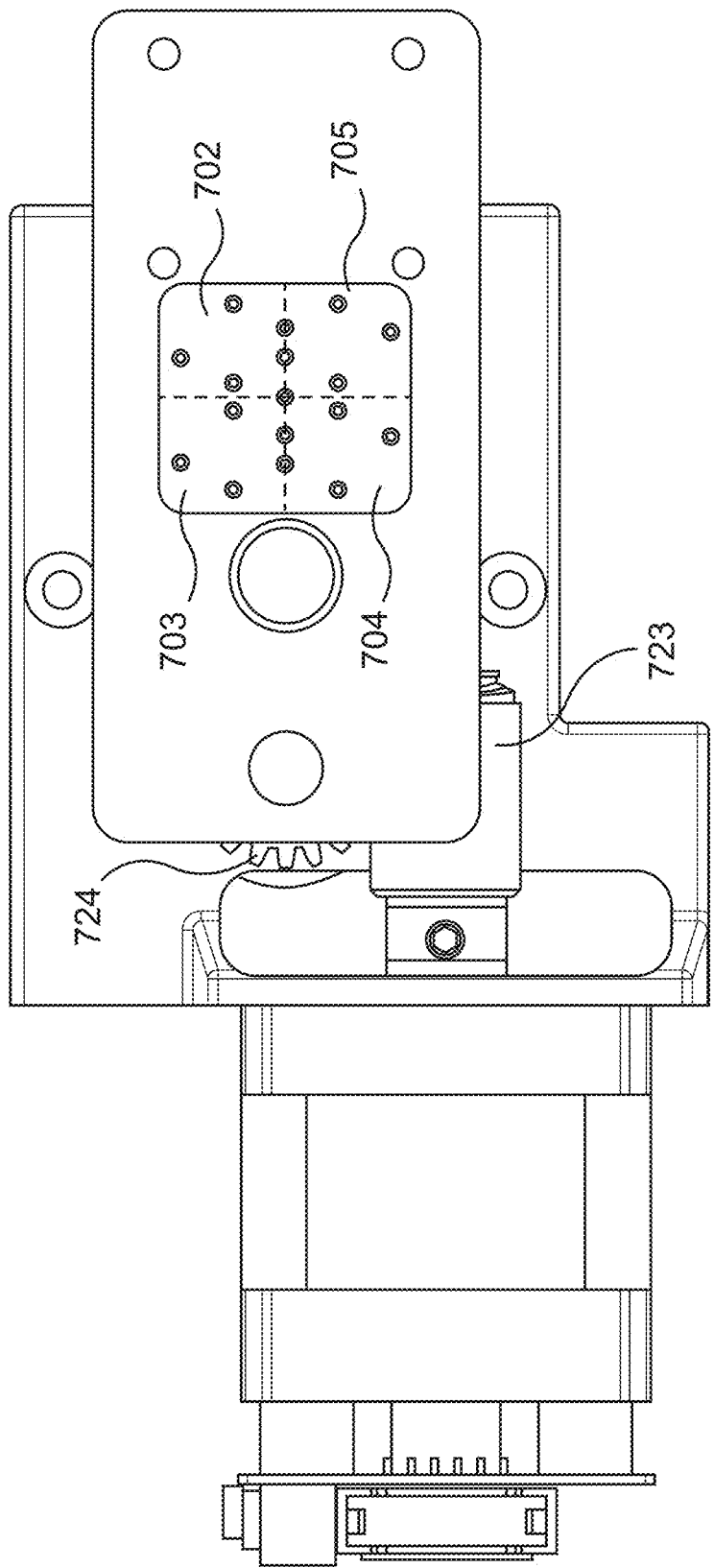

During operation, the plate translation stage 403 translates the plate carriage 404 to position the optical focusing mechanism over the contact mechanism shown in FIGS. 7(a)-7(c)(1), which includes a light source, such as light outlets 725-728 shown in FIG. 7(c)(1). Light outlets 725-728 can be connected to a single light emitting diode (LED) or each light outlet may have its own LED or other light sources. The light source is illuminated and a beam of light is shone on the underside of the optical focusing mechanism, more specifically under surfaces 601-603. Light outlets 725-728 may provide even lighting for surfaces 601-603. An optical sensor or camera in the light detection system 110 therefore, images the optical focusing mechanism, calculates the differences in contrast values described above, and determines if the target is in focus and/or determines the magnitude and direction of the focus adjustment needed to place the target surface in focus. Based on the calculation, the focus of the optical sensor is adjusted accordingly, either manually or automatically, e.g., through the use of a motorized focus adjustment. The method may also include the steps of adjusting the distance between the optical sensor and the target surface and repeating the steps of obtaining the first and second contrast values and comparing those contrast values until a difference between the first and second contrast values are less than a predetermined value. A suitable calculation to determine the contrast value is to take a region or interest (ROI) of an image that is covered by the dot pattern of the focus target, e.g., surface 601, 602 or 603 or a portion thereof. The average and the standard deviation of all of the pixels within that ROI are measured. The average (AVG) and standard deviation (StDEV) to calculate the contrast value (% CV) of that ROI are measured or ascertained.

$$\% \ CV = (StDEV/AVG) \times 100$$

Then the % CV for each ROI (high and low) are then subtracted to create the difference value that is reported to the operator. % CV as shown above is a unit-less or dimensionless value.

An example predetermined value of the difference in % CV contrast values is determined as ±2.0 experimentally by comparing ECL value as a function of defocus from nominal. The magnitude of this difference may change depending on the contrast function. A certain amount of defocus may be acceptable without affecting ECL. The example value of ±2 is within this range. A smaller value, e.g., ±1.5 or ±1.0 may be more accurate but also more difficult to achieve during the focus operation. A larger value, e.g., ±3.0 or ±4.0 may be less accurate but easier to achieve. Accuracy and operational difficulty may be balanced according to the teachings of the present invention. Differences in contrast values between ±1.0 and ±4.0 are within the scope of the present invention.

Other methodology of calculating or ascertaining contrast values, such as those discussed in "Contrast in Complex Images" by Eli Peli, published in the Journal of the Optical Society of America, No. 10, October 1990, at pages 2032-2040, can be used. This reference is incorporated by reference herein in its entirety.

Additionally, plate carriage 404 contains a plurality of reference elements. One reference element comprises an electrically conductive bottom surface 536 disposed on a bottom surface of plate carriage 404, as shown in FIG. 5(n), which is used, during setup of the apparatus, to train the positioning of the contact mechanism used to contact the bottom of plates 426 held in the plate carriage 404. The contact mechanism, described in more detail hereinbelow, includes a series of spring-loaded contact members and can be raised to contact a multi-well plate 426's bottom surface, e.g., to initiate an ECL measurement. As shown in FIG. 5(n), the conductive bottom surface 536 is on the underside of the plate carriage 404 and it is configured to be at the same height as a plate bottom when a multi-well plate 426 is latched in the plate carriage 404. During apparatus setup or adjustment, the contact mechanism is raised until it reaches a height where the contact members touch bottom surface 536, as detected by electrically measuring the drop-in resistance between contact members, signaling that the contact members have properly touched conductive bottom surface 536 and would properly contact the plate bottoms during ECL measurements. This measured height is used to set the contact mechanism height for contacting plates 426 held in the plate carriage 404.

Still further, the plate carriage 404 includes another reference element (depicted in FIG. 5(c) as semicircular apertures (e.g., half-moon-shaped cutouts) cut into plate carriage 404, i.e., elements 517-520). A light source, such as light outlet or LED 722 in the contact mechanism is projected through each aperture 517-520. Plate translation stage 403 moving in the horizontal plane discussed above position each aperture 517-520 above light outlet 722 shown in FIG. 7(c)(1). In this embodiment, a total of five LEDs may be employed although fewer or more LEDs can be employed as well. The light projected through each aperture is imaged by the light detector in light detection system 110 to reference the location of the plate carriage 404 in the x-y space of the horizontal plane relative to other components of the apparatus. In an embodiment, the reference elements comprise one or more indentations or cut-outs, e.g., on the edge of the plate platform, e.g., as shown in FIG. 5(c), at the two ends of reference surfaces/stops (501) and (503). Advantageously, the elements may also be imaged to confirm if the plate is in the correct orientation.

Figure 7H:
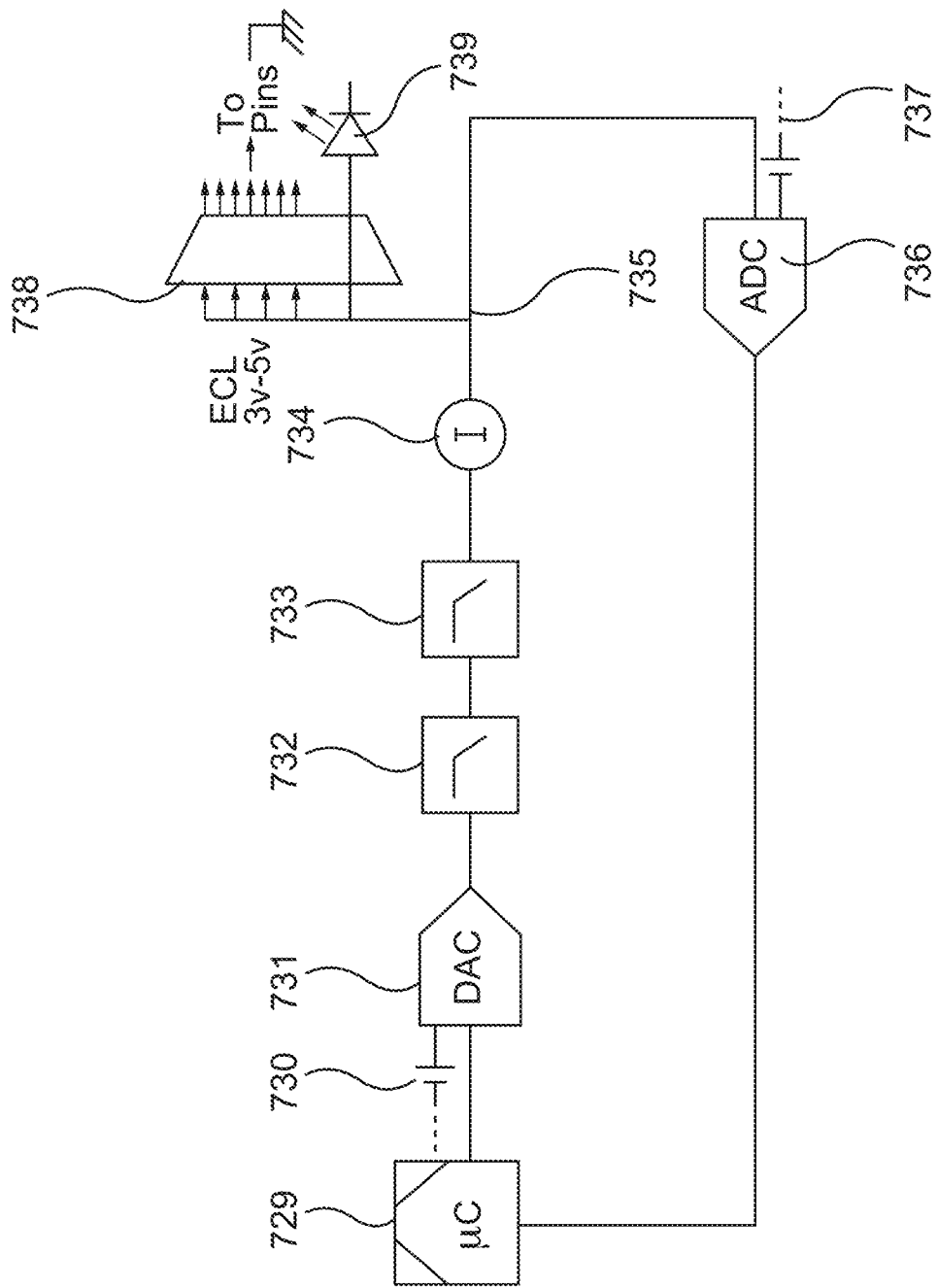

Light outlet 722 and light outlets 725-728 may be illuminated by a single LED. A suitable LED can be connected to light pipes or waveguides to the light outlets. A suitable LED can have different intensity outputs depending on the voltage applied. In one example, as illustrated in FIG. 7(h), LED 739 is connected to multiplexer 738. Microprocessor 729 can instruct multiplexer 738 to apply a first voltage to LED 739 to activate light outlet 722 and to apply a second voltage to LED 739 to activate light outlets 725-728. Alternatively, multiple LEDs can be used for the light outlets.

The plate handling subsystem may include one or more shipping locks to lock the plate carriage in place during shipping, discussed above and best illustrated in FIG. 4(e). In an embodiment, the shipping locks include solenoid driven pin 411 on removable drawer 240 being received in hole 412 on plate translation stage 403. The plate carriage 404 rides on rails 422, 424, and may include a clamp to lock the carriage in place. Still further, the plate carriage 404 includes a plate orientation sensor, such as an accelerometer or electronic leveler typically used in smartphones, to ensure that a multi-well plate 426 placed on the plate carriage 404 is in the correct orientation. Alternatively, a reflective optical sensor may be attached or adhered to the plate carriage and be sensed by the camera. Optionally, ultrasonic sensors, contact switches and capacitive sensors can also be used.

The plate handling subsystem 120 also includes a plate contact mechanism that includes electrical contact probes mounted onto a plate contact elevator for raising the probes to contact electrical contacts on the bottom of a multi-well plate 426 discussed above, that are in turn connected to electrodes in the wells of the plate. The contact probes are used to apply the electrical potentials to electrodes in one or more wells of a multi-well plate 426. The plate contact mechanism and the imaging apparatus are in alignment, such that the electrical contact is made with the well or set of wells that is/are directly under, and in the imaging field of, the imaging apparatus. The contact mechanism is shown in FIG. 7(a)-(b) and includes a contact mechanism platform 701 comprising four interrogation zones 702-705, wherein each zone includes a pair of electrical contact probes to conduct a voltage potential to the interrogation zone. Interrogation zones 702-705 may be arranged in quadrants or 2×2 matrix. However, interrogation zones can be arranged in a linear manner or in any P×Q matrix, wherein P and Q are integers and can be different from each other. As discussed in more detail below, multi-well plate 426 usable in instrument 100 can be arranged in a M×N matrix, where the M×N matrix is larger than the P×Q matrix. As discussed above, P×Q matrix can be 12×8, 24×16, 48×32 wells or any number of wells.

The apparatus also includes a controller operatively connected to a voltage source, wherein the voltage source is connectable to one or more pairs of electrical contact probes, and a multiplexer connected to the controller and to the voltage source for selectively connecting the voltage source to the pair of electrical contact probes of a single interrogation zone or connecting the voltage source to the pairs of electrical contact probes of more than one interrogation zone. As used herein, "voltage source" includes voltage source(s) and current source(s). A block diagram showing the components of the controller is shown in FIG. 7(h), including microprocessor 729, connected to power source 730 and digital analog converter 731, which is connected to low pass filters 732 and 733, current monitor 734, another optional power source 737, and analog digital converter 736, and a multiplexer 738. The controller is also operatively connected to an LED 739, which is a component of the contact mechanism, discussed above.

The multiplexer 738 controlled by microprocessor 729 directs the application of potential as identified above based on the type of plate used in the instrument. If the multi-well plate 426 is configured to be analyzed one well at a time, referred to herein as a single-well addressable plate, wherein a well of a plate corresponds to a zone of the contact mechanism platform, the multiplexer 738 will direct the selective application of potential by electrically isolating each zone and selectively applying a potential only within a first zone. If, on the other hand, the multi-well plate is configured to be analyzed two or more wells at a time, referred to herein as a multi-well addressable plate, the multiplexer 738 will direct the selective application of potential by electrically connecting two or more zones and selectively applying a potential within those two or more zones. In one embodiment, the plates comprise a bar code that includes plate configuration information and the apparatus 100 comprises a bar code reader 238 that reads the plate configuration information and identifies the type of plates positioned in the stacker.

In an, the apparatus includes a plurality of interrogation zones 702-705 that are arranged in a P×Q matrix. The P×Q matrix may be a 2×2 matrix. The pairs of electrical contact probes on the plate contact mechanism platform 701 may include upstanding pins, e.g., spring-loaded pin. Still further, the apparatus may further include an optical sensor, such as the light detectors in the light detection system 110, positioned above the platform 701 and the platform 701 includes a first alignment mechanism comprising a light source, such as light outlet 722 projecting from the platform toward the optical sensor to align the platform 701 relative to the optical sensor. In one embodiment, the light source (e.g., an LED or other type of light bulb) is positioned under and shines light through an aperture in the contact mechanism, e.g., through outlet (722) which is centered in platform (701) as shown in FIG. 7(c)(1). The apparatus also may include a second alignment mechanism comprising a plurality of apertures located on the plate carriage frame (e.g., elements 517-520 shown in FIG. 5(c)) and the light outlet 722 from the platform 701 can be illuminated through these apertures and detected by the optical sensor to further align the plate carriage frame with the platform 701. The plurality of apertures can be positioned on at least two sides of the plate carriage frame (see description above). Moreover, the apparatus further may include a third alignment mechanism comprising an electrically conductive surface located on the plate carriage frame (e.g., bottom surface 536 in FIG. 5(*n*)) such that when the electrical contacts on the platform are brought in contact with the electrical conductive surface electrical current flows among the electrical contacts on the platform to indicate a predetermined distance between the electrical contacts and the plate carriage frame. The apparatus may include a fourth alignment/focusing mechanism comprising patterned focusing targets (e.g., surfaces 601-603 in FIGS. 6(*a*) and 6(*b*)) and the contact mechanism platform includes one or more light sources for passing light through the patterns to enable imaging of the patterns, discussed above. The light source(s) may be a light source under outlet (722) as described above. Optionally, a plurality of light sources (e.g., LEDs or other types of light bulbs) may be used to generate a wider and more even light field, e.g., the four light outlets (725-728), e.g., LEDS, embedded in the plate contact mechanism platform as shown in FIG. 7(*c*)(1).

In an embodiment, the apparatus is adapted to interrogate samples contained in a multi-well plate, wherein the multi-well plate comprises a plurality of wells arranged in an M×N matrix, and the apparatus includes a carriage frame configured to support the multi-well plate, wherein the carriage frame is movable relative to a contact mechanism platform comprising a plurality of interrogation zones, wherein each interrogation zone comprises at least a pair of electrical contact probes to apply a voltage potential to at least one well. The apparatus also includes a controller operatively connected to a motor to move the carriage frame relative to the platform and operatively connected to a voltage source, wherein the voltage source is connectable to one or more pairs of electrical contacts, and a multiplexer connected to the controller and to the voltage source for selectively connecting the voltage source to the pair of electrical contact probes of a single interrogation zone or connecting the voltage source to at least one pair of electrical contact probes of more than one interrogation zones. The interrogation zones may be arranged in a P×Q matrix and the M×N matrix is larger than the P×Q matrix, which can be a 2×2 matrix. Each interrogation zone may be sized and dimensioned to interrogate one well on multi-well plate 426.

The electrical contact probes on the contact mechanism platform may include a plurality of working electrode contact probes that are selectively connected by the controller to the voltage source to determine the number of wells to interrogate. In an embodiment, a working electrode probe is connected to the working electrode in one well, or alternatively, one working electrode probe is connected to the working electrode in a plurality of wells. The working terminals electrode probes that are not connected can be electrically isolated in the multiplexer when not in use, thereby allowing a plurality of working electrode probes (e.g., 4 probes) to be used to apply potential to a plurality or working electrodes in a plurality of wells, one well at a time (e.g., applying potential to a group of 4 wells, one well at a time). The electrical contacts on the platform can further comprise a plurality of counter electrode probes that are electrically connected to at least one electrical return or one electrical path, or alternatively at least one electrical ground. In one embodiment, the bottom electrical contacts of the multi-well plate that are connected to the counter electrode probes on the platform for a plurality of wells are electrically connected. Alternatively, the bottom electrical contacts of the multi-well plate that are connected to the counter electrode probes on the platform for all the wells are electrically connected. Still further, the bottom electrical contacts of the multi-well plate that are connected to the counter electrode probes on the platform for at least one well can be electrically isolated. The controller can interrogate P×Q or fewer number of wells simultaneously.

Referring to FIGS. 7(*c*)(2)-(*g*), the contact mechanism platform 701 includes a plurality of working contact probes 706-713 and counter contact probes, 714-721. As shown in FIG. 7(*c*)(2), if the controller 709 is configured to electrically connect two or more interrogation zones, then the instrument 100 selectively applies a potential within two or more zones, e.g., zones 703 and 704, thereby applying a potential across working electrode contact probes 706 and 710 and 709 and 713, respectively and connecting counter electrode contact probes 714-717 and 718-721. The connections of the counter electrodes at platform 701 and multi-well plate 426 are discussed below. Also as discussed below, only one working contact electrode and one counter contact electrode are necessary. Two of each are connected to provide a redundancy for the system, so that an ECL signal is generated even when one electrode fails.

Alternatively, if the switching mechanism is configured to electrically isolate each zone then the instrument selectively applies a potential within a first zone, e.g., as in FIG. 7(*d*), wherein zone 703 is isolated and an electrical potential is applied across working electrode contact probes 706 and 710. In one embodiment, all counter electrode contact probes 714-717 and 718-721, which are connected to ground, are electrically connected at platform 701. As discussed below in connection with FIGS. 7(*k*), the counter electrode contact probes for each well are isolated by the counter electrodes on the bottom of multi-well plate 426. In the example shown in FIG. 7(*d*), the well directly above zone 703 has a counter electrode that connects to counter contact probes 718 and 719 but isolates from the other counter electrode contact probes on platform 701. Alternatively, the counter electrodes for each interrogation zone can be isolated at platform 701.

Similarly, FIGS. 7(*e*)-(*g*) illustrate how the contact mechanism is configured to apply a potential within a first zone, 702 (FIG. 7(*e*)), 705 (FIGS. 7(*f*)), and 704 (FIG. 7g), and a potential is applied across working electrodes 707 and 712 (in FIGS. 7(*e*)), 708 and 711 (in FIG. 7(*f*)), or 709 and 713 (in FIG. 7(*g*)), respectively, while counter contact probes 714-717 and 718-721 are electrically connected at platform 701, but the counter contact probes for each interrogation zone are isolated by the counter electrode on the well on multi-well plate 426 directly above each interrogation zone. The contact probes may be independently spring-loaded contacts members, e.g., contact pins.

In an embodiment, the multi-well plate 426 comprises bottom electrical contacts on a bottom surface of the plate for each well, wherein the bottom electrical contacts are configured to contact the pair(s) of electrical contact probes on the platform 701. The bottom electrical contacts include counter electrode contacts that are connected to counter electrodes in the wells of the plate and working electrode contacts that are connected to working electrodes in the wells of the plate. Each well includes at least one working and one counter electrode, which depending on the plate format, may be electrically connected (bussed) or electrically independent of the working and counter electrodes in other wells of the plate.

A non-limiting set of exemplary bottom electrical contact patterns are shown in FIGS. 7(*i*)-(*l*), wherein FIG. 7(*i*) shows the pin contact configuration of platform 701 substantially similar to FIG. 7(*c*)(2). FIG. 7(*k*) shows an overlap of the bottom electrical contacts under exemplary four wells that overlay interrogation zones 702-705. Each well has bottom counter electrode 740 having an exemplary "Z-shape" and two bottom working electrodes 742 and 744. Bottom counter electrodes 740 are not electrically connected to each other, and hence the counter electrodes for each well or each interrogation zone are separated or isolated at multi-well plate 426.

For zone 703, Z-shape bottom counter electrode 740 connects to counter electrodes 718 and 719. Bottom working electrodes 742 and 744 are connected to working electrodes 710 and 706, respectively.

For zone 705, Z-shape bottom counter electrode 740 connects to counter electrodes 720 and 721. Bottom working electrodes 742 and 744 are connected to working electrodes 711 and 708, respectively. Zones 702 and 704 are similarly connected.

The next electrical connection is to the inside of the well itself. As illustrated in FIG. 7(*l*), each well in this example has well working electrode 750 and well counter electrodes 752 and 754. Here, well working electrode 750 has a Z-shape and connects to both bottom working electrode 742 and 744, and well counter electrodes 752 and 754 are connected to bottom counter electrode 740.

For zone 705, working electrodes 711 and 708 on platform 701 are connected to bottom working electrodes 742 and 744 and well working electrode 750 for each well. Counter electrodes 720 and 721 on platform 701 are connected to bottom counter electrode 740 and well counter electrodes 752 and 754 for each well. The Z-shapes for bottom counter electrode 740 and well working electrode 750 are designed to endure sufficient electrical contact. Any shape can be used and the present invention is not limited to any particular shape.

As shown in the above discussion, each well and each interrogation zone has two working electrodes, e.g., 708 and 711 for zone 705, and two counter electrodes, e.g., 720 and 721 for zone 705. Both working electrodes and both counter electrodes are electrically connected to a well as shown above. Only one pair of working and counter electrodes is necessary to conduct ECL potential to a well. The other pair is for redundancy, in case one or more electrode malfunctions.

It is further noted that in the example discussed above in connection with FIGS. 7(*i*), 7(*k*) and 7(*l*) where each well can be interrogated individually, the working electrodes for each interrogation zone and well are isolated at platform 701 and multiplexer 738, and the counter electrodes for each interrogation zone and well are isolated at multi-well plate 426 and its bottom electrodes and well electrodes.

FIG. 7(*j*) illustrates an example where four wells overlaying interrogation zones 702-705 can be interrogated at the same time using the contact pins or electrodes from the same platform 701. As shown, this multi-well plate 426 has bottom working electrode 760 overlaying working electrodes 707, 708 and 709. Multi-well plate 426 also has bottom counter electrode 762 overlaying at least counter electrode 719, 720, 715 and 716. Bottom working electrode 760 and bottom counter electrode 762 are electrically connected upward to all four wells. Activating one or more working electrodes 707, 708 and 709 and one or more counter electrodes 719, 720, 715 and 716 would provide an ECL potential to all four wells. Redundancy is also provided by the plurality of available working and counter electrodes.

According to an embodiment of the present invention, the plate bottom comprises internal electrical contacts conduits connected to the bottom electrical contacts to conduct the voltage potential to within the wells. In one embodiment, the bottom electrical contacts for at least one well are electrically isolated from the bottom electrical contacts for adjacent wells and optionally, the internal electrical contacts conduits for at least one well can be electrically isolated from the bottom electrical contacts for adjacent wells. Reference is made to U.S. Pat. No. 7,842,246 and U.S. Application No. 20040022677 (both entitled "Assay Plates, Reader Systems and Methods for Luminescence Test Measurements", filed on Jun. 28, 2002, hereby incorporated by reference), which discloses additional embodiments of plate bottoms that can be interrogated by the contact mechanism disclosed herein.

Therefore, embodiments hereof provide a method for interrogating samples contained in a multi-well plate having an M×N matrix of wells comprising the steps of (a) providing a plate contact mechanism platform having a plurality of interrogation zones, (b) providing at least a pair of electrical contact probes (e.g., a working electrode contact probe and a counter electrode contact probe) for each interrogation zone, wherein each interrogation zone is adapted to interrogate a single well, (c) selectively applying a voltage potential to: (i) one interrogation zone to interrogate one or more wells simultaneously or (ii) a plurality of interrogation zones to interrogate a plurality of wells, and (d) moving the multi-well plate relative to the platform to interrogate additional wells. A single well can be interrogated, or an M×N number of wells can be interrogated (wherein M×N is larger than the P×Q matrix). The method may also include the step of (e) controlling the application of voltage potential in step (c) by selecting at least one positive active contact probe (e.g., the working electrode probe) of the pairs of the electrical contact probes on the platform to connect to the voltage potential. Step (e) can also include the step of electrically isolating at least one positive active contact probe not connected to the voltage potential. The method can also include step (f), providing bottom electrical contacts on a bottom surface of the multi-well plate and optionally, (g) electrically isolating at least one electrical return or alternatively at least one ground contact probe (e.g., the counter electrode probe) from the bottom electrical contacts. Optionally, all electrical returns or ground contact probes from the bottom electrical contacts are isolated from each other.

As described above, the apparatus can be used to measure luminescence from two alternative types of multi-well plates, a single-well addressable plate (i.e., a plate that is interrogated by the apparatus one well at a time), and/or a multi-well addressable plate (i.e., a plate that is interrogated by the apparatus one sector at a time, wherein a sector is a grouping of adjacent wells). Various types of multi-well plates including single-well and multi-well addressable plates are described in U.S. Pat. No. 7,842,246 and U.S. Application No. 20040022677 (both entitled "Assay Plates, Reader Systems and Methods for Luminescence Test Measurements", filed on Jun. 28, 2002, hereby incorporated by reference). The plates of the invention include several elements, including but not limited to, a plate top, a plate bottom, a plurality of wells, working electrodes, counter electrodes, reference electrodes, dielectric materials, electrical connections, conductive through holes, and assay reagents. The wells of the plate are defined by holes/openings in the plate top and the plate bottom can be affixed to the plate top, directly or in combination with other components, and the plate bottom can serve as the bottom of the well. One or more assay reagents can be included in wells and/or assay domains of a plate. These reagents may be immobilized or placed on one or more of the surfaces of a well, may be immobilized or placed on the surface of an electrode and may be immobilized or placed on the surface of a working electrode. The assay reagents can be contained or localized by features within a well, e.g., patterned dielectric materials can confine or localize fluids. The plate top may include a unitary molded structure made from rigid thermoplastic material such as polystyrene, polyethylene or polypropylene. The plate bottom may include electrodes (e.g., working and/or counter electrodes) that include carbon, carbon layers, and/or screen-printed layers of carbon inks. In another embodiment, the plate bottom includes electrodes comprised of a screen-printed conducting ink deposited on a substrate.

A single well addressable plate includes a plate top having plate top openings and a plate bottom mated to the plate top to define wells of the single well addressable plate, the plate bottom comprising a substrate having a top surface with electrodes patterned thereon and a bottom surface with electrical contacts patterned thereon, wherein the electrodes and contacts are patterned to define a plurality of well bottoms of the single well addressable plate, wherein a pattern within a well bottom comprises: (a) a working electrode on the top surface of the substrate, wherein the working electrode is electrically connected to an electrical contact; and (b) a counter electrode on the top surface of the substrate, wherein the counter electrode is electrically connected with the electrical contact, but not with an additional counter electrode in an additional well of the single well addressable plate. The electrodes and contacts of a single-well addressable plate may be individually addressable.

A multi-well addressable plate includes a plate top having plate top openings and a plate bottom mated to the plate top to define wells of the multi-well addressable plate, the plate bottom comprising a substrate having a top surface with electrodes patterned thereon and a bottom surface with electrical contacts patterned thereon, wherein the electrodes and contacts are patterned to define two or more independently addressable sectors of two or more jointly addressable assay wells, each sector comprising two or more wells with: (a) jointly addressable working electrodes on the top surface of the substrate, wherein each of the working electrodes is electrically connected with each other and connected to at least a first of the electrical contacts; and (b) jointly addressable counter electrodes on the top surface of the substrate, wherein each of the counter electrodes is electrically connected with each other, but not with the working electrodes, and connected to at least a second of the electrical contacts. In one embodiment, the independently addressable sectors include less than 50% of the wells of the multi-well addressable plate or less than 20% of the wells of the multi-well addressable plate. The independently addressable sectors can comprise a 4×4 array of wells or a 2×3 array of independently addressable sectors. Alternatively, the independently addressable sectors can comprise one or more rows or one or more columns of wells.

Figure 16A:
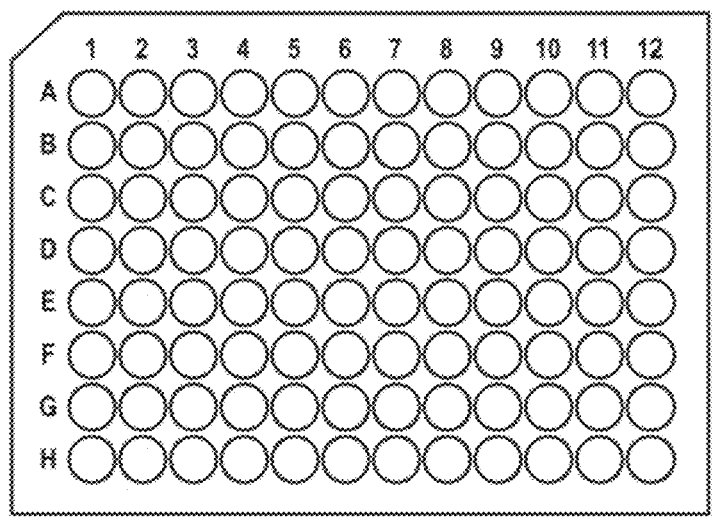
FIGS. 16(a)-(b) show an exemplary multi-well plate and multi-spots within a single well.

A single-well or multi-well addressable plate can be a 4 well plate, 6 well plate, 24 well plate, 96 well plate, 384 well plate, 1536 well plate, 6144 well plate or 9600 well plate. An exemplary, non-limiting 96 well plate is shown in FIG. 16(a), where the wells on the plate are arranged in rows A-H and columns 1-12. The electrodes of either plate format comprise carbon particles and they can further comprise a printed conductive material, wherein one or more of the electrodes comprise a plurality of assay domains formed thereon. The plurality of assay domains may include at least four assay domains, may include at least seven domains, and may include at least ten assay domains, and the plurality of assay domains can be defined by openings in one or more dielectric layers supported on the working electrodes. Plates that can be used in the apparatus are available from Meso Scale Discovery (Rockville, MD; www.mesoscale.com) and include but are not limited to the following multi-well addressable plates (Meso Scale Discovery catalog numbers): L15XA-3, L15XB-3, L15AA-1, L15AB-1, L15SA-1, L15SB-1, L15 GB-1, L45XA-3, L45XB-3, N45153A-2, N45153B-2, N45154A-2, and N45154B-2; and the following single-well addressable plates (Meso Scale Discovery catalog numbers): L55AB-1, L55SA-1, L55XA-1, and L55XB-1.

Figure 16B:
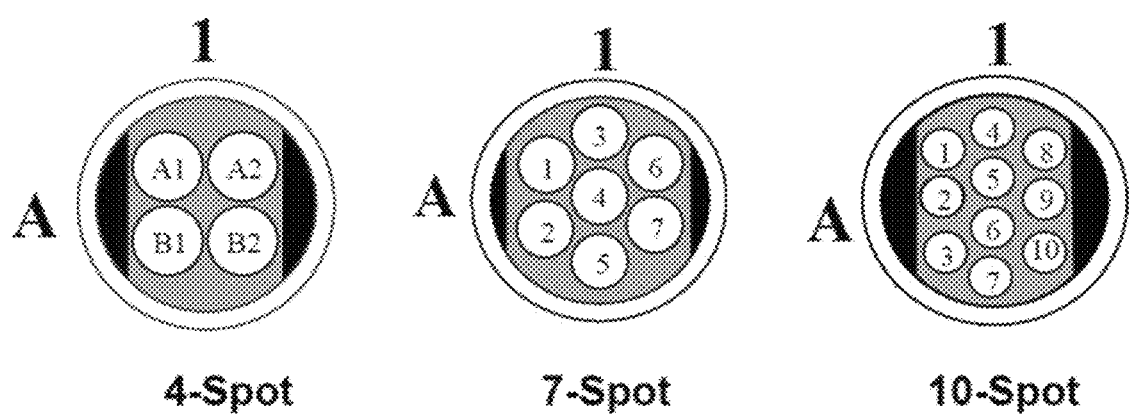
Figure 16C:
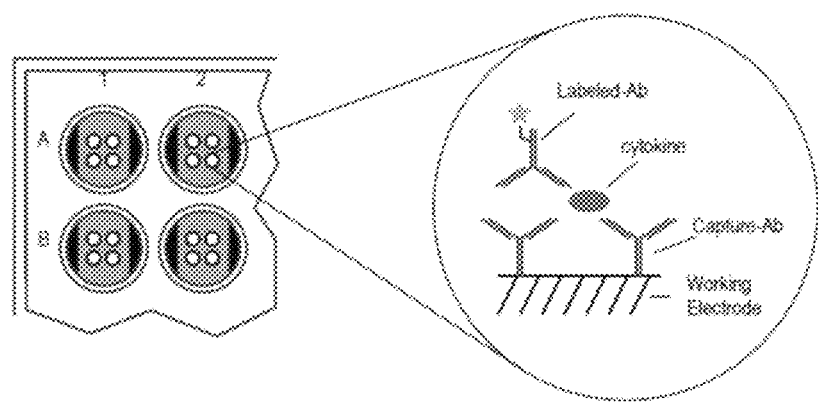
FIG. 16(c) shows an exemplary capture antibody attached to a spot and a labeled antibody.

The single-well or multi-well addressable plates may include working electrodes within the wells that include a single spot or multiple spots. In one embodiment, the spots in a well are exposed areas of a working electrode in the well, the exposed areas defined by apertures in a patterned dielectric layer that is deposited on the working electrode. Wells with 4 spots, 7 spots or 10 spots are known, as shown in FIG. 16(b). The individual circles in each well represent exposed working electrode spots defined by a dielectric over layer, which surrounds these spots. A non-limiting example of a multi-spot well is illustrated in FIG. 16(c). In this example, a 4-spot, multi-well mouse cytokine assay plate is shown. The multi-spot well has an array of binding reagents immobilized on designated spots, for example, each spot comprising a different binding reagent targeting a different analyte. Although this figure specifically identifies cytokines in this embodiment, according to other embodiments, any analyte can be measured. FIG. 16(c) shows use of the well in the context of an electrochemiluminescence sandwich immunoassay. As shown for one of the spots (e.g., the spot located on the lower right portion of the well) on a 4-spot well, an immobilized binding reagent for an analyte (in this case shown as an antibody (referred to as the "Capture Antibody" or "Capture-Ab") recognizing a first binding site on the target analyte). Incubating a sample in the well results in the analyte being captured and brought down to the working electrode by the capture antibody. Incubation of this complex with a second binding reagent (in this case shown as a second antibody (referred to as the "Detection Antibody" or "Labeled-Ab") targeting a second binding site on the target analyte) linked to an electrochemiluminescent label (shown as a star) leads to binding of the detection antibody to the bound analyte and formation of a "sandwich" complex on the electrode comprising the capture antibody, the analyte, the detection antibody and the label, wherein the amount of label on the electrode is indicative of the amount of analyte in the sample. Similarly, other capture antibodies on the other spots and, as needed, other labeled detection antibodies can be used to capture and measure other analytes on other spots. Application of an electrical potential across the working electrode and a counter electrode in the same well in an appropriate chemical environment (for example in the presence of a solution containing an ECL coreactant such as MSD Read Buffer T from Meso Scale Diagnostics) leads to the generation of electrochemiluminescence by the ECL labels in the sandwich complexes in the spots. Measurement of the intensity of light generated at a specific spot provides a signal that is indicative of the amount of label in the spot, and therefore, the concentration of target analyte for that spot in the sample.

Accordingly, the apparatus measures luminescence from a multi-well plate by first detecting the plate type in the apparatus, e.g., by reading the bar code on the multi-well plate which includes plate configuration information, aligning the contact mechanism and imaging apparatus such that the interrogation zone or zones are directly under and in the imaging field of the imaging apparatus, and directing the selective application of potential by (a) electrically isolating each interrogation zone of the contact mechanism and selectively applying a potential only within a first zone (for a single-well addressable plate); or (b) electrically connecting two or more zone and selectively applying a potential within those two or more zone (for a multi-well addressable plate).

If a multi-well addressable plate is being used in the apparatus, the imaging system and contact mechanism are aligned with an interrogation zone that corresponds to a grouping or sector of adjacent wells, e.g., a grouping of four adjacent wells, and the apparatus selectively applies a voltage to all wells of that sector. The apparatus then moves the plate via the plate translation stage to reposition the contact mechanism and imaging system with an additional interrogation zone that corresponds to an additional sector or grouping of wells, and selectively applies a voltage to the wells of that additional sector.

If a single-well addressable plate is being used in the apparatus, the imaging system and contact mechanism are aligned with an interrogation zone that corresponds to a grouping or sector of adjacent wells, e.g., a grouping of four adjacent wells, and the apparatus selectively applies a voltage to each well of that sector one at a time. Likewise, the plate is moved via the plate translation stage to reposition the contact mechanism and imaging system with an additional interrogation zone that corresponds to an additional sector of wells to interrogate each well of that additional sector one at a time.

In accordance to another embodiment of the present invention, another apparatus or instrument, for example another ECL reader, is constructed to interrogate or read single-well addressable multi-well plates. Apparatus 1000 is shown in FIGS. 10(*a*) and (*b*). This reader may have substantially the same horizontal footprint as apparatus 100 shown and discussed above, albeit with a different stylized cover 1001. FIGS. 10(*c*) and 10(*d*) compare the internal mechanisms or subsystems of apparatus 100 and 1000 and show that they are comparable except as described below. As shown in FIGS. 10(*c*) and (*d*), both apparatuses have light tight enclosure 130 with a removable drawer 240 for access to the light tight enclosure. Both apparatuses have a housing top 232 which has introduction and ejection apertures 236 and 237, and bar code reader 238 mounted thereon. Also mounted on housing top 232 of apparatus 100 is light detection system 110. Mounted on housing top 232 of apparatus 1000 is a different light detection system 1010, discussed below.

The light tight enclosures (LTE) of apparatuses 100 and 1000 are best illustrated with cross-sectional views of both instruments, as shown in FIGS. 10(*e*) and 10(*f*), respectively. Unwanted light may enter the light detection systems 110, 1010 and the LTEs through the vertical light detection systems and the lens systems, or through doors on the plate introduction/rejection apertures 236, 237. FIG. 10(*g*) is an enlarged cross-sectional view of the lens system of apparatus 100. Unwanted light may enter light detection system 110 at a connection 112 between the CCD camera and the adaptor holding the lenses, and at a joint 114 in the lens clamp. Tortuous paths at 112 and 114 minimize unwanted light from entering light detection system 110. As used herein, the term "tortuous path" refers to a path that twists, winds, and/or includes one, two, three, four, five, or more turns of varying degrees. FIG. 10(*h*) shows a cylindrical tortuous path 116 that discourages unwanted light from entering apparatus 100, 1000 after the doors close openings of plate introduction/ejection apertures 236, 237. Path 118 along the top of the doors leading toward the CCD camera would also experience a curve to further discourage unwanted light from reaching the light detection system 110, 1010, as best shown in FIG. 10(*i*). Also shown are a tortuous path 1020 between the CCD camera and adaptor in light detection system 1010 and a tortuous path 1022 on the adaptor to discourage unwanted light from entering. Apparatus 100 and 1000 use these tortuous paths for light tightening (i.e., by minimizing or eliminating unwanted, extraneous light).

Since apparatus or reader 1000 is configured to read single-well addressable multi-well plates, it may include a simplified plate contact mechanism, as illustrated in FIGS. 11(*a*)-(*c*). Worm gear 723 is driven by motor 723*a* to turn a mating geared bottom part 724*a* of leadscrew 724. Leadscrew 724 has threaded main shaft 723*b*, which is threaded through a corresponding threaded hole in support base 700. As worm gear 723 is rotated, it rotates mating part 724*a* of leadscrew 724, which rotates within the threaded hole of support base 700. These rotational motions lifts or lowers support base 700 to adjust the vertical height of the plate contact mechanism, as discussed herein, to contact the conductive bottom of the multi-well plates. Guide shaft 700*a*, which may be without threads and adapted to slide within a corresponding hole in support base 700, which is included to guide the lifting and lowering of support base 700.

Contact platform 1701 is sized and dimensioned to electrically contact a single well at a time on multi-well plate 426, which in this embodiment is a single-well addressable plate. Contact platform 1701 contains at least one working electrode contact probe and one counter electrode contact probe to conduct electricity to working and counter electrodes in a well undergoing ECL analysis. A set of backup or redundant working and counter electrode probes may be included. In this example, four contact probes 1703 including two working and two counter electrode contact probes are illustrated. Contact probes 1703 may be upstanding, spring-loaded pins.

FIG. 11(*d*) shows an overlap of contact probes 1703 over the electrical contacts on the bottom on a single-well addressable multi-well plate. Multi-well plate 426 has under each well at least one working electrode contact 1705 and at least one counter electrode contact 1707. The contact probe(s) 1703 that transports a positive electrical charge would be in contact with at least one working electrode contact 1705. As discussed above, the second contact probe 1703 that contacts the other working electrode contact 1705 is a back-up. At least one contact probe 1703 may be connected to an electrical return or alternative to ground is in contact with counter electrode contact 1707. The other contact probe 1703 that contacts the counter electrode contact 1707 is a back-up.

Contact platform 1701 may be smaller in dimensions than contact platform 701 since it only needs to contact a single well at a time. Contact platform 1701 may also contain light outlet 722 for positioning purpose and light outlets 725-728 to illuminate the focusing mechanism, e.g., patterned surfaces 601-603, as discussed herein.

Apparatus 100, 1000 may also include an improved heat removal system 1200 that includes an angularly oriented fan 1202 and cover manifold 1204, which separates the fan and electronics, such as printed circuit boards (PCBs) including control boards, from the rest of interior of apparatus 1000, as best shown in FIGS. 12(*a*) and 12(*b*). Cover manifold 1204 is also shown in FIG. 10(*d*) as a translucent piece. The CCD sensor inside light detection system 110 or 1010 is cooled, as discussed below, and this cooling generates heat that is removed from light detection system 110, 1010 by cooling fan 1208. The removed heat would generally rise to the top of cover 1001 of apparatus 1000, as best illustrated in FIG. 10(d), or apparatus 100. Fan 1202 is oriented toward the top of light detection system 110, 1010 to draw the generated heat as airflow 1210 away from the interior of apparatus 100, 1000 and more specifically away from the top of light detection 110, 1010 into cover manifold 1204 and the out of apparatus 1000 through vent openings 1212 as shown by arrows 1214. As heated air exits, fresh ambient air is pulled into the apparatus. No fan is needed within the light-tight enclosure or inside the light detection system 110 itself, thus reducing the size and complexity of the apparatus.

Cover manifold 1204 acts as a flow plenum, where heated air is pulled into the cover manifold and is forced out through vent openings 1212 to minimize flow recirculation within the decorative or stylized cover 1001, which may reduce heat removal efficiency. The PCBs within cover manifold 1204 may also generate heat, which is also removed by this airflow 1210, 1214, as the airflow passes over the PCBs before exiting apparatus 1000.

Figure 12A:
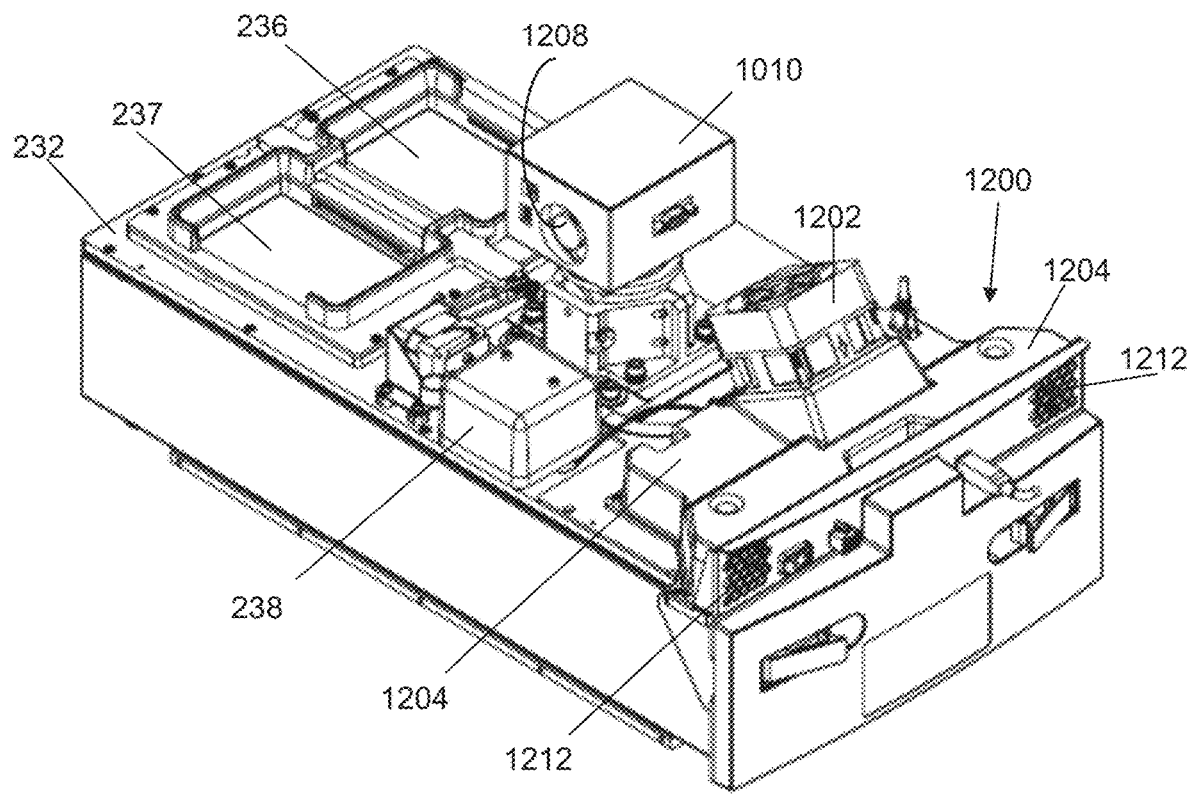
FIG. 12(a) is a perspective view of apparatus 1000 without the cover.
Figure 12B:
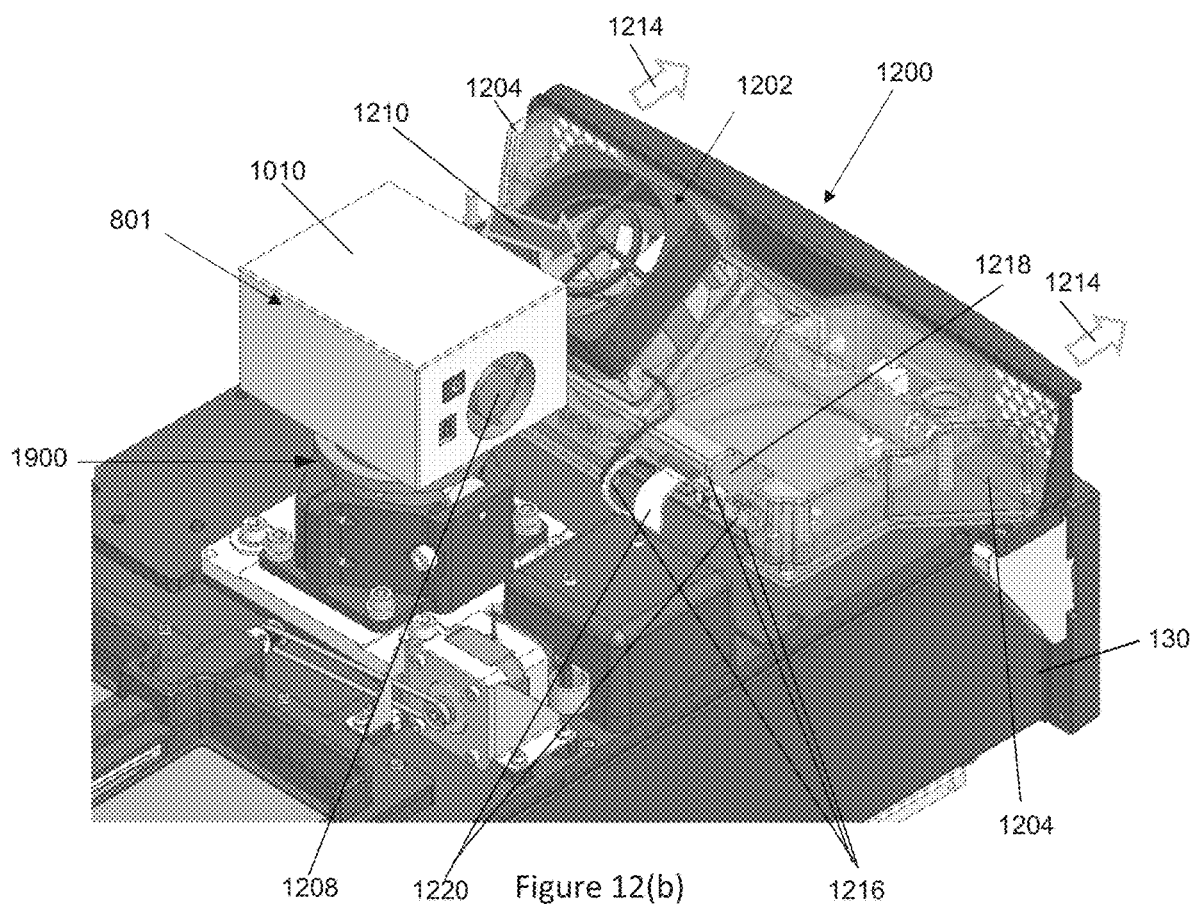
FIG. 12(b) is an enlarged partial perspective view showing a heat removal system.
Figure 12C:
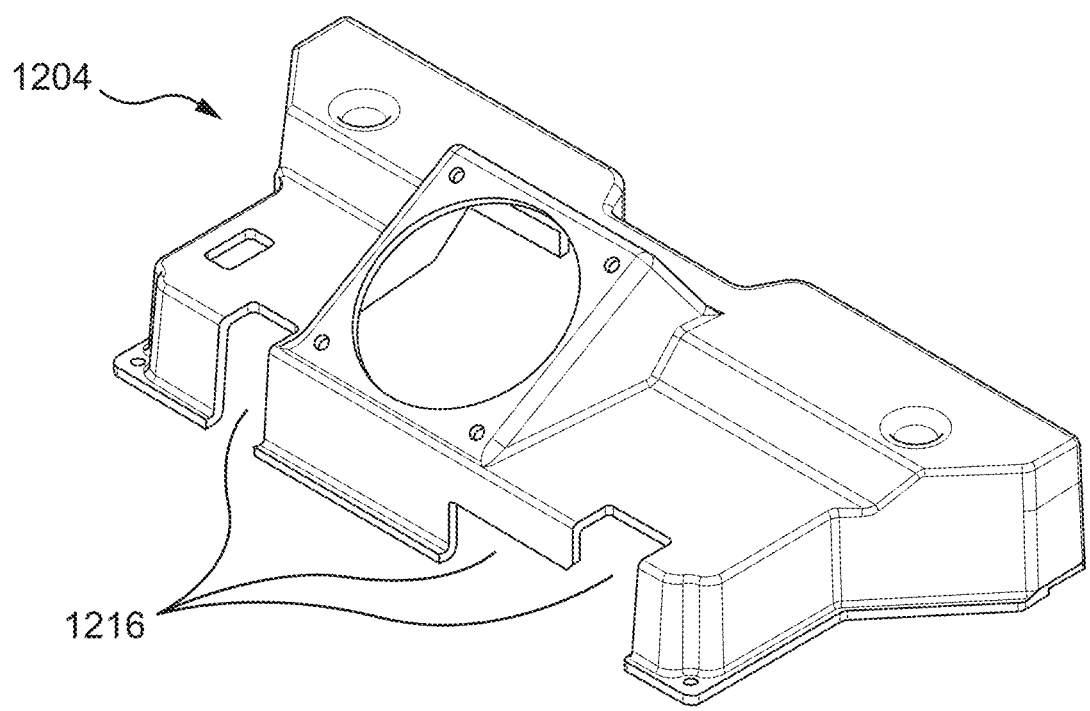
FIGS. 12(c) and (d) are perspective views of two variations of a cover manifold or plenum in the heat removal system.
Figure 12D:
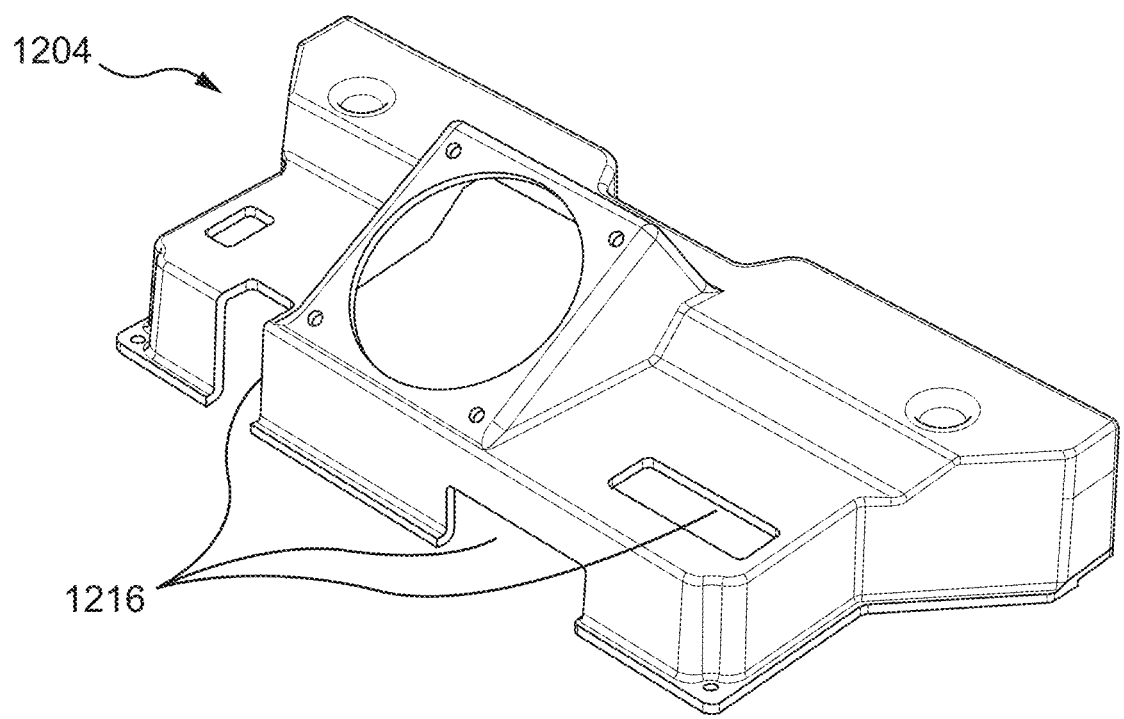

Cover manifold 1204 has one or more openings 1216 for electrical connections 1220 between the PCBs and the electrical and electronic components on housing top 232. To minimize the flow recirculation that may occur through openings 1216, baffle 1218 is provided within cover manifold 1204. Baffle 1218 is generally vertical and may extend downward toward housing top 232 behind electrical connections 1220, as shown in FIG. 12(b). Cover manifold 1204 is shown individually with one configuration of openings 1216 for electrical connections in FIG. 12(c). Another configuration of openings 1216 for cover manifold 1204 is shown in FIG. 12(d), which may be utilized with instrument or apparatus 100, discussed above. As best shown in FIGS. 12(c) and 12(d), manifold 1204 can be designed or changed to have openings 1216 located at different locations to accommodate different electrical cables. In one embodiment, the manifold 1204 can be made of plastic, although other materials are contemplated as well that are suitable for accommodating these cables. More specifically, right-side opening 1216 in FIG. 12(c) is modified into two separate openings 1216 in FIG. 12(d). One reason to modify the flow plenum is to accommodate the electrical cables.

Figure 13:
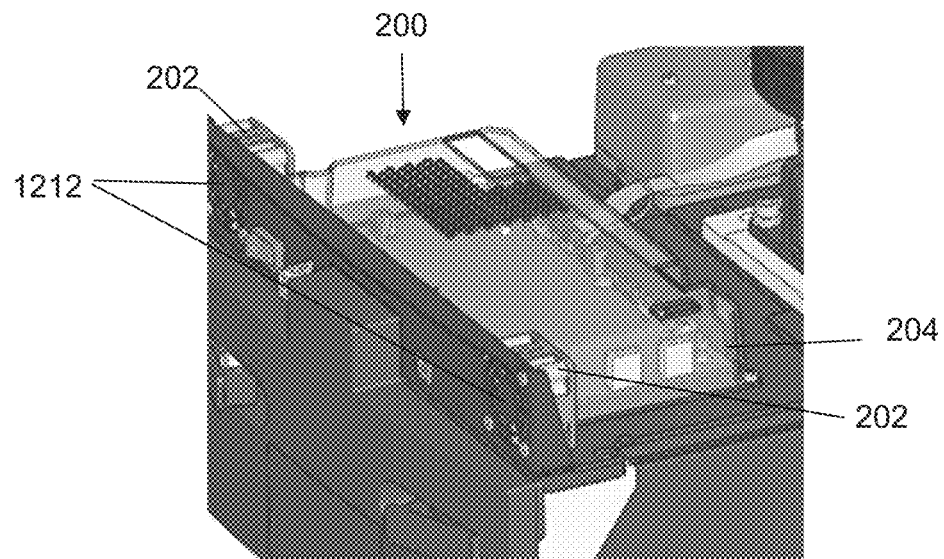
FIG. 13 is an enlarged partial view of another heat removal system.

FIG. 13 is an enlarged view of heat removal system 200 for apparatus 100 that comprises two fans 202 and a cover manifold 204. Fans 202 are located adjacent to vent openings 1212. Heat removal system 200 can also be seen in FIGS. 1(c), 1(d), 2(c), 4(b) and 4(c). Each fan 202 may be smaller in size and lower in flow rate than fan 1202. In one non-limiting example, fans 202 have a flow rate of about 11.3 ft³/min each and have a 40 mm×40 mm footprint. Fans 202 operate at about 9,500 rpm. Single fan 1202 is capable of a flow rate of about 36.3 ft³/min and has a 70 mm×70 mm footprint. Fan 1202 rotates at about 3,900 rpm. Fan 1202 has a significantly higher effective flow rate and lower rotating speed than fans 202. Heat removal system 1200 cools the apparatus 100 or 1000 more efficiently and at lower noise level, as shown by the following test results.

| | Sound Level (dB, A weighting) Configuration | | | |
|---|---|---|---|---|
| | At the front edge | | 1 meter away | |
| | Measured | Δ | Measured | Δ |
| Instrument OFF | 54.2 | | 54.3 | |
| 2 Fans 202 | 60.3 | 6.1 | 58.5 | 4.2 |
| 1 Fan 1202 | 56.0 | 1.8 | 55.2 | 0.9 |

| | | Temperature (° C.) | | | | | |
|---|---|---|---|---|---|---|---|
| | | LTE 232 Top | | CCD | | Camera Body | |
| Configuration | Ambient | Meas. | Δ | Meas. | Δ | Meas. | Δ |
| 2 Fans 202 | 22.5 | 25.7 | 3.2 | −4.7 | −27.2 | 29.2 | 6.7 |
| 1 Fan 1202 | 22.2 | 25.1 | 2.9 | −8.8 | −31.0 | 27.7 | 5.5 |

The temperature tests show that the 1-fan configuration can cool the CCD at a higher ΔT with respect to ambient temperature. Additionally, the maximum temperature difference for example after a plate reading between the four corner wells in a 96 well plate and a center well is about 1.2° C. for the two-fan configuration and a lower 0.5° C. for the larger single fan.

In an embodiment, the apparatus can measure luminescence from a single well addressable plate or a multi-well addressable plate, wherein the apparatus includes:
 (i) a plate type identification interface for identifying the plate type;
 (ii) a plate translation stage for holding and translating the multi-well plate in the x-y plane;
 (iii) a plate contact mechanism comprising a plurality of contact probes and positioned below the plate translation stage and within the range of motion of the stage, wherein the mechanism is mounted on a contact mechanism elevator that can raise and lower the mechanism to bring the probes into and out of contact with a bottom contact surface the plate when positioned on the translation stage;
 (iv) a voltage source for applying potential through the contact probes to the plate; and
 (v) an imaging system positioned above the plate translation stage and in vertical alignment with the plate contact mechanism, wherein
  (a) the imaging system is configured to image a P×Q matrix of wells, the plate contact mechanism is configured to contact the bottom contact surface associated with the matrix and the plate translation stage is configured to translate a plate to position the matrix in alignment with the imaging system and plate contact mechanism;
  (b) the apparatus is configured to sequentially apply a voltage to each well in the matrix of a single well addressable plate and image the matrix; and
  (c) the apparatus is configured to simultaneously apply a voltage to each well in the matrix of a multi-well addressable plate and image the matrix.

The P×Q matrix may be a 2×2 array of wells for an exemplary multi-well addressable plate. The imaging system can collect a separate image for each sequential application of voltage to each well in the matrix of a single well addressable plate, wherein P×Q matrix is a 1×1 array of well. The plate type identification interface can include a bar code reader, an EPROM reader, an EEPROM reader, or an RFID reader, or alternatively, the plate type identification interface comprises a graphical user interface configured to enable a user to input plate type identification information.

Therefore, a method for measuring luminescence from a single well addressable plate or a multi-well addressable plate using such an apparatus may include:
- (a) loading a plate on the plate translation stage;
- (b) identifying the plate as being a single well or multi-well addressable plate;
- (c) moving the plate translation stage to align a first P×Q matrix of wells with the plate contact mechanism and imaging system;
- (d) raising the plate contact mechanism so that the contact probes on the contact mechanism contact the bottom contact surface associated with the P×Q matrix of wells;
- (e) generating and imaging luminescence in the P×Q matrix by sequentially applying voltage to each well in the group while the group is imaged, if the plate is a single well addressable plate;
- (f) generating and imaging luminescence in the P×Q matrix by simultaneously applying voltage to each well in the matrix while the matrix is imaged, if the plate is a multi-well addressable plate; and
- (g) repeating steps (c) through (f) for additional P×Q matrices in the plate.

The removable drawer may include a light source (e.g., an LED) located underneath the detection aperture and below the elevation of plate translation stage. In one embodiment, this light source or plurality of light sources are components of the plate contact mechanism. As described above in reference to the optical focusing mechanism, the light source(s) in the contact mechanism are used in connection with the optical focusing mechanism to adjust the contrast and focus of the light detector relative to a plate.

A method for measuring luminescence from a single well addressable plate, as shown in FIGS. 10-12 and their subparts may include the steps of
- (a) loading a plate on the plate translation stage;
- (b) optionally confirming the plate as being a single well addressable plate;
- (c) moving the plate translation stage to align a first well with the plate contact mechanism and imaging system;
- (d) raising the plate contact mechanism so that the contact probes on the contact mechanism contact the bottom contact surface associated with the first well;
- (e) generating and imaging luminescence in the P×Q matrix by applying voltage to the first well while the group is imaged;
- (g) repeating steps (c) through (e) for additional wells in the plate.

In an additional embodiment, one or more light source(s) can also be used in connection with fiducial holes or windows to correct for errors in plate alignment. Light from the light source is passed through the fiducials and imaged on the imaging apparatus so as to determine the correct for the alignment of the plate. Advantageously, plates formed from plate bottoms mated to a plate top (e.g., plates with screen printed plate bottoms mated to injection-molded plate tops as described in U.S. Pat. Nos. 7,842,246 and 6,977,722, each of which is incorporated herein, include fiducials patterned (e.g., screen printed) or cut into the plate bottom to correct for misalignment of the plate bottom relative to the plate top. In one specific embodiment, the plate top on such a plate includes holes (e.g., in the outside frame of the plate top) aligned with fiducials on the plate bottom to allow imaging of the fiducials. Accordingly, the imaging of light generated under a plate may be used to communicate the exact position of the plate to the image processing software and also to provide for a camera focus check. The plate may then be realigned using a two-axis positioning apparatus. Thus, the apparatus may process plates via a plate positioning method comprising: (1) providing a plate having light-path openings; (2) illuminating the plate from the bottom; (3) detecting light coming through light-path openings; and (4) optionally, realigning the plate.

In an embodiment, the contact mechanism platform includes a first alignment mechanism, such as light outlet 722, and the light detection system comprises a camera positioned above the platform which is adjustable relative to the first alignment feature. The first alignment feature may be a light source, e.g., an LED. The camera in the light detection system is adjustable relative to the alignment feature in the x-y plane. The platform can further include a plurality of additional alignment features, e.g., at least one additional alignment feature in each quadrant, and the camera position is adjustable relative to each additional alignment feature. The additional alignment features can comprise a light source, e.g., an LED. Therefore, as described above, the apparatus may confirm proper alignment of the contact mechanism and the detection aperture using the optical focusing mechanism by: (1) illuminating the contact mechanism alignment features; (2) detecting light coming from the alignment features; and (4) optionally, realigning the plate translation stage, the light detector, and/or the contact mechanism. In an embodiment, the apparatus confirms proper alignment of the contact mechanism before making contact with the plate and then the plate position is confirmed by detecting light coming from light-path openings in the plate and realigning the plate as needed.

As illustrated in FIG. 7(a)-(b), the height of the contact mechanism platform is adjustable because the platform further includes a worm gear 723 driving leadscrew 724 and support base 700, as discussed above. In one embodiment, the gear mechanism comprises a worm gear. In an embodiment, the platform comprises a plate surface area sized to accommodate a microtitre plate, e.g., multi-well plate, and the platform further includes a spillage collection area surrounding the plate surface area to protect components of the drawer from accidental spills of fluid that may be contained within the multi-well plate.

Figure 8A:
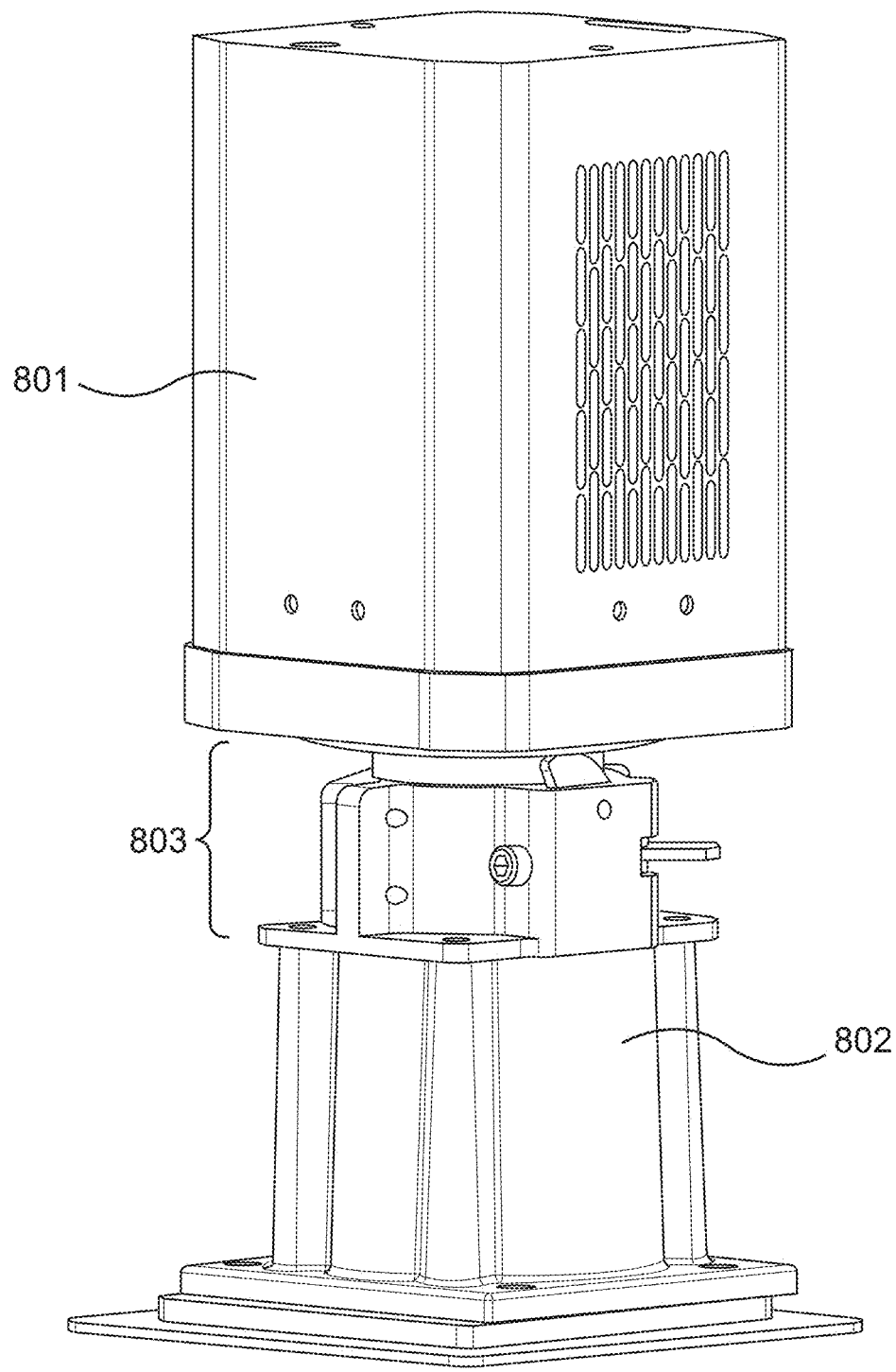
FIGS. 8(a)-(c) show various components of a light detection system.
Figure 8B:
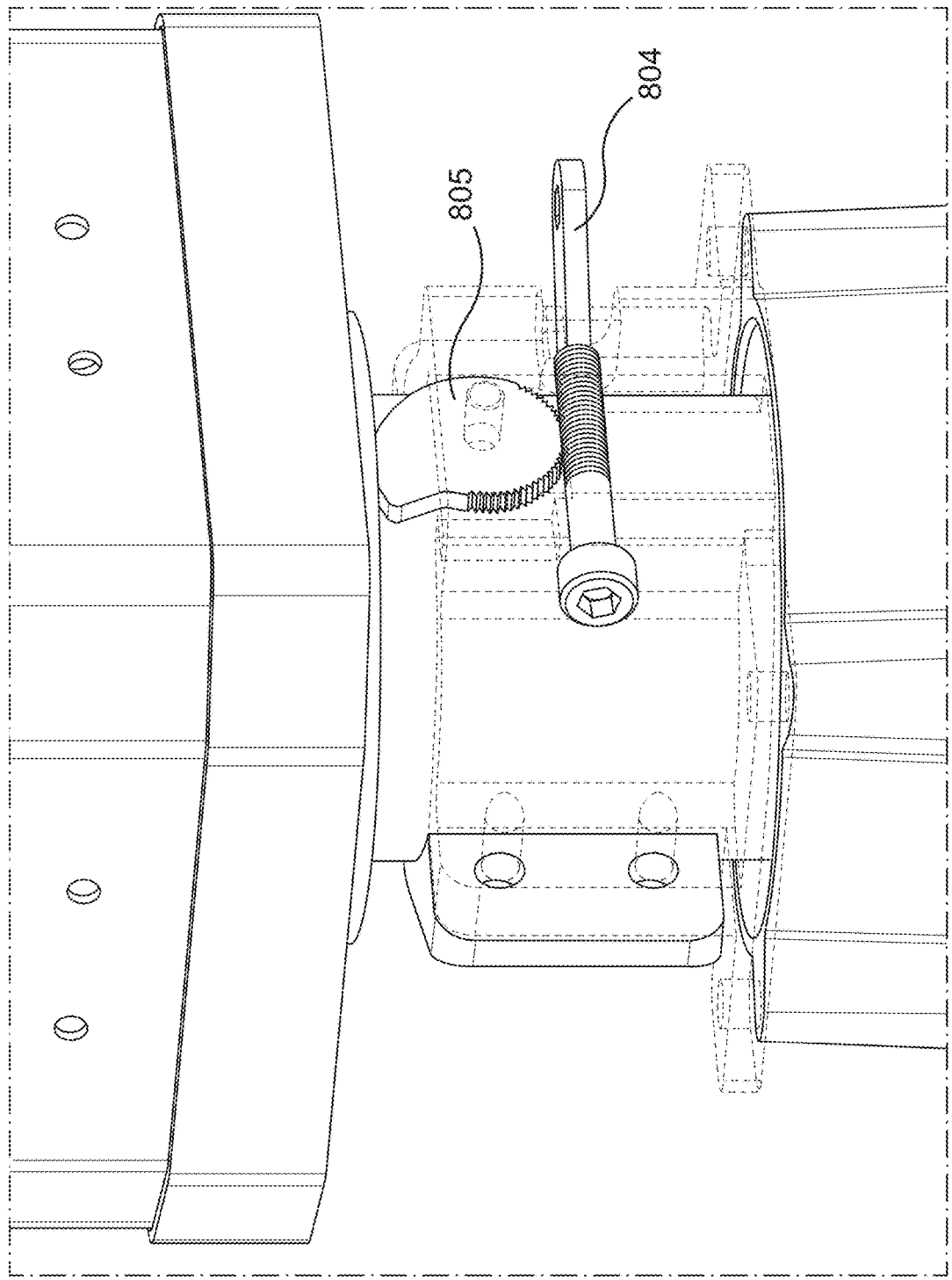
Figure 8C:
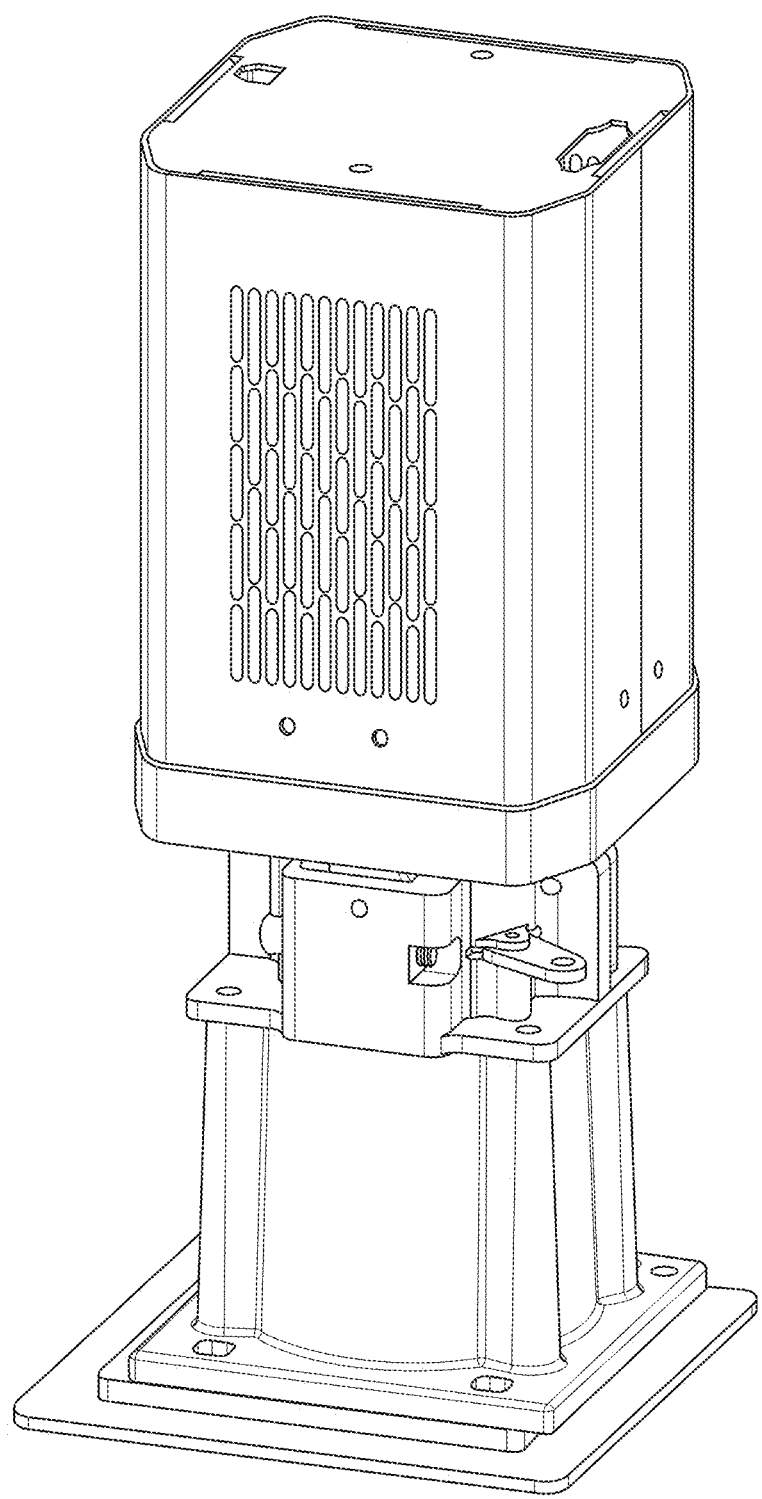

The light detection system 110 of the apparatus 100 comprises a light detector that can be mounted to a detection aperture on the housing top via a light-tight connector or baffle. In certain embodiments, the light detector is an imaging light detector such as a CCD camera and it also includes a lens. An exemplary light detection system 110 is shown in FIG. 8(a). The subsystem includes a light detector housing 801 surrounding the light detector (not shown) and attached to the housing top via a cast component 802 that is bolted to the housing top over the detection aperture. Above the cast component sits a buckle or clamp 803 that includes an adjustment mechanism comprised of screw 804 and gear 805, illustrated in FIG. 8(b), which forms a cam. This adjustment mechanism can also be used with light detection system 1010, discussed below. The camera focusing mechanism is also configured to focus the camera in the x, y, and z directions as needed, either manually, via motorized elements, or both. The light detection system further includes one or more light-tight elements to prevent light leakage within the light detection system or at the juncture between the light detection system and the housing top. For example, molded rubber or other compressible materials can be sandwiched between joined components to prevent light leakage. In addition, the light detector housing includes one or more vents and/or cooling elements to cool the light detector within the housing. In one embodiment, the housing includes an intake vent and an exhaust vent, each positioned on the opposite ends of the housing. Additional vents can be positioned in the housing. In an embodiment, the intake vent is sized to match a cooling fan positioned within the housing.

A lens, coupled to a camera, is used to provide a focused image of luminescence generated from the plates in the light-tight enclosure. A diaphragm sealed to the lens and a detection aperture in the top of enclosure and allows the imaging system to image light from the enclosure while maintaining the enclosure in a light-tight environment protected from environmental light. Suitable cameras for use in the imaging system include, but are not limited to, conventional cameras such as film cameras, CCD cameras, CMOS cameras, and the like. CCD cameras may be cooled to lower electronic noise. The lens may be a high numerical aperture lens which may be made from glass or injection-molded plastic. The imaging system may be used to image one well or multiple wells of a plate at a time. The light collection efficiency for imaging light from a single well is higher than for imaging a group of wells due to the closer match in the size of the CCD chip and the area being imaged. The reduced size of the imaged area and the increase in collection efficiency allows for the use of small inexpensive CCD cameras and lenses while maintaining high sensitivity in detection.

Figure 9A:
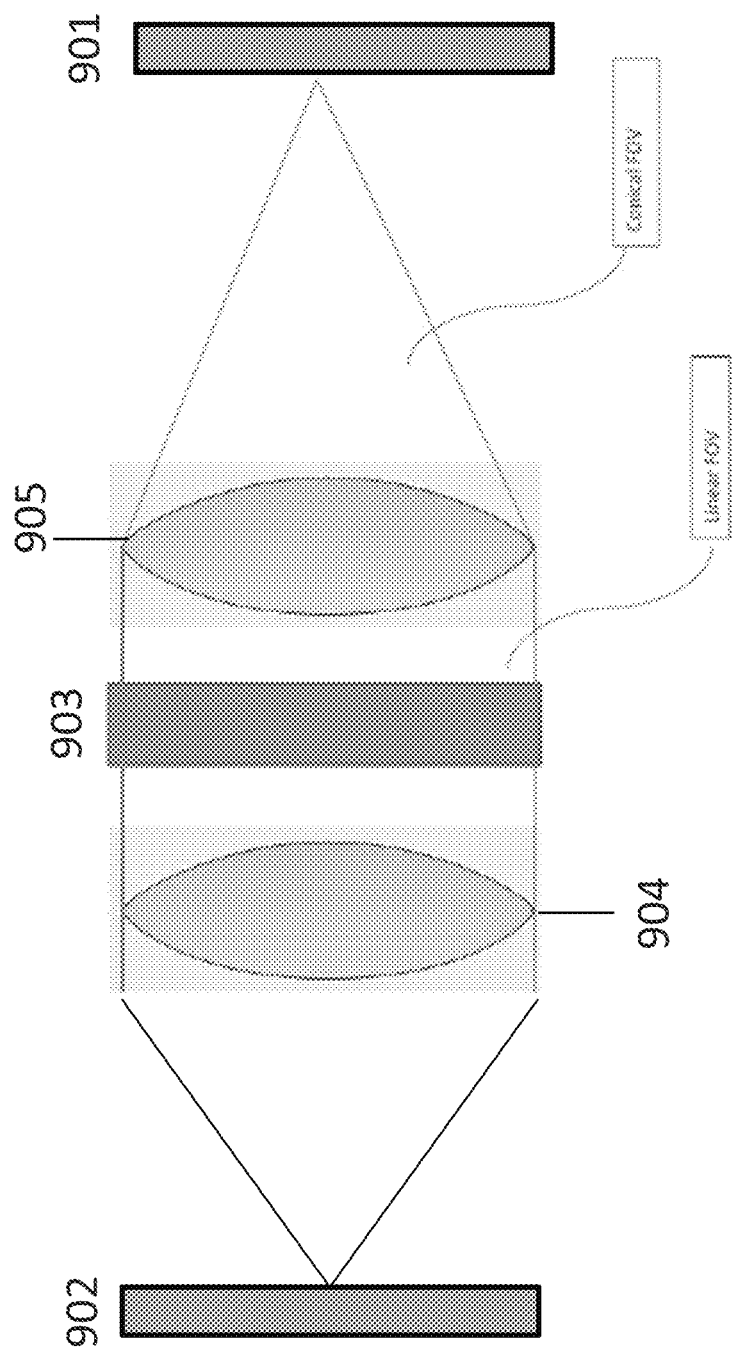
FIG. 9(a) shows one non-limiting embodiment of a lens configuration that can be used in the light detection system 110.
Figure 9B:
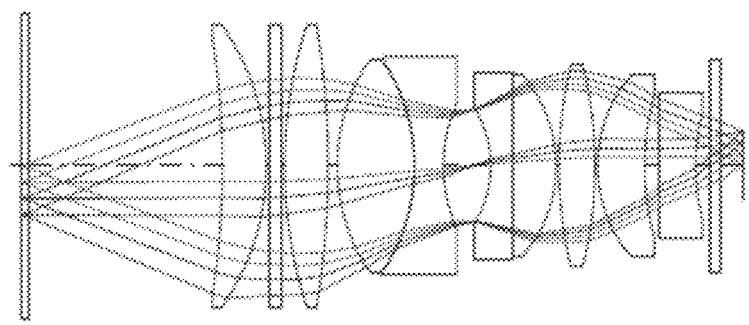
FIG. 9(b) shows another non-limiting embodiment of the lens configuration.

If high resolution is not required, the sensitivity of the measurement can be improved by using hardware binning on the CCD during image collection. Binning is a process in which charges accumulated in adjacent pixels in a CCD are combined to create a super-pixel, which effectively reduces the electronic read noise per unit area. Binning may depend on the field of view, demagnification, and size of the CCD pixels. In an embodiment, the light detector 110 of apparatus 100 comprises a camera with a CCD having 512×512 pixels, with each pixel size being 24×24 microns and a total area of 12.3×12.3 mm or about 151 mm$^2$, and a lens with an image demagnification factor of 1.45×. For such detector and lens combination, 4×4 binning (i.e., creating super-pixels by combining the 16 pixels in 4×4 groups of pixels) may be employed, resulting in a super-pixel size of approximately 100×100 microns, which translates to approximately 150-micron resolution in the object plane at the ECL electrode. Particularly advantageous, for their low cost and size, is the use of non-cooled cameras or cameras with minimal cooling (e.g., to about −20° C., about −10° C., about 0° C., or higher temperatures). In an embodiment, the light detection system includes a lens assembly consisting of a series of lens elements (904 and 905) designed to produce a telecentric view of the imaged wells and an optical bandpass filter (903) in the optical path within the lens assembly such that the light rays passing through the filter are at substantially normal incidence with respect to the filter. In the embodiment illustrated in FIG. 9(a), the camera is provided a telecentric view of the imaged wells (901). FIG. 9(b) shows another non-limiting lens configuration, which may be made from glass, for light detection system (110). This exemplary lens configuration may include 9 optical elements having no aspheric surface and FIG. 9(b) shows the optical paths from the target or wells on the right to the CCD sensor on the left with a 1.45× magnification. Such lens configuration is produced by Jenoptik AG of Germany.

Figure 10A:
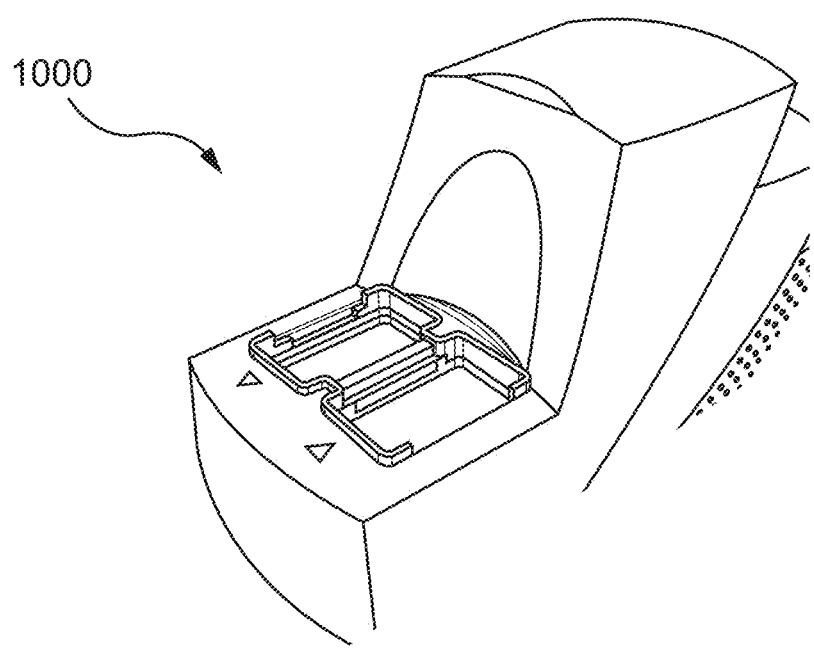
FIGS. 10(a) and (b) are a perspective and side view, respectively, of apparatus 1000 with a stylized cover.
Figure 10B:
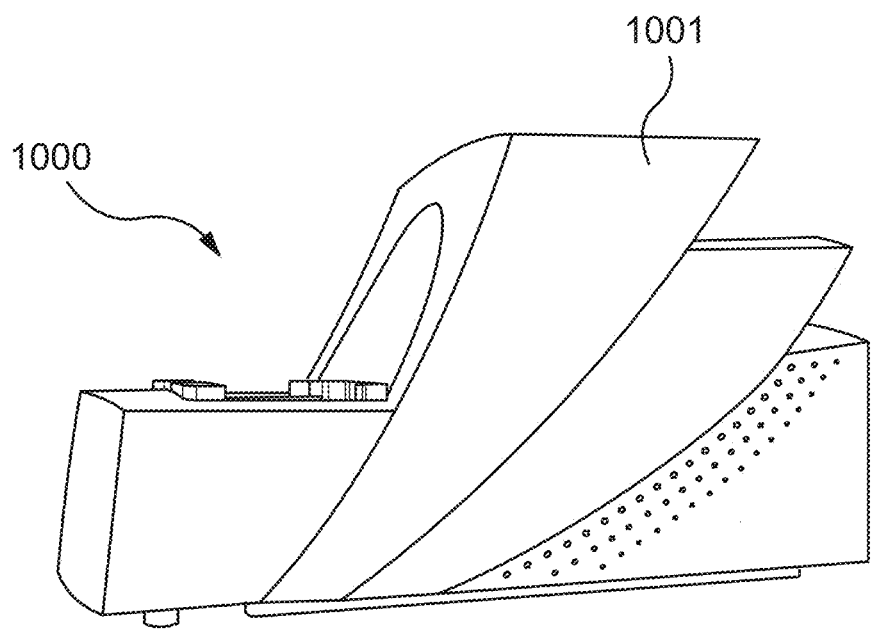
FIG. 10(c) is a perspective view of apparatus 100 with the stylized cover partially cutaway.
FIG. 10(d) is a perspective view of apparatus 1000 with the stylized cover partially cutaway.
FIGS. 10(e) and (f) are cross-sectional views of apparatus 100 and apparatus 1000 respectively.
FIG. 10(g) is a cross-sectional view of the light detection system 110 in apparatus 100 showing the tortuous light path.
FIG. 10(h) is a cross-sectional view of the door below the plate introduction/ejection apertures of both apparatus showing the cylindrical tortuous light path.
FIG. 10(i) is a cross-sectional view of the light detection system 1010 in apparatus 1000 showing the tortuous light path.
Figure 10C:
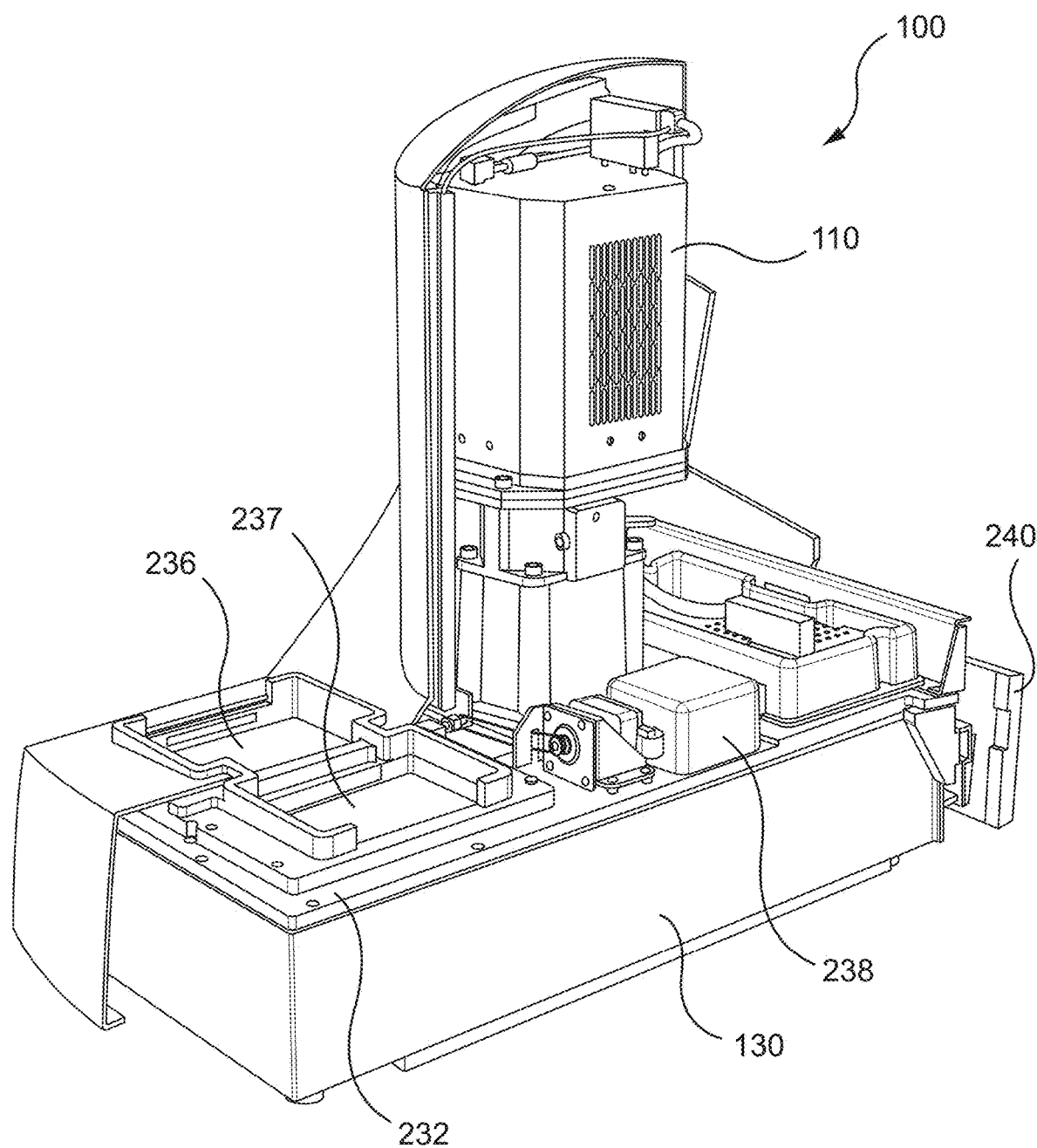
Figure 10D:
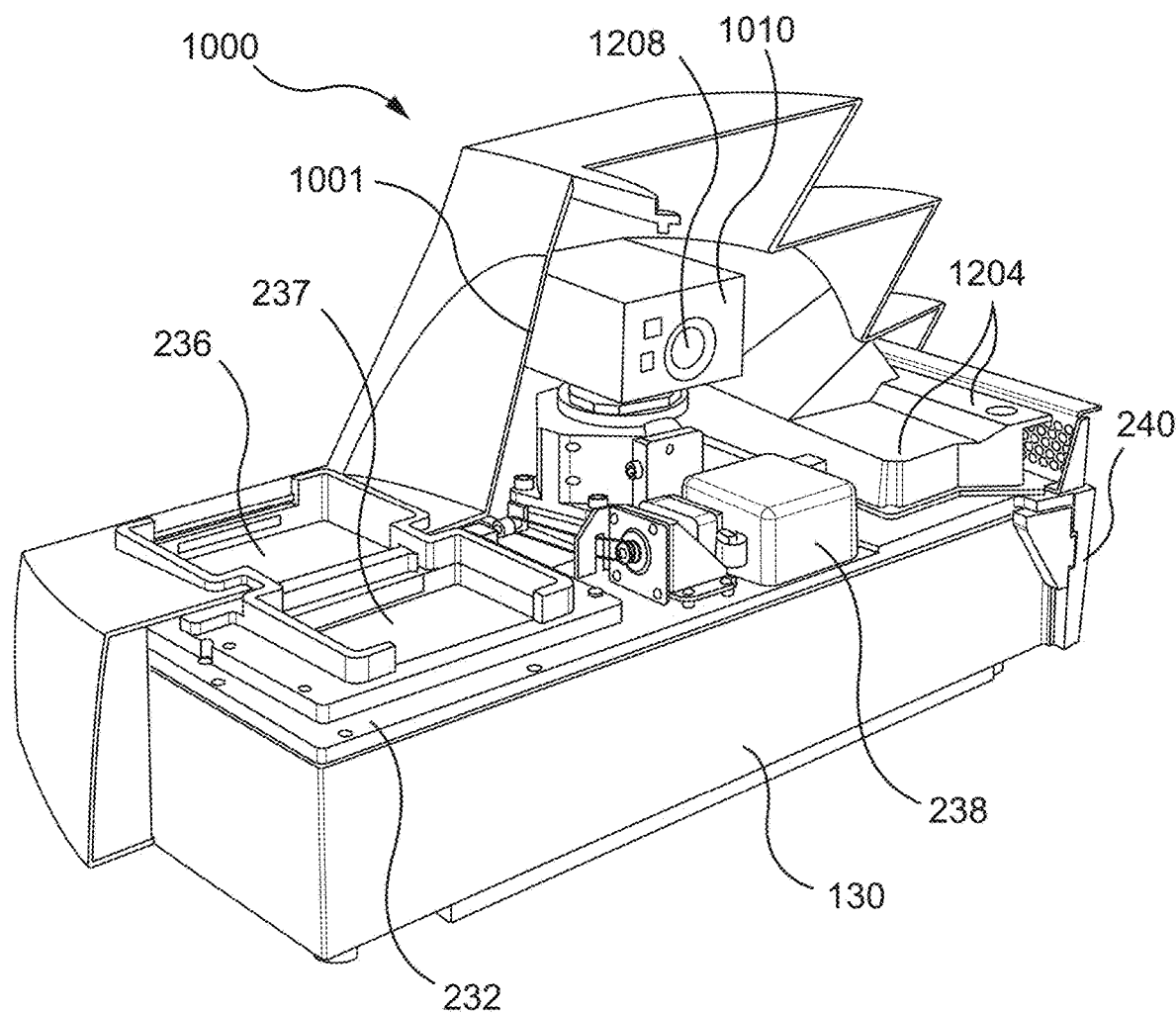
Figure 10E:
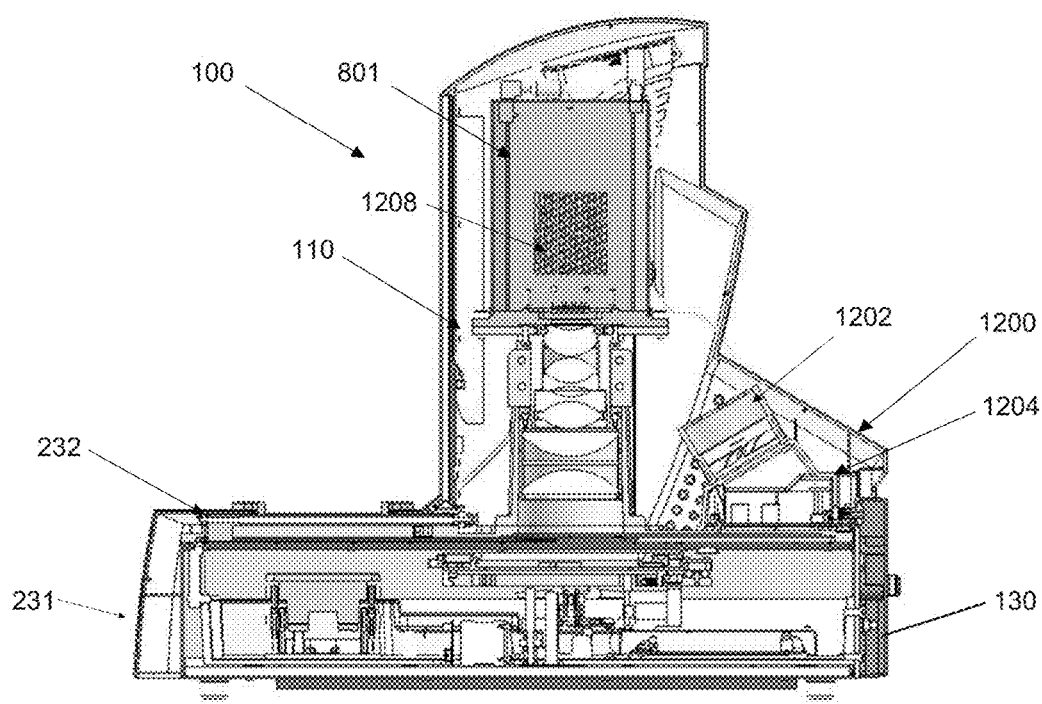
Figure 10F:
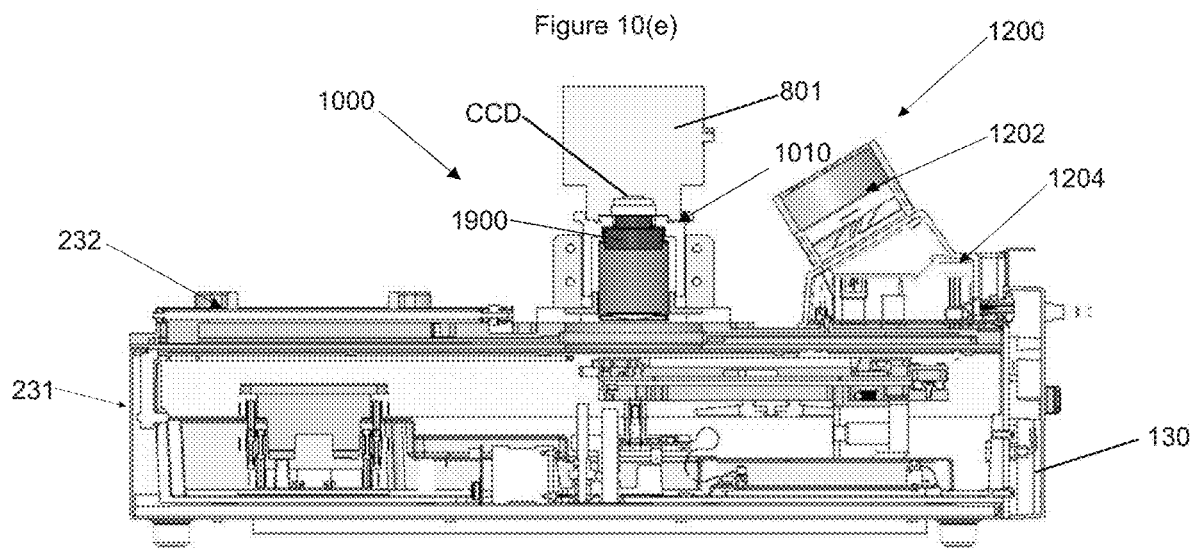
Figure 10G:
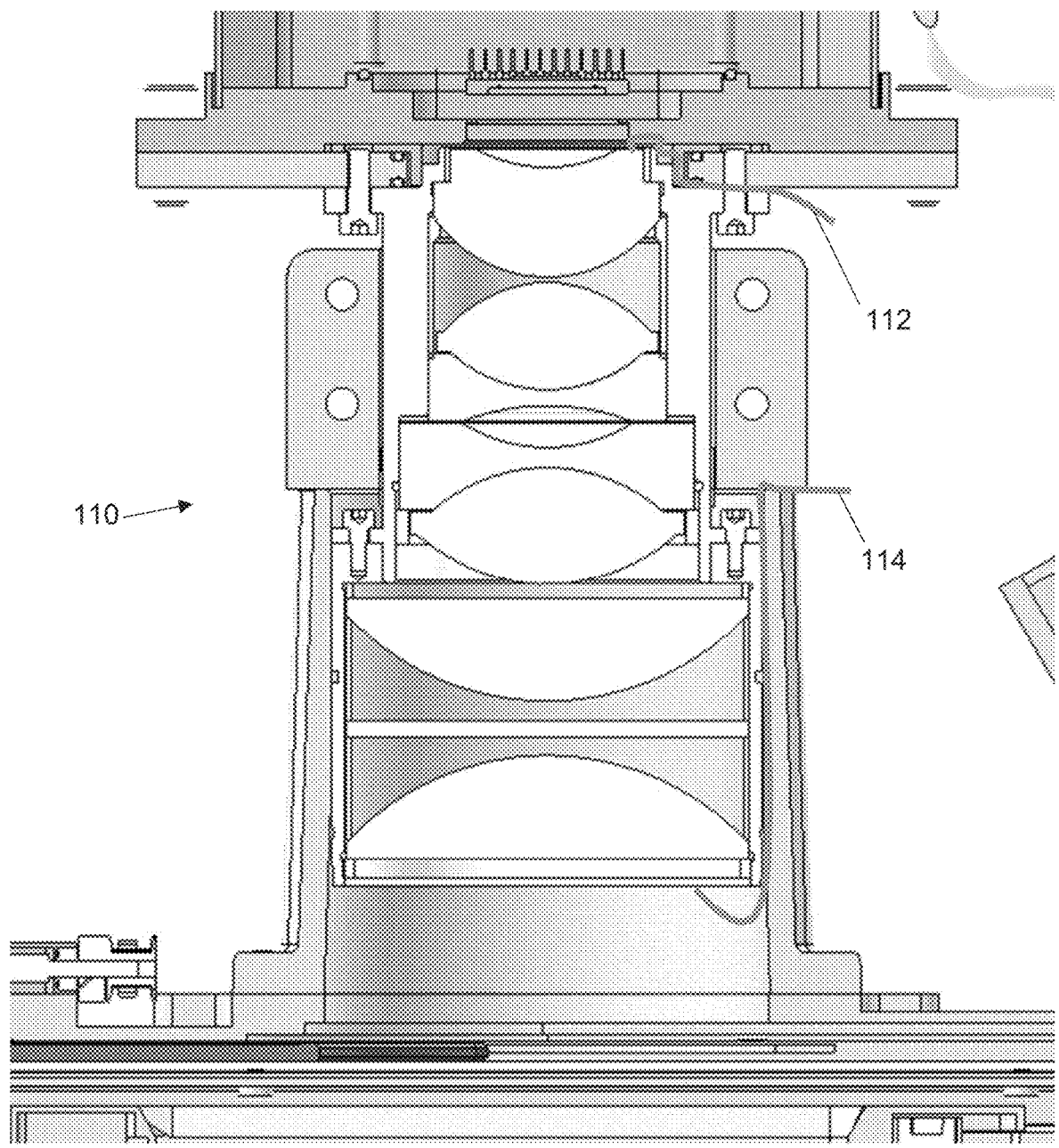
Figure 10H:
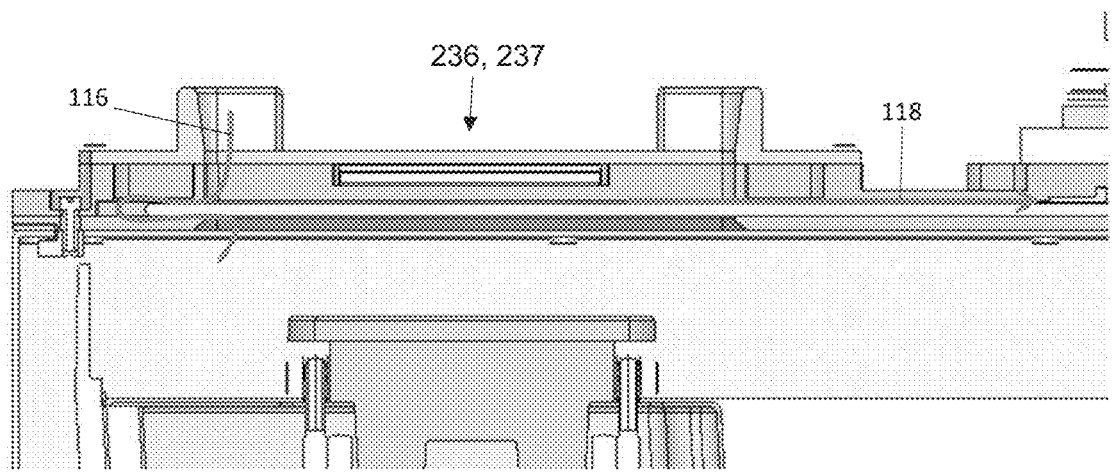
Figure 10I:
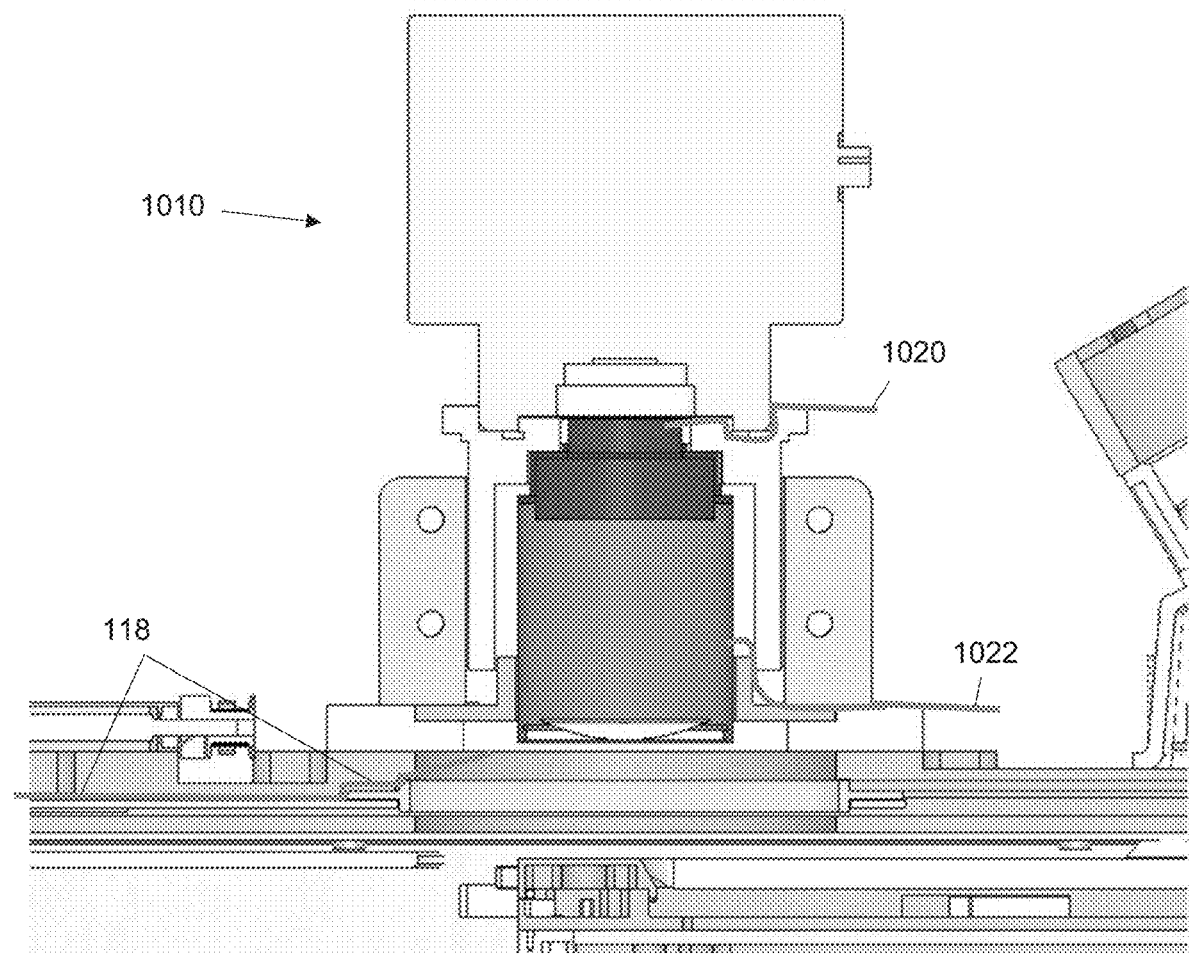
Figure 11A:
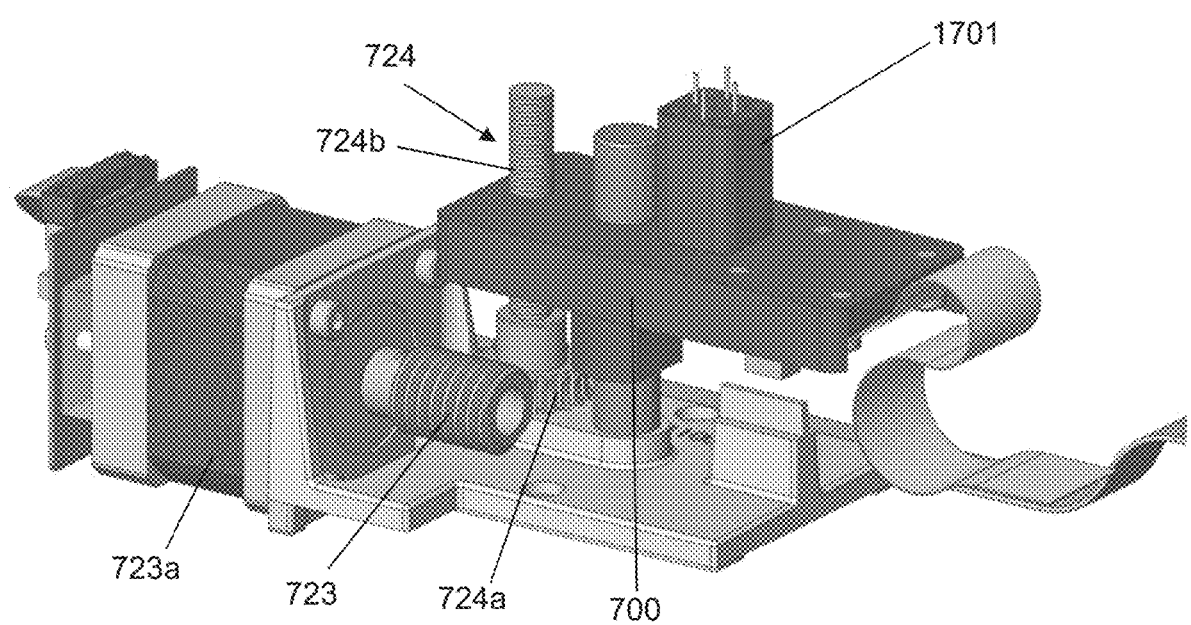
FIGS. 11(a) and (b) shows a detailed view of the plate contact mechanism for apparatus 1000.
Figure 11B:
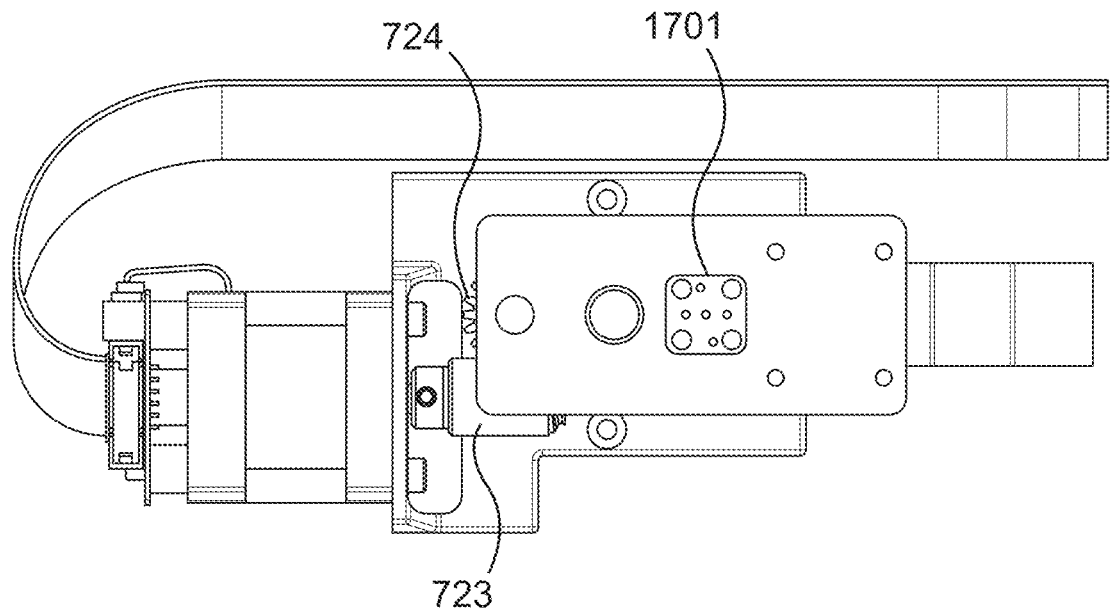
FIG. 11(c) is an enlarged view of the contact platform.
FIG. 11(d) is a diagram showing an overlap of the electrical contact pins and the electrical contacts on a single-well addressable multi-well plate.
Figure 11C:
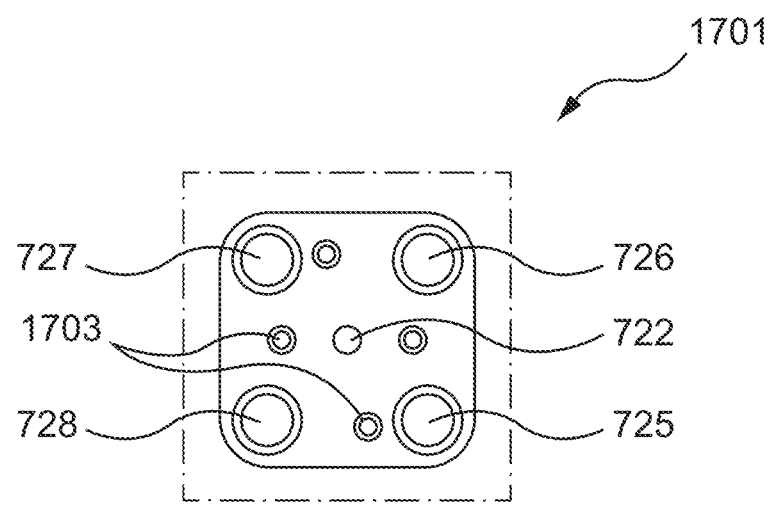
Figure 11D:
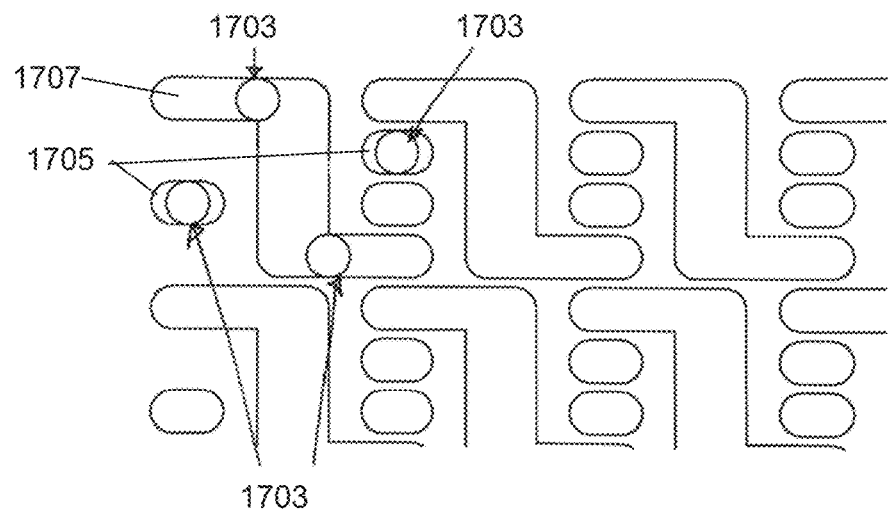

The light detection system 1010 of apparatus 1000, which as discussed above is adapted to read single-well addressable multi-well plates, can have smaller dimensions or footprint on housing top 232 than light detection system 110 of apparatus 100, as shown in FIGS. 10(c) and (d). As taught in commonly owned U.S. patent application Ser. No. 14/147,216, the light collection efficiency for imaging light from a single well is higher than imaging a group of wells due to the closer match in the size of a typical CCD chip and the area being imaged, i.e., the area of a single well in the multi-well plate. Moreover, imaging light from a single well at a time obviates the need to correct for optical cross-talk among the wells. The reduced size of the imaged area and the increase in collection efficiency allows for the use of smaller inexpensive CCD cameras and lenses while maintaining high sensitivity in detection. The CCD camera for apparatus 1000 may be smaller in size and has lower current and power requirements than the CCD camera for apparatus 100.

In one example, the CCD camera for light detection system 1010 has 1392 pixels×1040 pixels, and each pixel is 6.45×6.45 μm. The total area of the CCD is about 8.98 mm×6.7 mm or about 60 mm$^2$, which is smaller than the CCD camera for light detection system 110. A typical diameter at the top edge of well in a 96-well plate is about 7 mm and each well would have an area of about 35 mm$^2$. The area of the CCD may range from approximately 1× to 2× the area of the top of a well, from about 1.25× to about 1.85×, or from about 1.5× to 1.8×. A suitable CCD camera for light detection system 1010 includes ATIK 414-SQ-MSD, 16-bit camera manufactured by Artemis CCD, Ltd., which uses a Sony ICX 825 CCD. The CCD camera for light detection system 1010 generally consumes only 10 Watts of power with a maximum of 24 watts, and therefore stylized cover 1001 of apparatus 1000 does not require as much ventilation compared to the stylized cover of apparatus 100, which employs a CCD camera with higher power consumption. Due to the smaller size of the CCD, the camera uses less power to cool the CCD. This results in an overall cooler environment, which results in less temperature rise on the plate as the plate is being read in the instrument. The reduced temperature rise in the plate results in lower CoV's between wells within a plate (intraplate) and between plates (interplate) for assays read on the instrument. The lens usable with light detection system 1010 has a 1:1 magnification ratio, without any magnification or demagnification. The magnification factor is also optimized in accordance with the CCD that the lenses are matched, the resolution of the CCD and the signal to noise capabilities of the CCD. In other words, too little light per pixel would degrade sensitivity of the overall system due to low signal to noise ratio, and too much light per pixel would saturate the pixels early thereby limiting the dynamic range of the system. Additional optimizations are further described below. A 4×4 binning technique executed on the camera may be employed. Ferrite cored electrical wire, such as wires, and ferrite beads or chokes 418 (as shown in FIG. 4(c)) are not required in the electrical wires for light detection system 1010, which may employ standard USB wires and connectors.

Figure 14:
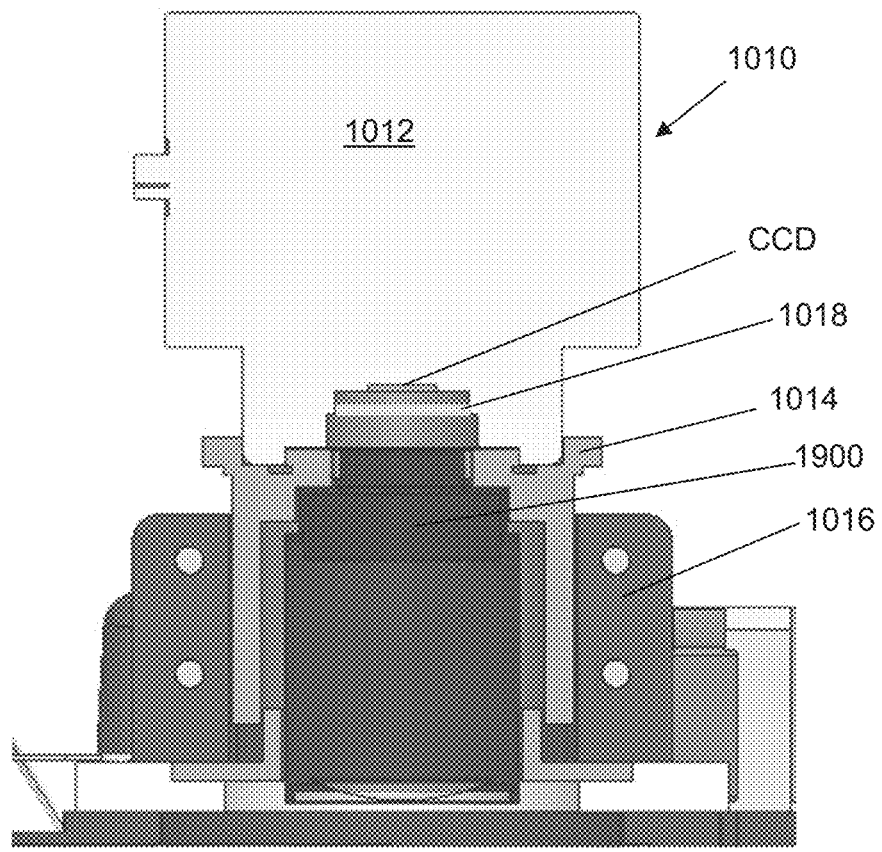
FIG. 14 is a cutaway view of light detection system 1010.

Light detection system 1010 is further illustrated in FIG. 14. Camera 1012 is sitting atop this detection system. The CCD sensor is positioned on one end of lens system 1900, discussed below. In an exemplary system, the camera window may comprise an optical bandpass filter located in the optical path. A camera to lens adaptor 1014 is provided to attach the lenses to camera 1012. A clamping mechanism 1016 secures the light detection system to housing top 232.

An optical bandpass 1018 may be included in the optical path to limit the wavelengths of light passing through lens system 1900. The range of wavelengths passing through optical bandpass 1018 may be discussed below. An advantage of using adaptors, such as lens adaptor 1014, is that the adaptors can be adjusted to fit different lens systems.

Figure 15A:
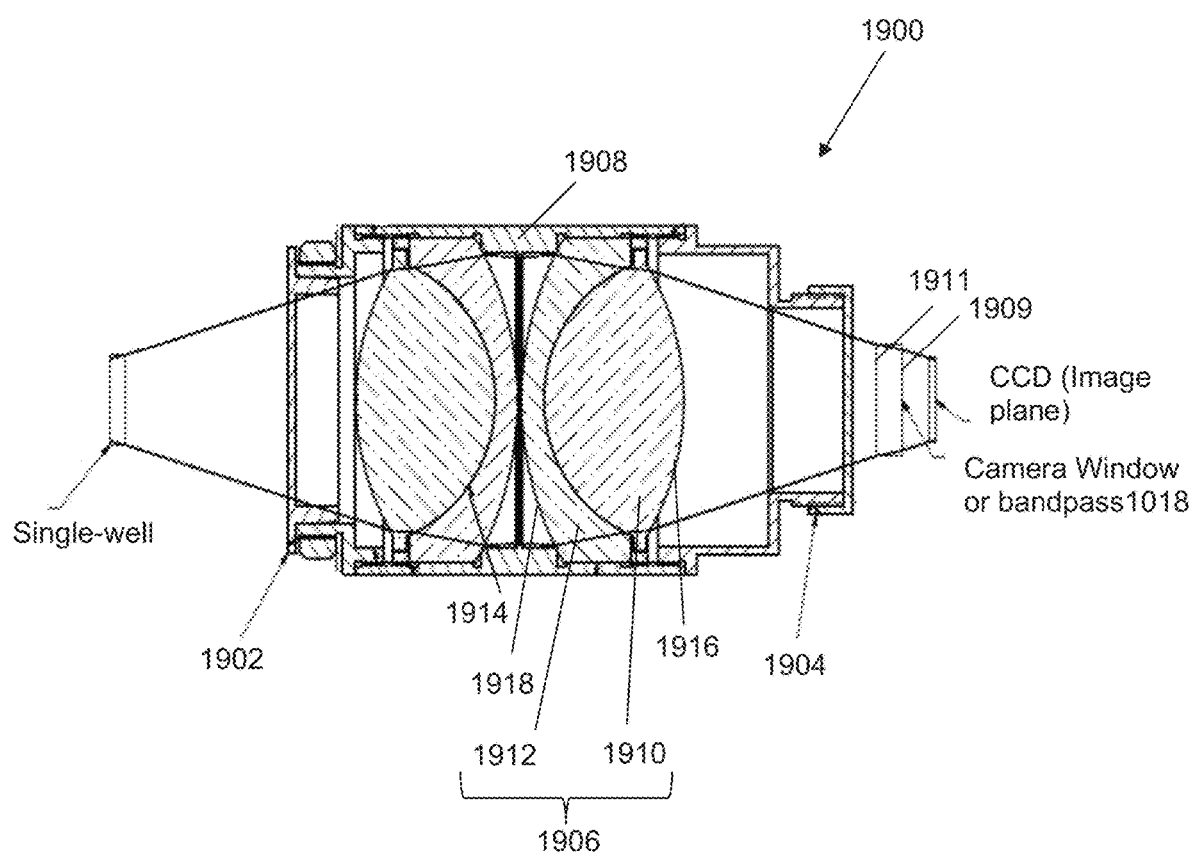
FIG. 15(a) is a schematic view of one non-limiting embodiment of a lens configuration in light detection system 1010.
Figure 15B:
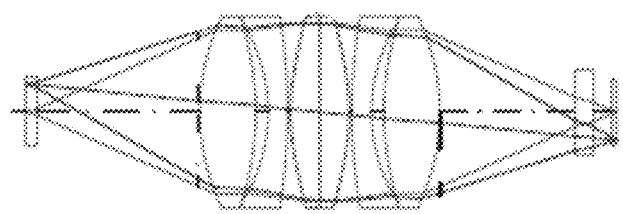
FIG. 15(b) shows another non-limiting embodiment of the lens configuration.

A suitable, exemplary lens system 1900 illustrated in FIG. 15(*a*) is located between a single well on the multi-well plate and the CCD sensor. In one exemplary embodiment, the lens system is designed for a spectral band from about 550 nm to about 750 nm, and from about 570 nm to about 670 nm at half-power. Such band of wavelengths may be provided by a CCD camera window made from, for example, a long wave pass colored glass filter with an anti-reflection (AR) coating 1909 on the side proximate to the CCD surface and multi-layer coatings 1911 on the distal surface to suppress transmission of infrared (IR) wavelengths through the filter by destructive optical interference of IR wavelengths. In this embodiment, the lens design and production of the dielectric interface filter can be simplified by requiring fewer layers, thus minimizing the likelihood of defects in the coating. In another embodiment, such band of wavelengths can be provided by a CCD camera window made from optically clear glass with an anti-reflection (AR) coating on the side proximate to the CCD surface and multi-layer coatings on the distal surface to allow transmission of the spectral band that the lens system is designed for, while excluding wavelengths outside of this spectral band. In these embodiments, the AR coating are be provided on the side proximate to the CCD surface, which can help to minimize the light reflected from the CCD surface onto the window to be reflected back on to the CCD. By utilizing the CCD camera window with this optical filter coating, a separate optical filter, such as optical bandpass filter 903 or 1018 described above, can be omitted. This allows ECL wavelengths to pass through while blocking the signals from the read buffer background. This also reduces the number of optical elements to reduce surface reflections and scattering and improve light transmission, as discussed below. This coating also improves signal-to-background noise and thus increases sensitivity during ECL generation. The lens system illustrated in FIGS. 9(*a*)-(*b*) in light detection system 110 may also use such glass bandpass filter. The lens system 1900 may be dimensionally larger than the area of the single well or the CCD. Without being bound to any particular theory, larger lenses can maintain high light collection efficiency by capturing a wider cone angle of light. Lens system 1900 has caps 1902, 1904 located on the ends thereof, which protect the optical elements during shipping and are removed before installation. Two exemplary double elements 1906 are disposed in housing 1908 in reverse orientation relative to each other. Each double element 1906 comprises outer lens 1910 and inner lens 1912 contacting each other at spherical surface 1914. Outer surface 1916 and inner surface 1918 are aspheric. Aspheric lenses have surface profiles that are not portions of a sphere or cylinder. Aspheric lenses are utilized in optical systems for various reasons, including but not limited to reducing optical aberrations such as astigmatism and simplifying more complex optical systems. Aspheric lenses can also be used to reduce the thickness of the lenses. Other suitable lens systems are disclosed in commonly own U.S. patent application publication No. US 2012/0195800 and international application publication No. WO 2009/126303, which are incorporated herein by reference in their entireties. The lenses discussed herein can be made from glass or plastics.

The lens system of apparatus 1000 is further optimized by using fewer number of lenses (e.g., five lenses in light detection system 1010 versus nine lenses in light detection system 110). Fewer lenses minimize the number of reflections at surface interfaces and decrease cross-talk. Fewer lenses also maximize light transmission and light collection, so that more of the light captured in the lenses' field of view reaches the CCD. For apparatus 1000, the number of lenses may be less than 9 or less than 7 and greater than or equal to 5. Light collection and light transmission can be further maximized by selecting the numerical aperture. Numerical aperture (NA) of an optical system characterizes the range of angles over which the optical system can accept or emit light. Generally, $NA = n_1 \cdot \sin \theta_1 = n_2 \cdot \sin \theta_2$ where n is the index of refraction of a medium (e.g., air, glass, water, oil) through which light travels, and $\theta$ is the half-angle of the maximum cone of light that can enter or exit a lens. Under Snell's law, NA remains the same for any n and $\theta$ across an interface. In one example, a high numerical aperture would capture more light from the spot(s) in a well or the angle of the light can be shallow with respect to the lenses and the light would still be captured by the lenses. The lenses are optimized for both single-spot or multiple-spot, e.g. 10-spot, well configurations by minimizing cross-talk, i.e., minimizing the number of optical elements to minimize reflections and scattering, coating the lenses or camera window with AR coating. Additional optimizations are accomplished during the processing steps, discussed in details below.

FIG. 15(*b*) shows a non-limiting lens configuration for light detection system 1010, which may be made from glass. This exemplary lens configuration comprises 5 optical elements which may have a minimal number of aspheric surface(s) and FIG. 15(*b*) shows the optical paths from the target or wells on the right to the CCD sensor on the left with no magnification, i.e., 1.0×. Such lens configuration is produced by Jenoptik AG of Germany.

The CCD cameras, such as those employed in both light detection systems 110 and 1010, have known defects on single pixels or clusters of pixels in the horizontal direction, vertical direction, or both on the CCD sensor. The software within the CCD cameras or within apparatus 100 or 1000 contains features to correct this type of defect by averaging out or interpolating the pixels on either side of the defective pixel or cluster. Since the pattern of defects always remains the same in any particular CCD sensor, a defect map can be created that can be used to correct the defects in the images made with the CCD camera.

The housing top of the plate handling system further includes a plate stacker mounted on the housing top, above the plate introduction apertures, wherein the plate stackers are configured to receive or deliver plates to the plate elevators. The plate stacker can include a removable stacking nest configured to house a plurality of plates and prevent shifting of plates on the instrument, thereby coordinating the proper introduction of each plate in the stacking nest onto the plate elevator. In one embodiment, the stacking nest can accommodate at least 5 plates, or at least 10 plates, and the stacking nest can accommodate a plate nesting extension element configured to further extend the capacity of the stacking nest. The plate elevator comprises a plate detection sensor, e.g., a capacitance sensor, and the stacker can also include a plate detection sensor, e.g., a capacitance, weight, or optical sensor.

A method is provided for using the apparatus for conducting measurements in multi-well plates. The plates may be conventional multi-well plates, including multi-spot plates. Measurement techniques that may be used include, but are not limited to, techniques known in the art such as cell culture-based assays, binding assays (including agglutination tests, immunoassays, nucleic acid hybridization assays, etc.), enzymatic assays, colorimetric assays, etc. Other suitable techniques will be readily apparent to one of average skill in the art.

Methods for measuring the amount of an analyte also include techniques that measure analytes through the detection of labels which may be attached directly or indirectly (e.g., through the use of labeled binding partners of an analyte) to an analyte. Suitable labels include labels that can be directly visualized (e.g., particles that may be seen visually and labels that generate a measurable signal such as light scattering, optical absorbance, fluorescence, chemiluminescence, electrochemiluminescence, radioactivity, magnetic fields, etc.). Labels that may be used also include enzymes or other chemically reactive species that have a chemical activity that leads to a measurable signal such as light scattering, absorbance, fluorescence, etc. The formation of product may be detectable, e.g., due a difference, relative to the substrate, in a measurable property such as absorbance, fluorescence, chemiluminescence, light scattering, etc. Certain (but not all) measurement methods that may be used with solid phase binding methods according to the invention may benefit from or require a wash step to remove unbound components (e.g., labels) from the solid phase In one embodiment, a measurement done with the apparatus of the invention may employ electrochemiluminescence-based assay formats, e.g. electrochemiluminescence based immunoassays. The high sensitivity, broad dynamic range, and selectivity of ECL are important factors for medical diagnostics. Commercially available ECL instruments have demonstrated exceptional performance and they have become widely used for reasons including their excellent sensitivity, dynamic range, precision, and tolerance of complex sample matrices. Species that can be induced to emit ECL (ECL-active species) have been used as ECL labels, e.g., (i) organometallic compounds where the metal is from, for example, the noble metals of group VIII, including Ru-containing and Os-containing organometallic compounds such as the tris-bipyridyl-ruthenium (RuBpy) moiety, and (ii) luminol and related compounds. Species that participate with the ECL label in the ECL process are referred to herein as ECL co-reactants. Commonly used coreactants include tertiary amines (e.g., see U.S. Pat. No. 5,846,485), oxalate, and persulfate for ECL from RuBpy and hydrogen peroxide for ECL from luminol (see, e.g., U.S. Pat. No. 5,240,863). The light generated by ECL labels can be used as a reporter signal in diagnostic procedures (Bard et al., U.S. Pat. No. 5,238,808, herein incorporated by reference). For instance, an ECL label can be covalently coupled to a binding agent such as an antibody, nucleic acid probe, receptor, or ligand; the participation of the binding reagent in a binding interaction can be monitored by measuring ECL emitted from the ECL label. Alternatively, the ECL signal from an ECL-active compound may be indicative of the chemical environment (see, e.g., U.S. Pat. No. 5,641,623 which describes ECL assays that monitor the formation or destruction of ECL coreactants). For more background on ECL, ECL labels, ECL assays and instrumentation for conducting ECL assays see U.S. Pat. Nos. 5,093,268; 5,147,806; 5,324,457; 5,591,581; 5,597,910; 5,641,623; 5,643,713; 5,679,519; 5,705,402; 5,846,485; 5,866,434; 5,786,141; 5,731,147; 6,066,448; 6,136,268; 5,776,672; 5,308,754; 5,240,863; 6,207,369; 6,214,552 and 5,589,136 and Published PCT Nos. WO99/63347; WO00/03233; WO99/58962; WO99/32662; WO99/14599; WO98/12539; WO97/36931 and WO98/57154, all of which are incorporated herein by reference.

In certain embodiments, plates adapted for use in electrochemiluminescence (ECL) assays are employed as described in U.S. Pat. No. 7,842,246, which is incorporated by reference herein. The apparatus of the invention may use plates that are configured to detect ECL from one well at a time or more than one well at a time. As described above, plates configured to detect ECL one well at a time or more than one well at a time include electrode and electrode contacts that are specifically patterned to allow application of electrical energy to electrodes in only one well at a time or more than one well at a time. The apparatus may be particularly well-suited for carrying out assays in plates containing dry reagents and/or sealed wells, e.g., as described in U.S. Pat. No. 7,807,448 of Glezer et al, which is incorporated by reference herein.

In an embodiment, the method comprises: (a) introducing a plate to a plate stacker, (b) opening the light-tight door, (c) lowering the plate from the plate stacker to the lifting platform on the plate translation stage, (d) sealing the light-tight door, (e) translating the plate to position one or more wells under the light detector, (f) detecting luminescence from the one or more wells, (g) opening the light-tight door, (h) translating the plate to a position under a plate stacker, and (i) raising the plate to the plate stacker. In an embodiment, the method also includes reading a plate identifier on the plate and identifying the plate configuration, translating the plate to position the one or more wells under the light detector, optionally imaging one or more alignment features on the contact mechanism and adjusting the position of the light detector relative to the contact mechanism, and selectively applying potential within one or more interrogation zones based on the plate configuration. The method may further comprise translating the plate carriage to position one or more additional wells under the light detector and detecting luminescence from the one or more additional wells. The method may also, optionally, comprise applying electrical energy to electrodes in one or more of the wells (e.g., to induce electrochemiluminescence).

ECL-based multiplexed testing is described in U.S. Publications 2004/0022677 and 2004/0052646 of U.S. Pat. Nos. 7,842,246 and 6,977,722, respectively; U.S. Publication 2003/0207290 of U.S. Pat. No. 7,063,946; U.S. Publication 2003/0113713 of U.S. Pat. No. 7,858,321; U.S. Publication 2004/0189311 of U.S. Pat. No. 7,497,997; and U.S. Publication 2005/0142033 of U.S. Pat. No. 7,981,362, each of which is incorporated herein by reference.

A method is also provided for conducting assays for biological agents using the apparatus described herein. In an embodiment, the method is a binding assay. In another embodiment, the method is a solid-phase binding assay (in one example, a solid phase immunoassay) and comprises contacting an assay composition with one or more binding surfaces that bind analytes of interest (or their binding competitors) present in the assay composition. The method may also include contacting the assay composition with one or more detection reagents capable of specifically binding with the analytes of interest. The multiplexed binding assay methods according to embodiments herein can involve a number of formats available in the art. Suitable assay methods include sandwich or competitive binding assays format. Examples of sandwich immunoassays are described in U.S. Pat. Nos. 4,168,146 and 4,366,241, each of which are incorporated herein by reference. Examples of competitive immunoassays include those disclosed in U.S. Pat. Nos.

4,235,601; 4,442,204; and 5,208,535 to Buechler et al., each of which are incorporated herein by reference. In one example, small molecule toxins such as marine and fungal toxins can be advantageously measured in competitive immunoassay formats.

In one example, apparatus 100 as described above is an ECL reader adapted to perform ECL testing on either (i) multi-well addressable, multi-well plates, e.g., four-well addressable, 96-well plates or (ii) single well addressable, multi-well plates, e.g., a single well addressable, 96-well plates. The wells can be 1-spot or 1-spot small spot, 4-spot, 7-spot, 10-spot. Apparatus 100 can read a plate in either about 1:29 minutes or 2:42 minutes depending on multi-well addressable or single well addressable mode. For a properly calibrated ECL reader, the 10-spot dark noise is about 13/14 ECL counts and the 10-spot saturation is about $1.9 \times 10^6/2.2 \times 10^6$ ECL counts depending on the mode, resulting in an effective dynamic range (saturation value/dark noise) of about $1.4 \times 10^5$ to about $1.5 \times 10^5$. A non-limiting, exemplary calibrated ECL reader is an instrument calibrated to provide a nominal signal of 15,000 counts for the ECL generated in an MSD QUICKPLEX plate containing MSD Free Tag ECL 15,000 solution available from Meso Scale Diagnostics in Rockville, Maryland Apparatus 100 is compatible with V-PLEX, U-PLEX and R-PLEX assay kits, also available from Meso Scale Diagnostics. V-PLEX, U-PLEX and other assay kits are described in commonly owned international published patent application Nos. WO 2018/017156A1 and WO 2017/015636A1, which are incorporated herein by reference in their entireties.

In another example, apparatus 1000 as described above is an ECL reader designed to perform ECL testing on single well addressable, multi-well plates, e.g., a single well addressable, 96-well plates 1-spot or a single well addressable, 96-well plates 1-spot small spot. Apparatus 100 may also be used with 4-spot, 7-spot, or 10-spot plates. When properly calibrated as discussed above, Apparatus 1000 can read one such plate in about 2:37 minutes with 1-spot dark noise of about 3 ECL counts, and 1-spot saturation is about $1.3 \times 10^6$ ECL counts, resulting in an effective dynamic range (saturation value/dark noise) of about $4.3 \times 10^5$. Apparatus 1000 is compatible with U-PLEX and R-PLEX assay kits, available from Meso Scale Diagnostics in Rockville, Maryland. The specifications for a non-limiting exemplary apparatus 1000 is as follows:

| | |
|---|---|
| Dynamic Range | Greater than $10^5$ |
| Read Volume (96-well plates) | 150 µL |
| Plate Read Time | 2 minutes 37 seconds |
| Plate Capacity | 5 plates on the input stack/5 plates on the output stack |
| Operating Temperature Range | 68-78° F. (20-26° C.) |
| Operating Humidity Range | 10-80% relative humidity (non-condensing) |
| Maximum Altitude | 6,500 ft (2,000 m) |
| Storage Conditions | 0° F. (−18° C.) @ 50% relative humidity to 122° F. (50° C.) @ 85% relative humidity (non-condensing) |
| Measured Sound Level | 59 dbA |
| Instrument Weight | 36.4 lb (16.5 kg) |
| Instrument Size (W × D × H) | The minimum amount of space required for the instrument, power supply, UPS, and laptop is: 13 in × 23 in × 21 in (33 cm × 58 cm × 53 cm) |
| Power | 100-240 V-, 50/60 HZ. 120 W peak measured power consumption for the reader, laptop, and UPS. |

Binding reagents that can be used as detection reagents, the binding components of binding surfaces and/or bridging reagents include, but are not limited to, antibodies, receptors, ligands, haptens, antigens, epitopes, mimitopes, aptamers, hybridization partners, and intercalaters. Suitable binding reagent compositions include, but are not limited to, proteins, nucleic acids, drugs, steroids, hormones, lipids, polysaccharides, and combinations thereof. The term "antibody" includes intact antibody molecules (including hybrid antibodies assembled by in vitro re-association of antibody subunits), antibody fragments, and recombinant protein constructs comprising an antigen binding domain of an antibody (as described, e.g., in Porter & Weir, J. Cell Physiol., 67 (Suppl 1):51-64, 1966; Hochman et al., Biochemistry 12:1130-1135, 1973; hereby incorporated by reference). The term also includes intact antibody molecules, antibody fragments, and antibody constructs that have been chemically modified, e.g., by the introduction of a label.

Measured, as used herein, is understood to encompass quantitative and qualitative measurement, and encompasses measurements carried out for a variety of purposes including, but not limited to, detecting the presence of an analyte, quantitating the amount of an analyte, identifying a known analyte, and/or determining the identity of an unknown analyte in a sample. According to one embodiment, the amounts the first binding reagent and the second binding reagent bound to one or more binding surfaces may be presented as a concentration value of the analytes in a sample, i.e., the amount of each analyte per volume of sample.

Analytes may be detected using electrochemiluminescence-based assay formats. Electrochemiluminescence measurements may be carried out using binding reagents immobilized or otherwise collected on an electrode surface. Example electrodes include screen-printed carbon ink electrodes which may be patterned on the bottom of specially designed cartridges and/or multi-well plates (e.g., 24-, 96-, 384- etc. well plates). Electrochemiluminescence from ECL labels on the surface of the carbon electrodes is induced and measured using an imaging plate reader as described in U.S. Pat. Nos. 7,842,246 and 6,977,722 (both entitled "Assay Plates, Reader Systems and Methods for Luminescence Test Measurements", filed on Jun. 28, 2002, hereby incorporated by reference). Analogous plates and plate readers are now commercially available (MULTI-SPOT® and MULTI-ARRAY® plates and SECTOR® instruments, Meso Scale Discovery, a division of Meso Scale Diagnostics, LLC, Rockville, MD).

In one embodiment, antibodies that are immobilized on the electrodes within the plates may be used to detect the selected biological agent in a sandwich immunoassay format. In another embodiment, microarrays of antibodies, patterned on integrated electrodes within the plates, will be used to detect the plurality of the selected biological agents in a sandwich immunoassay format. Accordingly, each well contains one or more capture antibodies immobilized on the working electrode of the plate and, optionally, in dry form or as separate components, e.g., in a kit, labeled detection antibodies and all additional reagents necessary for analysis of samples, and for carrying out positive and negative controls.

The ECL readers such as apparatus 100 and 1000, described above, are qualified before the first use or on a regular basis. The steps to qualify the ECL reader should be completed together and at the beginning of the qualification process, because having an operational ECL reader is necessary for any assay runs. The ECL qualification includes the step of running the ECL reader with an electronic plate, which measures the electrical current applied to the plate.

This ensures that the applied electrical current is adequate and uniform. Another step, which may be the next step, is to run the ECL reader with an empty assay microplate, e.g., an MSD 96-well plate, to measure the level of electronic noise or background/dark noise within the ECL reader. Another step, which may follow the other two steps, is to fill an assay tray with a reagent consisting of unbound SULFO-TAG in Meso Scale Diagnostics Read Buffer (hereafter referred to as "free tag") to verify that the ECL reader is reading the expected count. For example, a 300,000 count free tag may be used as a detection reagent to generate ECL signals. Hence, the ECL reader should read about 300 k count from each well within a small predetermined range. The 300 k free tag is available from Meso Scale Diagnostics.

In one example, an electronic plate that resemble a standard 96-well plate with 8 rows (A-H) and 12 columns (1-12), the qualification step can read wells at exemplary well positions A9, B10, C11, D12 and E4, F3, G2, H1 to determine whether the readings are at or above a predetermined amount, e.g., 2000 counts. Other well positions and different number of well positions can be selected. An electronic plate for every well configuration that the ECL readers are expected to read should be qualified.

The microprocessor that operates apparatus or instrument 100 or 1000 may be based on the ARM7 processors licensed by ARM Holdings. Such microprocessors are 32-bit or 64-bit architectures and have been used in smart phones (GSM based), home or handheld video game consoles and portable media player. Earlier ECL readers including those manufactured by the assignee of the present application, discussed in commonly owned international publication number WO 2009/126303 and U.S. patent publication number US 2012/0195800 known internally as the "PR-2" ECL reader, utilize the 80C251 microprocessor and its architecture. These commonly-owned patent documents are incorporated herein by reference in their entireties.

Figure 17A:
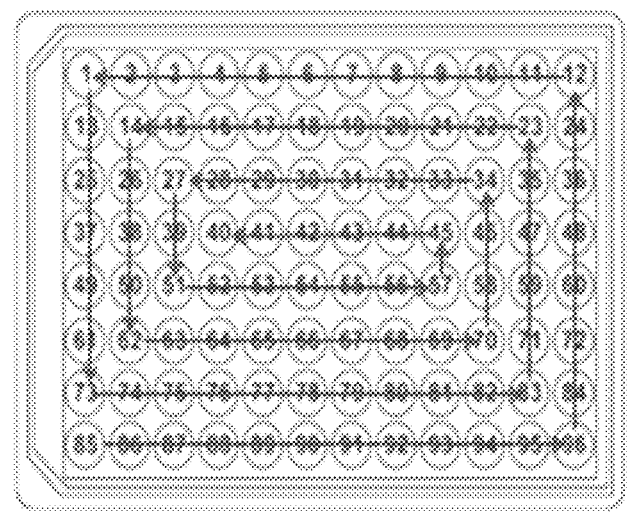
FIG. 17(a) illustrates an exemplary individual well reading pattern for a single-well addressable multi-well plate.

As discussed above, both apparatus 100 and 1000 can read one well at a time. An exemplary, non-limiting single-well reading order is illustrated in FIG. 17(a). As discussed above, a plate orientation sensor is utilized to ascertain the orientation of the plate as it is being read. For single-well addressable or single-well reading, an example reading pattern is shown in FIG. 17(a). The reading starts on the lowest row or well H1 labeled as well (85) and continues in an inwardly spiral fashion in the counter-clockwise direction and completes at well D4 labeled as well (40). The read order shown in FIG. 17(a) may be employed by apparatus 1000. Other read patterns, such as column-by-column, row-by-row, clockwise or counterclockwise beginning at any perimeter well, fractal patterns, triangular patterns, geodesic patterns, etc., can be used by either apparatus 100 or 1000. Advantageously, a spiral read pattern increases the precision and accuracy of the readings, i.e., improving the coefficient of variation, by minimizing the effects of non-uniform heating of the plates. Generally, the outside of a plate would heat at a faster rate than the center. The spiral pattern accounts for this heating pattern by reading wells on the perimeter of the plates first and then toward the center. Hence, the temperature variation caused by uneven heating is minimized.

Figure 17B:
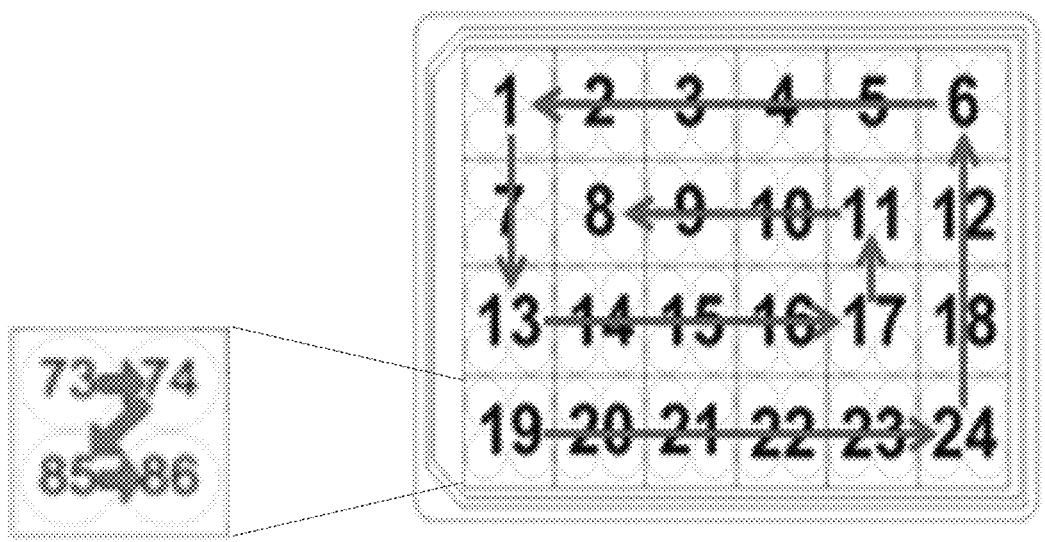
FIG. 17(b) illustrates an exemplary sector (2×2 wells) reading pattern for a multi-well addressable multi-well plate.

An exemplary, non-limiting read order when P×Q well matrix is 2×2 wells is illustrated in FIG. 17(b). The first 2×2 sector to be read is the sector on the lower left side of the plate, and reading order continue in an inwardly spiral, counterclockwise direction. Within a 2×2 well sector, all wells are read simultaneously by apparatus 100. In one embodiment, when reading single wells, apparatus 100 can follow within a 2×2 well sector an exemplary read order from upper right-upper left-lower left-lower right, as illustrated. The read pattern shown in FIG. 17(a) may also be used by apparatus 100 when reading single wells.

The plate read times for apparatus 100 and 1000 are highly repeatable when compared to the read time for the prior ECL apparatus described and claimed in commonly owned international publication number WO 2009/126303 and U.S. patent publication number US 2012/0195800. The prior apparatus utilizes dynamic range extension, which causes the prior apparatus to switch binning depending on the signal strength. This binning switching can cause changes in plate read time, which (along with the decreased CCD heating described above) results in lower % CoVs and better assay reproducibility. Apparatus 100 and 1000 also have faster read time compared to the prior apparatus because ECL apparatus 100 and 1000 do not require a dynamic range pre-pulse, may avoid employing dynamic range extension, and may increase the motor speed of the probe contact stepper motors, as described herein.

In one example, the time period for the movement of the contact motor for apparatus 1000 has been shortened compared to that of apparatus 100. The contact motor drives the contact platforms 701, 1701 toward the bottom of the multi-well plates to conduct electrical voltage to the wells to conduct the assays. The contact motor may be a stepper motor, described herein, and in this example has rotational to linear conversion of about 0.0000625 inch/step. An exemplary contact stepper motor for apparatus 1000 is faster and has a maximum velocity of about 0.9375 inch/sec (2.38 cm/s) and a maximum acceleration of 62.5 inch/sec$^2$ (158.75 cm/s$^2$). The contact stepper motor for apparatus 100 has a maximum velocity of about 0.46875 inch/sec (1.19 cm/s) and a maximum acceleration of 4.6875 inch/sec$^2$ (11.9 cm/s$^2$). As discussed above, contact platform 1701 has fewer contact probes and is smaller in size than contact platform 701. Hence contact platform 1701 has significantly lower mass and could be driven at higher accelerations by the stepper motor.

To further improve the plate read time, the contact stepper motor does not fully lower the contact platforms between wells or between P×Q (2×2) sectors.

In accordance with another aspect of the present invention, the voltage applied to the working and counter electrodes are optimized for single-well addressable plates. For multi-well addressable plates, voltage is applied to a P×Q sector of wells would last longer than to single wells. To preserve the ECL signals, the rate of increasing from the initial voltage (Vi) to the final voltage (Vf) should be kept as low as possible. The voltage waveforms for the multi-well addressable plates and for single-well addressable plates for both apparatus 100 and 1000 are reported below. Furthermore, the voltage waveform window could be adjusted, so that the natural ECL reaction peak for each chemistry and geometry would be fully captured within the voltage ramp window. High bind plates are treated with plasma to modify the surface carbon and create a hydrophilic surface, among other things.

| Apparatus 100 Multi-well | Standard Bind | | | | | High Bind | | | | |
|---|---|---|---|---|---|---|---|---|---|---|
| Addressable Plates | Small 1-Spot | 1-Spot | 4-Spot | 7-Spot | 10-Spot | Small 1-Spot | 1-Spot | 4-Spot | 7-Spot | 10-Spot |
| Vi (mV) | 2800 | 2700 | 2700 | 2700 | 2700 | 2300 | 2700 | 2300 | 2300 | 2300 |
| Vf (mV) | 4800 | 4700 | 4700 | 4700 | 4700 | 4300 | 4700 | 4300 | 4300 | 4300 |
| t (s) | 2 | 2 | 2 | 2 | 2 | 2 | 2 | 2 | 2 | 2 |

| Apparatus 100 Single-well | Standard Bind | | | High Bind | | |
|---|---|---|---|---|---|---|
| Addressable Plates | Small 1-Spot | 1-Spot | 10-Spot | Small 1-Spot | 1-Spot | 10-Spot |
| Vi (mV) | 3000 | 3000 | 3000 | 2500 | 3000 | 2500 |
| Vf (mV) | 4500 | 4500 | 4500 | 4000 | 4500 | 4000 |
| t (s) | 1 | 1 | 1 | 1 | 1 | 1 |

| Apparatus 1000 Single-well | Standard Bind | | | High Bind | | |
|---|---|---|---|---|---|---|
| Addressable Plates | Small 1-Spot | 1-Spot | 10-Spot | Small 1-Spot | 1-Spot | 10-Spot |
| Vi (mV) | 3000 | 3000 | 3000 | 2500 | 3000 | 2500 |
| Vf (mV) | 4500 | 4500 | 4500 | 4000 | 4500 | 4000 |
| t (s) | 1 | 1 | 1 | 1 | 1 | 1 |

The voltage waveforms for single wells in single-well addressable plates for apparatus 100 and apparatus 1000 may be substantially the same. Their waveforms start at higher Vi and end at lower Vf than the waveforms for the multi-well addressable plates. The waveforms described herein provide different voltage ramp rates, which helps to improve overall read times across the various plates described above.

Voltage ramp rates are defined as the difference between Vf (final voltage) and Vi (initial voltage) divided by the time duration (t(s)). The present inventors have recognized that the ECL responses are or can be different from plate to plate, e.g., standard bind vs. high bind. The voltages where ECL responses are generated are different between standard bind and high bind, and different between the spot numbers and arrangements. As best shown in FIG. 18(*a*), an ECL response may extend beyond the voltage ramp window, shown in this example as a cross-hatched area. The portion of the ECL response that extends beyond this voltage ramp window would not be detected. To improve the detection of the ECL responses without extending the time duration (which would increase the time to read an entire plate), or by increasing the voltage ramp rate (which would reduce ECL signal generation), the voltage ramp window is shifted, e.g., Vi and Vf are increased in this exemplary, non-limiting example illustrated in FIG. 18(*b*), to cause the ECL response to change to fit within the voltage ramp window. Hence, the detection of ECL responses is optimized for the various multi-well plates without extending the plate read time.

In another embodiment, apparatus 1000, as well as apparatus 100, records the electrical current (and/or electrical voltage) that flows through the wells of the plate. Apparatus 1000 may interrogate a single well at a time, as well as apparatus 100 when in the single-well mode and may therefore apply a voltage and current to the single well. On the other hand, apparatus 100 when in the multi-well mode may apply a substantially same voltage to multiple wells and would apply more current. The software reports and stores both the peak and the sum of the current integrated through the waveform. The integrated current can be compared to predetermined thresholds to determine whether there is an electrical short in a well or if there is an electrical open circuit, i.e., when there is no sample in the well. This fault detection is not active during the acquisition or capture of ECL signals but is stored and reviewed afterwards.

Patents, patent applications, publications, and test methods cited in this disclosure are incorporated herein by reference in their entirety. The present invention is not to be limited in scope by the specific embodiments described herein. Indeed, various modifications of the invention in addition to those described herein will become apparent to those skilled in the art from the foregoing description and accompanying drawings. Such modifications are intended to fall within the scope of the claims.

Further embodiments include at least:

Embodiment 1 is an instrument comprising: a light detection system comprising a CCD sensor and an optical lens system, wherein the light detection system is positioned above a single well at a time in a multi-well plate to conduct an electrochemiluminescence analysis of said single well, wherein the area of the CCD sensor is about 1× to 2× the area of said single well, wherein the light detection system further comprises a cooling device sized and dimensioned to cool the CCD sensor, wherein the instrument further comprises a heat removal system comprising at least one fan oriented at an angle to pull heated air exhausted from said cooling device into a flow plenum and out of the instrument.

Embodiment 2 is the instrument of embodiment 1, wherein the optical lens system comprises a plurality of lenses and the plurality of lenses have both spherical and aspherical surfaces.

Embodiment 3 is the instrument of embodiment 2, wherein the area of the plurality of lenses is larger than the area of said single well.

Embodiment 4 is the instrument of embodiments 1-3, The instrument of claim 1, wherein the light detection system is mounted in a substantially vertical direction onto a housing top.

Embodiment 5 is the instrument of embodiment 1-4, wherein the heat removal system is mounted onto a housing top.

Embodiment 6 is the instrument of embodiments 2-5, wherein the at least one fan is housed within the plenum.

Embodiment 7 is the instrument of embodiments 1-6, wherein the plenum houses at least one printed circuit board (PCB) and comprises at least one opening to allow electrical connections between the at least one PCB and electrical components outside of the plenum.

Embodiment 8 is the instrument of embodiments 1-7, wherein a flow baffle is positioned within the plenum to minimize recirculation of air within the instrument.

Embodiment 9 is the instrument of embodiment 7, wherein said heated air flows away from the CCD sensor and plate before exiting the instrument.

Embodiment 10 is the instrument of embodiment 9, wherein the heated air further flows across the at least one PCB before exiting the instrument.

Embodiment 11 is the instrument of embodiments 1-10, wherein the area of the CCD sensor is about 1.25× to 1.85× the area of said single well.

Embodiment 12 is the instrument of embodiments 2-11, wherein the area of the CCD sensor is about 1.50× to 1.80× the area of said single well.

Embodiment 13 is the instrument of embodiments 2-12, wherein the light detection system comprises a camera window coated with an anti-reflection (AR) coating.

Embodiment 14 is the instrument of embodiment 13, wherein the light detection system does not have a separate optical bandpass filter.

Embodiment 15 is the instrument of embodiments 13-14, wherein the camera window is further coated with one or more layers of material to suppress transmission of infrared (IR) wavelengths through the window.

Embodiment 16 is the instrument of embodiments 1-15, wherein the light detection system comprises a light tight enclosure, and the light tight enclosure comprises at least one optical tortuous path to discourage light from entering the light tight enclosure.

Embodiment 17 is the instrument of embodiments 2-16, wherein the optical lens system comprises fewer than 9 optical lenses and at least five or more optical lenses.

Embodiment 18 is the instrument of embodiments 2-17, wherein the optical lens system comprises fewer than 7 lenses.

Embodiment 19 is the instrument of embodiments 2-18, wherein the plurality of lenses form a telecentric assembly.

We claim:

1. An instrument comprising:
a light detection system having a housing, the light detection system comprising:
a CCD sensor and an optical lens system, wherein the light detection system is configured for positioning above a single well at a time in a multi-well plate to conduct an electrochemiluminescence analysis of the single well, wherein an area of the CCD sensor is approximately 1× to 2× of an area of the single well, and
a cooling element to cool the CCD sensor,
wherein the instrument further comprises a heat removal system comprising:
a first fan disposed in the light detection system and configured to pull heated air from the light detection system, and
a second fan connected to a cover manifold and oriented toward the top of the light detection system to pull the heated air into the cover manifold and out of the instrument.

2. The instrument of claim 1, wherein the optical lens system comprises a plurality of lenses and the plurality of lenses have both spherical and aspherical surfaces.

3. The instrument of claim 2, wherein an area of the plurality of lenses is larger than the area of the single well.

4. The instrument of claim 1, wherein the light detection system is mounted in a substantially vertical direction onto a housing top.

5. The instrument of claim 1, wherein the heat removal system is mounted onto a housing top.

6. The instrument of claim 1, wherein the at least one second fan is housed within the cover manifold.

7. The instrument of claim 1, wherein the cover manifold houses at least one printed circuit board (PCB) and comprises at least one opening to allow electrical connections between the at least one PCB and electrical components outside of the cover manifold.

8. The instrument of claim 7, wherein a flow baffle is positioned within the cover manifold to minimize recirculation of air within the instrument.

9. The instrument of claim 7, wherein the heated air flows away from the CCD sensor and plate before exiting the instrument.

10. The instrument of claim 9, wherein the heated air further flows across the at least one PCB before exiting the instrument.

11. The instrument of claim 1, wherein the area of the CCD sensor is about 1.25× to 1.85× the area of the single well.

12. The instrument of claim 1, wherein the area of the CCD sensor is about 1.50× to 1.80× the area of the single well.

13. The instrument of claim 1, wherein the light detection system comprises a camera window coated with an anti-reflection (AR) coating.

14. The instrument of claim 13, wherein the light detection system does not have a separate optical bandpass filter.

15. The instrument of claim 13 wherein the camera window is further coated with one or more layers of material to suppress transmission of infrared (IR) wavelengths through the camera window.

16. The instrument of claim 1, wherein the light detection system comprises a light tight enclosure, and the light tight enclosure comprises at least one tortuous path to discourage light from entering the light tight enclosure.

17. The instrument of claim 1, wherein the optical lens system comprises fewer than 9 optical lenses and at least five or more optical lenses.

18. The instrument of claim 1, wherein the optical lens system comprises fewer than 7 lenses.

19. The instrument of claim 2, wherein the plurality of lenses form a lens assembly designed to produce a telecentric view.

20. The instrument of claim 1, wherein the heated air is drawn away from the top of the light detection system into the cover manifold and out of the instrument through at least one vent opening.

* * * * *

UNITED STATES PATENT AND TRADEMARK OFFICE
CERTIFICATE OF CORRECTION

| | |
|---|---|
| PATENT NO. | : 11,896,979 B2 |
| APPLICATION NO. | : 16/929757 |
| DATED | : February 13, 2024 |
| INVENTOR(S) | : Gary I. Krivoy et al. |

It is certified that error appears in the above-identified patent and that said Letters Patent is hereby corrected as shown below:

In the Claims

Column 41, Line 51 (Claim 1):
Please replace "toward the top of the light detection system to pull the" with --toward a top of the light detection system to pull the--.

Signed and Sealed this
Nineteenth Day of March, 2024

Katherine Kelly Vidal
*Director of the United States Patent and Trademark Office*